(12) United States Patent
    Oh

(10) Patent No.: US 11,315,270 B2
(45) Date of Patent: Apr. 26, 2022

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventor: Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/157,571

(22) Filed: Jan. 25, 2021

(65) Prior Publication Data

US 2021/0319571 A1    Oct. 14, 2021

Related U.S. Application Data

(60) Provisional application No. 63/009,955, filed on Apr. 14, 2020.

(51) Int. Cl.
    *G06T 7/521*   (2017.01)
    *G06T 7/60*    (2017.01)
    *G06T 19/00*   (2011.01)
    *G06T 9/00*    (2006.01)

(52) U.S. Cl.
    CPC ............... *G06T 7/521* (2017.01); *G06T 7/60* (2013.01); *G06T 9/005* (2013.01); *G06T 19/006* (2013.01); *G06T 2207/10028* (2013.01)

(58) Field of Classification Search
    CPC .......... G06T 9/00; G06T 9/001; G06T 17/00; G06T 7/60; G06T 15/04; G06T 7/521; G06T 19/006; G06T 9/005; G06T 2207/10028; H04N 19/70; H04N 19/129; H04N 19/159; H04N 19/172
    See application file for complete search history.

(56) References Cited

U.S. PATENT DOCUMENTS

| | | | |
|---|---|---|---|
| 2013/0297574 A1* | 11/2013 | Thiyanaratnam | G06T 9/005 707/693 |
| 2017/0347120 A1* | 11/2017 | Chou | H04N 19/147 |
| 2019/0087978 A1* | 3/2019 | Tourapis | G06T 9/00 |
| 2019/0180409 A1* | 6/2019 | Moloney | G01C 21/20 |
| 2019/0311500 A1* | 10/2019 | Mammou | G06T 17/00 |
| 2019/0313110 A1* | 10/2019 | Mammou | H04N 19/597 |
| 2020/0302650 A1* | 9/2020 | Aksu | G06T 9/00 |
| 2020/0314435 A1* | 10/2020 | Tourapis | G06T 7/74 |
| 2020/0380765 A1* | 12/2020 | Thudor | G06T 17/10 |
| 2020/0413095 A1* | 12/2020 | Choi | H04N 13/178 |

FOREIGN PATENT DOCUMENTS

| | | | | |
|---|---|---|---|---|
| KR | 20190053129 A | * | 5/2019 | ............ H04N 19/503 |
| KR | 1020190053129 | | 5/2019 | |
| WO | WO2019199092 | | 10/2019 | |
| WO | WO-2019199092 A1 | * | 10/2019 | ............. H04L 67/10 |

* cited by examiner

*Primary Examiner* — Mekonen T Bekele
(74) *Attorney, Agent, or Firm* — Fish & Richardson P.C.

(57) ABSTRACT

According to embodiments, point cloud data transmission method may include encoding point cloud data, encapsulating a bitstream that includes the encoded point cloud data into a file, and transmitting the file, the bitstream is stored either in a single track or in multiple tracks of the file, the file further includes signaling data, wherein the signaling data include at least one parameter set and spatial region information, and the encoded point cloud data include geometry data and attribute data.

12 Claims, 50 Drawing Sheets

FIG. 6
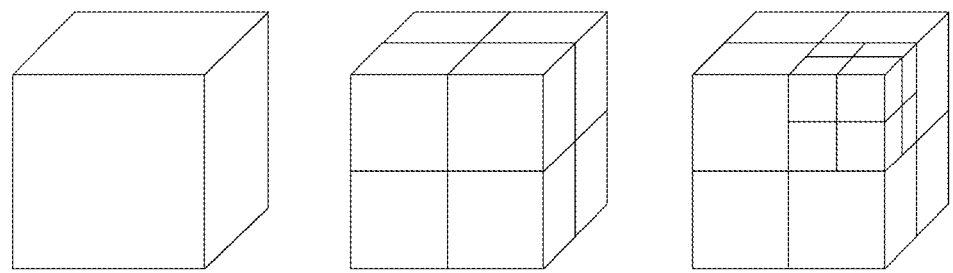
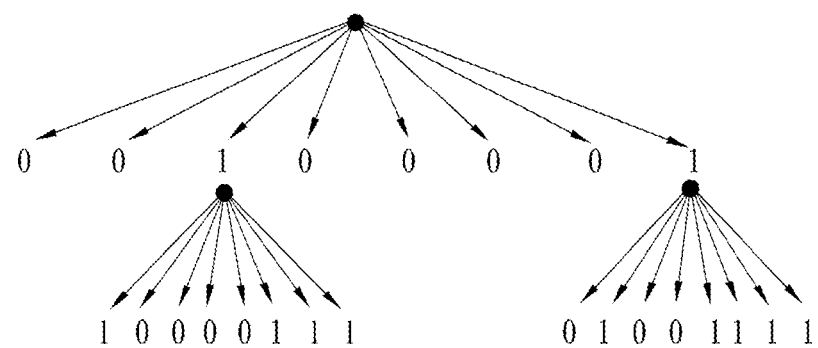

FIG. 7
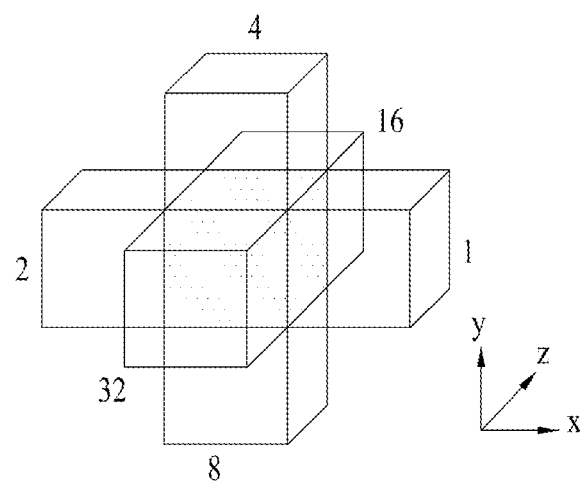
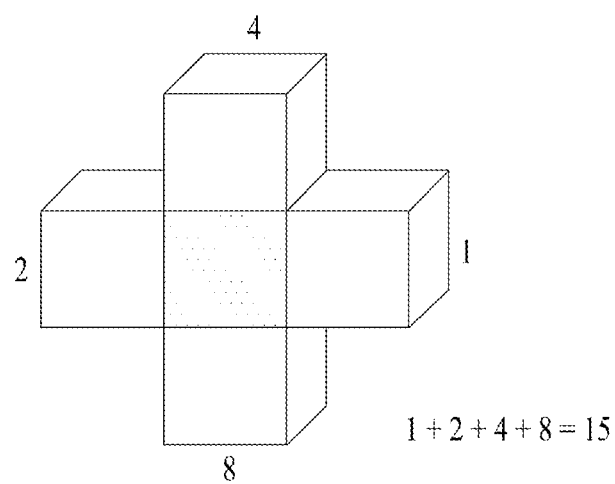
1 + 2 + 4 + 8 = 15

FIG. 24

| seq_parameter_set( ) { | Descriptor |
|---|---|
|   main_profile_compatibility_flag | u(1) |
|   unique_point_positions_constraint_flag | u(1) |
|   level_idc | u(8) |
|   sps_seq_parameter_set_id | ue(v) |
|   sps_bounding_box_present_flag | u(1) |
|   if( sps_bounding_box_present_flag ) { | |
|     sps_bounding_box_offset_x | se(v) |
|     sps_bounding_box_offset_y | se(v) |
|     sps_bounding_box_offset_z | se(v) |
|     sps_bounding_box_offset_log2_scale | ue(v) |
|     sps_bounding_box_size_width | ue(v) |
|     sps_bounding_box_size_height | ue(v) |
|     sps_bounding_box_size_depth | ue(v) |
|   } | |
|   sps_source_scale_factor_numerator_minus1 | ue(v) |
|   sps_source_scale_factor_denominator_minus1 | ue(v) |
|   sps_num_attribute_sets | ue(v) |
|   for( i = 0; i< sps_num_attribute_sets; i++ ) { | |
|     attribute_dimension_minus1[ i ] | ue(v) |
|     attribute_instance_id[ i ] | ue(v) |
|     if(attribute_dimension_minus1[ i ] > 0 ) | |
|       attribute_secondary_bitdepth_minus1[ i ] | ue(v) |
|       attribute_cicp_colour_primaries[ i ] | ue(v) |
|       attribute_cicp_transfer_characteristics[ i ] | ue(v) |
|       attribute_cicp_matrix_coeffs[ i ] | ue(v) |
|       attribute_cicp_video_full_range_flag[ i ] | u(1) |
|     known_attribute_label_flag[ i ] | u(1) |
|     if( known_attribute_label_flag[ i ] ) | |
|       known_attribute_label[ i ] | ue(v) |
|     else | |
|       attribute_label_four_bytes[ i ] | u(32) |
|   } | |
|   log2_max_frame_idx | u(5) |
|   axis_coding_order | u(3) |
|   sps_bypass_stream_enabled_flag | u(1) |
|   sps_extension_flag | u(1) |
|   if( sps_extension_flag ) | |
|     while( more_data_in_byte_stream( ) ) | |
|       sps_extension_data_flag | u(1) |
|   byte_alignment( ) | |
| } | |

FIG. 25

| attribute_label_four_bytes[ i ] | Attribute type |
|---|---|
| 0 | Colour |
| 1 | Reflectance |
| 2 | Frame index |
| 3 | Material ID |
| 4 | Transparency |
| 5 | Normals |
| 6...255 | Reserved |
| 256...0xffffffff | unspecified |

FIG. 26

| axis_coding_order | X | Y | Z |
|---|---|---|---|
| 0 | 2 | 1 | 0 |
| 1 | 0 | 1 | 2 |
| 2 | 0 | 2 | 1 |
| 3 | 2 | 0 | 1 |
| 4 | 2 | 1 | 0 |
| 5 | 1 | 2 | 0 |
| 6 | 1 | 0 | 2 |
| 7 | 0 | 1 | 2 |

FIG. 27

| geometry_parameter_set( ) { | Descriptor |
|---|---|
| gps_geom_parameter_set_id | ue(v) |
| gps_seq_parameter_set_id | ue(v) |
| gps_box_present_flag | u(1) |
| if( gps_box_present_flag ){ | |
|   gps_gsh_box_log2_scale_present_flag | u(1) |
|   if( gps_gsh_box_log2_scale_present_flag == 0 ) | |
|     gps_gsh_box_log2_scale | ue(v) |
| } | |
| unique_geometry_points_flag | u(1) |
| geometry_planar_mode_flag | u(1) |
| if( geometry_planar_mode_flag ){ | |
|   geom_planar_mode_th_idcm | ue(v) |
|   geom_planar_mode_th[ 1 ] | ue(v) |
|   geom_planar_mode_th[ 2 ] | ue(v) |
| } | |
| geometry_angular_mode_flag | u(1) |
| if( geometry_angular_mode_flag ){ | |
|   lidar_head_position[0] | se(v) |
|   lidar_head_position[1] | se(v) |
|   lidar_head_position[2] | se(v) |
|   number_lasers | ue(v) |
|   for( i = 0; i < number_lasers; i++ ) { | |
|     laser_angle[ i ] | se(v) |
|     laser_correction[ i ] | se(v) |
|   } | |
|   planar_buffer_disabled | u(1) |
|   implicit_qtbt_angular_max_node_min_dim_log2_to_split_z | se(v) |
|   implicit_qtbt_angular_max_diff_to_split_z | se(v) |
| } | |
| neighbour_context_restriction_flag | u(1) |
| inferred_direct_coding_mode_enabled_flag | u(1) |
| bitwise_occupancy_coding_flag | u(1) |
| adjacent_child_contextualization_enabled_flag | u(1) |
| log2_neighbour_avail_boundary | ue(v) |
| log2_intra_pred_max_node_size | ue(v) |
| log2_trisoup_node_size | ue(v) |
| geom_scaling_enabled_flag | u(1) |
| if( geom_scaling_enabled_flag ) | |
|   geom_base_qp | ue(v) |
| gps_implicit_geom_partition_flag | u(1) |
| if( gps_implicit_geom_partition_flag ) { | |
|   gps_max_num_implicit_qtbt_before_ot | ue(v) |
|   gps_min_size_implicit_qtbt | ue(v) |
| } | |
| gps_extension_flag | u(1) |
| if( gps_extension_flag ) | |
|   while( more_data_in_byte_stream( ) ) | |
|     gps_extension_data_flag | u(1) |
| byte_alignment( ) | |
| } | |

FIG. 28

| attribute_parameter_set ( ) { | Descriptor |
|---|---|
|   aps_attr_parameter_set_id | ue(v) |
|   aps_seq_parameter_set_id | ue(v) |
|   attr_coding_type | ue(v) |
|   aps_attr_initial_qp | ue(v) |
|   aps_attr_chroma_qp_offset | se(v) |
|   aps_slice_qp_delta_present_flag | u(1) |
|   LodParametersPresent = ( attr_coding_type == 0 \|\| attr_coding_type == 2 ) ? 1 : 0 | |
|   if ( LodParametersPresent ) { | |
|     lifting_num_pred_nearest_neighbours_minus1 | ue(v) |
|     lifting_search_range_minus1 | ue(v) |
|     for ( k = 0; k < 3; k++ ) | |
|       lifting_neighbour_bias[ k ] | ue(v) |
|     if ( attr_coding_type == 2 ) | |
|       lifting_scalability_enabled_flag | u(1) |
|     if ( ! lifting_scalability_enabled_flag ) { | |
|       lifting_num_detail_levels_minus1<br>[Ed. The V7.0 code use the variable without minus1. It should be aligned] | ue(v) |
|       if ( lifting_num_detail_levels_minus1 > 0 ) { | |
|         lifting_lod_regular_sampling_enabled_flag | u(1) |
|         for ( idx = 0; idx < num_detail_levels_minus1; idx++ ) { | |
|           if ( lifting_lod_regular_sampling_enabled_flag ) | |
|             lifting_sampling_period_minus2[ idx ] | ue(v) |
|           else | |
|             lifting_sampling_distance_squared_scale_minus1[ idx ] | ue(v) |
|           if ( idx != 0 ) | |
|             lifting_sampling_distance_squared_offset[ idx ] | ue(v) |
|         } | |
|       } | |
|     } | |
|     if ( attr_coding_type == 0 ) { | |
|       lifting_adaptive_prediction_threshold | ue(v) |
|       lifting_intra_lod_prediction_num_layers | ue(v) |
|       lifting_max_num_direct_predictors | ue(v) |
|       inter_component_prediction_enabled_flag | u(1) |
|     } | |
|   } | |
|   if ( attribute_coding_type == 1 ) { //RAHT | |
|     raht_prediction_enabled_flag | u(1) |
|     if (raht_prediction_enabled_f lag) { | |
|     raht_prediction_threshold0 | ue(v) |
|       raht_prediction_threshold1 | ue(v) |
|     } | |
|   } | |
|   aps_extension_flag | u(1) |
|   if( aps_extension_flag ) | |
|     while( more_data_in_byte_stream( ) ) | |
|       aps_extension_data_flag | u(1) |
|   byte_alignment( ) | |
| } | |

FIG. 29

| attr_coding_type | coding type |
|---|---|
| 0 | Predicting Weight Lifting |
| 1 | Region Adaptive Hierarchical Transform (RAHT) |
| 2 | Fix Weight Lifting |

FIG. 30

| tile_inventory( ) { | Descriptor |
|---|---|
|    tile_frame_idx | ? |
|    num_tiles_minus1 | u(16) |
|    for( i = 0; i <= num_tiles_minus1; i++ ) { | |
|       tile_bounding_box_offset_x[ i ] | se(v) |
|       tile_bounding_box_offset_y[ i ] | se(v) |
|       tile_bounding_box_offset_z[ i ] | se(v) |
|       tile_bounding_box_size_width[ i ] | ue(v) |
|       tile_bounding_box_size_height[ i ] | ue(v) |
|       tile_bounding_box_size_depth[ i ] | ue(v) |
|    } | |
|    byte_alignment( ) | |
| } | |

FIG. 31

| frame_boundary_marker( ) { | Descriptor |
|---|---|
| /* this syntax structure is intentionally empty */ | |
| } | |

FIG. 32

| geometry_slice_bitstream( ) { | Descriptor |
|---|---|
| geometry_slice_header( ) | |
| geometry_slice_data( ) | |
| } | |

FIG. 33

| geometry_slice_header( ) { | Descriptor |
|---|---|
|    gsh_geometry_parameter_set_id | ue(v) |
|    gsh_tile_id | ue(v) |
|    gsh_slice_id | ue(v) |
|    frame_idx | u(n) |
|    gsh_num_points | u(24) |
|    if( gps_box_present_flag ) { | |
|       if( gps_gsh_box_log2_scale_present_flag ) | |
|          gsh_box_log2_scale | ue(v) |
|       gsh_box_origin_x | ue(v) |
|       gsh_box_origin_y | ue(v) |
|       gsh_box_origin_z | ue(v) |
|    } | |
|    if ( gps_implicit_geom_partition_flag ) { | |
|       gsh_log2_max_nodesize_x | ue(v) |
|       gsh_log2_max_nodesize_y_minus_x | se(v) |
|       gsh_log2_max_nodesize_z_minus_y | se(v) |
|    } else { | |
|       gsh_log2_max_nodesize | ue(v) |
|    } | |
|    if( geom_scaling_enabled_flag ) { | |
|       geom_slice_qp_offset | se(v) |
|       geom_octree_qp_offsets_enabled_flag | u(1) |
|       if( geom_octree_qp_offsets_enabled_flag ) | |
|          geom_octree_qp_offsets_depth | ue(v) |
|    } | |
|    byte_alignment( ) | |
| } | |

FIG. 34

| geometry_slice_data( ) { | Descriptor |
|---|---|
|     for( depth = 0; depth < MaxGeometryOctreeDepth; depth++ ) { | |
|         for( nodeIdx = 0; nodeIdx < NumNodesAtDepth[ depth ]; nodeIdx++ ) { | |
|             xN = NodeX[ depth ][ nodeIdx ] | |
|             yN = NodeY[ depth ][ nodeIdx ] | |
|             zN = NodeZ[ depth ][ nodeIdx ] | |
|             geometry_node( depth, nodeIdx, xN, yN, zN ) | |
|         } | |
|     } | |
|     if ( log2_trisoup_node_size > 0 ) | |
|         geometry_trisoup_data( ) | |
| } | |

FIG. 35

| attribute_slice_bitstream( ) { | Descriptor |
|---|---|
| attribute_slice_header( ) | |
| attribute_slice_data( ) | |
| } | |

FIG. 36

| attribute_slice_header( ) { | Descriptor |
|---|---|
| ash_attr_parameter_set_id | ue(v) |
| ash_attr_sps_attr_idx | ue(v) |
| ash_attr_geom_slice_id | ue(v) |
| if( aps_slice_qp_delta_present_flag ) { | |
| ash_attr_qp_delta_luma | se(v) |
| if( attribute_dimension_minus1[ ash_attr_sps_attr_idx ] > 0 ) | |
| ash_attr_qp_delta_chroma | se(v) |
| } | |
| ash_attr_layer_qp_delta_present_flag | u(1) |
| if ( ash_attr_layer_qp_delta_present_flag ) { | |
| ash_attr_num_layer_qp_minus1 | ue(v) |
| for( i = 0; i < NumLayerQp; i++ ){ | |
| ash_attr_layer_qp_delta_luma[i] | se(v) |
| if( attribute_dimension_minus1[ ash_attr_sps_attr_idx ] > 0 ) | |
| ash_attr_layer_qp_delta_chroma[i] | se(v) |
| } | |
| } | |
| ash_attr_region_qp_delta_present_flag | u(1) |
| if ( ash_attr_region_qp_delta_present_flag ) { | |
| ash_attr_qp_region_box_origin_x | ue(v) |
| ash_attr_qp_region_box_origin_y | ue(v) |
| ash_attr_qp_region_box_origin_z | ue(v) |
| ash_attr_qp_region_box_width | ue(v) |
| ash_attr_qp_region_box_height | ue(v) |
| ash_attr_qp_region_box_depth | ue(v) |
| ash_attr_region_qp_delta | se(v) |
| } | |
| byte_alignment( ) | |
| } | |

FIG. 37

| attribute_slice_data( ) { | Descriptor |
|---|---|
|     dimension = attribute_dimension[ ash_attr_sps_attr_idx ] | |
|     zerorun | ae(v) |
|     for( i = 0; i < pointCount; i++ ) { | |
|         if( attr_coding_type == 0 && | |
|             maxPredDiff[ i ] > lifting_adaptive_prediction_threshold && | |
|             MaxNumPredictors > 1 ) { | |
|             predIndex[ i ] | ae(v) |
|         } | |
|         if( zerorun > 0 ) { | |
|             for( k = 0; k < dimension ; k++ ) | |
|                 values[ k ][ i ] = 0 | |
|             zerorun -= 1 | |
|         } | |
|         else { | |
|             attribute_coding( dimension, i ) | ae(v) |
|             zerorun | ae(v) |
|         } | |
|     } | |
|     byte_alignment( ) | |
| } | |

FIG. 38

| metadata_slice_bitstream( ) { | Descriptor |
|---|---|
|     metadata_slice_header( ) | |
|     metadata_slice_data( ) | |
| } | |

FIG. 39

| metadata_slice_header( ) { | Descriptor |
|---|---|
| msh_slice_id | ue(v) |
| msh_geom_slice_id | ue(v) |
| msh_attr_id | ue(v) |
| msh_attr_slice_id | ue(v) |
| } | |

FIG. 40

| metadata_slice_data( ) { | Descriptor |
|---|---|
|     metadata_bitstream( ) | |
| } | |

FIG. 42

| tlv_encapsulation( ) { | Descriptor |
|---|---|
| tlv_type | u(8) |
| tlv_num_payload_bytes | u(32) |
| for( i = 0; i < tlv_num_payload_bytes; i++ ) | |
|    tlv_payload_byte[ i ] | u(8) |
| } | |

FIG. 43

| tlv_type | Description |
| --- | --- |
| 0 | Sequence parameter set |
| 1 | Geometry parameter set |
| 2 | Geometry Slice |
| 3 | Attribute parameter set |
| 4 | Attribute Slice |
| 5 | Tile inventory |
| 6 | Frame boundary marker |
| 7 | Metadata Slice |

FIG. 45

| TLV encapsulation structure (Parameter Set #1, if present) | ... | TLV encapsulation structure (Parameter Set #M, if present) | TLV encapsulation structure (Geometry Slice) | TLV encapsulation structure (Attribute Slice #1, if present) | ... | TLV encapsulation structure (Attribute Slice #N, if present) |

Sample

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS REFERENCE TO RELATED APPLICATIONS

This application claims the benefit of U.S. Provisional Application No. 63/009,955, filed on Apr. 14, 2020, which is hereby incorporated by reference as if fully set forth herein.

TECHNICAL FIELD

Embodiments relate to a method and apparatus for processing point cloud content.

BACKGROUND

Point cloud content is content represented by a point cloud, which is a set of points belonging to a coordinate system representing a three-dimensional space (or volume). The point cloud content may express media configured in three dimensions, and is used to provide various services such as virtual reality (VR), augmented reality (AR), mixed reality (MR), XR (Extended Reality), and self-driving services. However, tens of thousands to hundreds of thousands of point data are required to represent point cloud content. Therefore, there is a need for a method for efficiently processing a large amount of point data.

SUMMARY

An object of the present disclosure devised to solve the above-described problems is to provide a point cloud data transmission device, a point cloud data transmission method, a point cloud data reception device, and a point cloud data reception method for efficiently transmitting and receiving a point cloud.

Another object of the present disclosure is to provide a point cloud data transmission device, a point cloud data transmission method, a point cloud data reception device, and a point cloud data reception method for addressing latency and encoding/decoding complexity.

Another object of the present disclosure is to provide a point cloud data transmission device, a point cloud data transmission method, a point cloud data reception device, and a point cloud data reception method for efficiently transmitting and receiving a geometry-point cloud compression (G-PCC) bitstream.

Another object of the present disclosure is to provide a point cloud data transmission device, a point cloud data transmission method, a point cloud data reception device, and a point cloud data reception method for efficiently storing a G-PCC bitstream in a single track in a file and efficiently accessing the stored G-PCC bitstream.

Another object of the present disclosure is to provide a point cloud data transmission device, a point cloud data transmission method, a point cloud data reception device, and a point cloud data reception method for efficiently storing a G-PCC bitstream in multiple tracks in a file and efficiently accessing the stored G-PCC bitstream.

Another object of the present disclosure is to provide a point cloud data transmission device, a point cloud data transmission method, a point cloud data reception device, and a point cloud data reception method for efficiently storing a G-PCC bitstream in a single track or multiple tracks in a file and supporting spatial access of the stored G-PCC bitstream.

Another object of the present disclosure is to provide a point cloud data transmission device, a point cloud data transmission method, a point cloud data reception device, and a point cloud data reception method for providing signaling of related information to support spatial access of a G-PCC bitstream stored in a single track or multiple tracks in a file.

Objects of the present disclosure are not limited to the aforementioned objects, and other objects of the present disclosure which are not mentioned above will become apparent to those having ordinary skill in the art upon examination of the following description.

To achieve these objects and other advantages and in accordance with the purpose of the disclosure, as embodied and broadly described herein, a method of transmitting point cloud data may include encoding point cloud data, encapsulating a bitstream that includes the encoded point cloud data into a file, and transmitting the file.

According to embodiments, the bitstream may be stored either in a single track or in multiple tracks of the file, the file may further include signaling data, and the signaling data may include at least one parameter set and spatial region information. According to embodiments, the encoded point cloud data include geometry data and attribute data.

According to embodiments, the point cloud data are divided into one or more 3D spatial regions and the spatial region information includes at least identification information for identifying each 3D spatial region, position information of an anchor point representing an origin of each 3D spatial region, or size information of each 3D spatial region.

According to embodiments, the spatial region information is static spatial region information that does not change over time or dynamic spatial region information that dynamically changes over time.

According to embodiments, the bitstream is comprised of data units, each data unit includes type information, length information and a payload, and the type information indicates a type of data in the payload, the length information indicates a length of the payload and the payload includes one of the geometry data, the attribute data or the at least one parameter set.

According to embodiments, when the bitstream is stored in the multiple tracks of the file, the signaling data further include component type information for indicating a type of a component stored in each track, the component is either the geometry data or the attribute data and the component type information is signaled in a sample entry of each track.

According to embodiments, a point cloud data transmission apparatus may include an encoder to encode point cloud data, an encapsulator to encapsulate a bitstream that includes the encoded point cloud data into a file, and a transmitter to transmit the file.

According to embodiments, the bitstream is stored either in a single track or in multiple tracks of the file, the file further includes signaling data, and the signaling data include at least one parameter set and spatial region information. According to embodiments, the encoded point cloud data may include geometry data and attribute data.

According to embodiments, the point cloud data are divided into one or more 3D spatial regions and the spatial region information includes at least identification information for identifying each 3D spatial region, position information of an anchor point representing an origin of each 3D spatial region, or size information of each 3D spatial region.

According to embodiments, the spatial region information is static spatial region information that does not change over time or dynamic spatial region information that dynamically changes over time.

According to embodiments, the bitstream is comprised of data units, each data unit includes type information, length information and a payload, and the type information indicates a type of data in the payload, the length information indicates a length of the payload and the payload includes one of the geometry data, the attribute data or the at least one parameter set.

According to embodiments, when the bitstream is stored in the multiple tracks of the file, the signaling data further include component type information for indicating a type of a component stored in each track, the component is either the geometry data or the attribute data and the component type information is signaled in a sample entry of each track.

According to embodiments, a point cloud data reception apparatus may include a receiver to receive a file, a decapsulator to decapsulate the file into a bitstream that includes point cloud data, the bitstream is stored either in a single track or in multiple tracks of the file, and the file further includes signaling data, a decoder to decode a part or all of the point cloud data based on the signaling data, and a renderer to render a part or all of the decoded point cloud data.

According to embodiments, the signaling data include at least one parameter set and spatial region information, and the point cloud data include geometry data and attribute data.

According to embodiments, the point cloud data are divided into one or more 3D spatial regions and the spatial region information includes at least identification information for identifying each 3D spatial region, position information of an anchor point representing an origin of each 3D spatial region, or size information of each 3D spatial region.

According to embodiments, the spatial region information is static spatial region information that does not change over time or dynamic spatial region information that dynamically changes over time.

According to embodiments, the bitstream is comprised of data units, each data unit includes type information, length information and a payload, and the type information indicates a type of data in the payload, the length information indicates a length of the payload and the payload includes one of the geometry data, the attribute data or the at least one parameter set.

According to embodiments, when the bitstream is stored in the multiple tracks of the file, the signaling data further include component type information for indicating a type of a component stored in each track, the component is either the geometry data or the attribute data and the component type information is signaled in a sample entry of each track.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 6 illustrates an example of octree and occupancy code according to embodiments.

FIG. 7 illustrates an example of a neighbor node pattern according to embodiments.

FIG. 24 illustrates an embodiment of a syntax structure of a sequence parameter set according to embodiments.

FIG. 25 illustrates a table showing an example of attribute types allocated to attribute_label_four_bytes field according to embodiments.

FIG. 26 illustrates a table showing an example of X, Y, and Z axis values allocated to the axis_coding_order field according to embodiments.

FIG. 27 illustrates an embodiment of a syntax structure of a geometry parameter set according to embodiments.

FIG. 28 illustrates an embodiment of a syntax structure of an attribute parameter set according to embodiments.

FIG. 29 illustrates a table showing an example of attribute coding types allocated to attr_coding_type field according to embodiments.

FIG. 30 illustrates an embodiment of a syntax structure of a tile inventory according to embodiments.

FIG. 31 illustrates an embodiment of a syntax structure of a frame boundary marker according to embodiments.

FIG. 32 illustrates an embodiment of a syntax structure of geometry slice bitstream( ) according to embodiments.

FIG. 33 illustrates an embodiment of a syntax structure of geometry slice header according to embodiments.

FIG. 34 illustrates an embodiment of a syntax structure of geometry slice data according to embodiments.

FIG. 35 illustrates an embodiment of a syntax structure of attribute slice bitstream( ) according to embodiments.

FIG. 36 illustrates an embodiment of a syntax structure of attribute slice header according to embodiments.

FIG. 37 illustrates an embodiment of a syntax structure of attribute slice data according to embodiments.

FIG. 38 illustrates an embodiment of a syntax structure of metadata_slice_bitstream( ) according to embodiments.

FIG. 39 illustrates an embodiment of a syntax structure of metadata slice header according to embodiments.

FIG. 40 illustrates an embodiment of a syntax structure of metadata slice data according to embodiments.

FIG. 42 illustrates an exemplary syntax structure of type-length-value (TLV) encapsulation ( ) according to embodiments.

FIG. 43 illustrates a table showing an example of tlv_types allocated to tlv_type field according to embodiments.

FIG. 45 is a diagram illustrating an exemplary sample structure when a G-PCC bitstream is stored in a single track according to embodiments.

DETAILED DESCRIPTION

Figure 1:
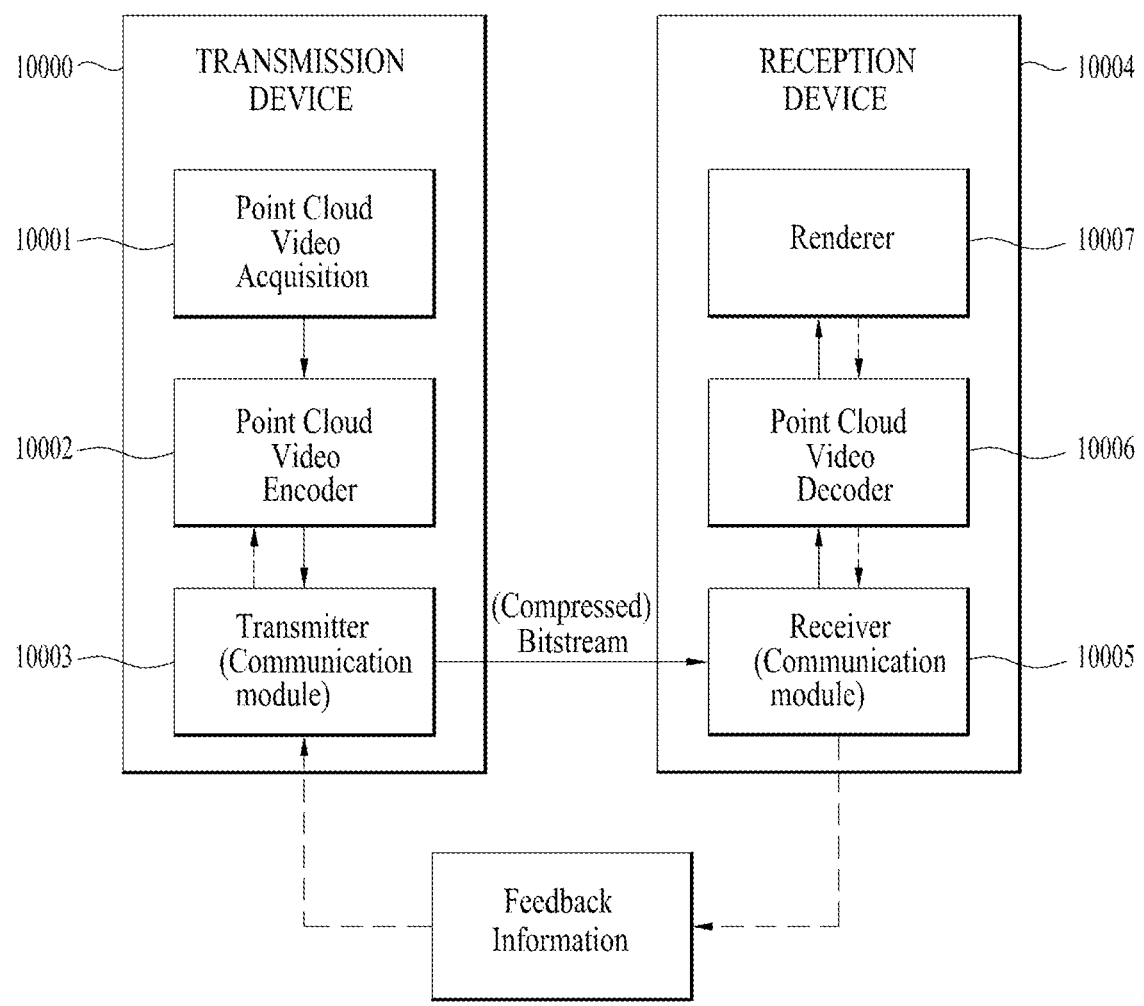
FIG. 1 illustrates an exemplary point cloud content providing system according to embodiments.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. It should be noted that the following examples are only for embodying the present disclosure and do not limit the scope of the present disclosure. What can be easily inferred by an expert in the technical field to which the present invention belongs from the detailed description and examples of the present disclosure is to be interpreted as being within the scope of the present disclosure.

The detailed description in this present specification should be construed in all aspects as illustrative and not restrictive. The scope of the disclosure should be determined by the appended claims and their legal equivalents, and all changes coming within the meaning and equivalency range of the appended claims are intended to be embraced therein.

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details. Although most terms used in this specification have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings. In addition, the following drawings and detailed description should not be construed as being limited to the specifically described embodiments, but should be construed as including equivalents or substitutes of the embodiments described in the drawings and detailed description.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquisition unit 10001, a point cloud video encoder 10002, and/or a transmitter (or communication module) 10003.

The point cloud video acquisition unit 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. According to an embodiment, the renderer 10007 may render the decoded point cloud video data according to a viewport, etc. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to the embodiments may represent information about a position, orientation, angle, and motion of a user's head. The reception device 10004 according to the embodiments may calculate viewport information based on the head orientation information. The viewport information is information about a region of a point cloud video that the user is viewing (that is, a region that the user is currently viewing). That is, the viewport information is information about a region that the user is currently viewing in the point cloud video. In other words, the viewport or viewport region may represent a region that the user is viewing in the point cloud video. A viewpoint is a point that the user is viewing in the point cloud video, and may represent a center point of the viewport region. That is, the viewport is a region centered on a viewpoint, and the size and shape of the region may be determined by a field of view (FOV). Accordingly, the reception device 10004 may extract the viewport information based on a vertical or horizontal FOV supported by the device as well as the head orientation information. In addition, the reception device 10004 may perform gaze analysis or the like based on the head orientation information and/or the viewport information to determine the way the user consumes a point cloud video, a region that the user gazes at in the point cloud video, and the gaze time. According to embodiments, the reception device 10004 may transmit feedback information including the result of the gaze analysis to the transmission device 10000. According to embodiments, a device such as a VR/XR/AR/MR display may extract a viewport region based on the position/orientation of a user's head and a vertical or horizontal FOV supported by the device. According to embodiments, the head orientation information and the viewport information may be referred to as feedback information, signaling information, or metadata.

The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The feedback information may not only be transmitted to the transmitting side, but also be consumed by the receiving side. That is, the point cloud content providing system may process (encode/decode/render) point cloud data based on the feedback information. For example, the point cloud video decoder 10006 and the renderer 10007 may preferentially decode and render only the point cloud video for a region currently viewed by the user, based on the feedback information, that is, the head orientation information and/or the viewport information.

The reception device 10004 may transmit the feedback information to the transmission device 10000. The transmission device 10000 (or the point cloud video encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmitting device, a transmitter, a transmission system, or the like, and the reception device 10004 may be called a decoder, a receiving device, a receiver, a reception system, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
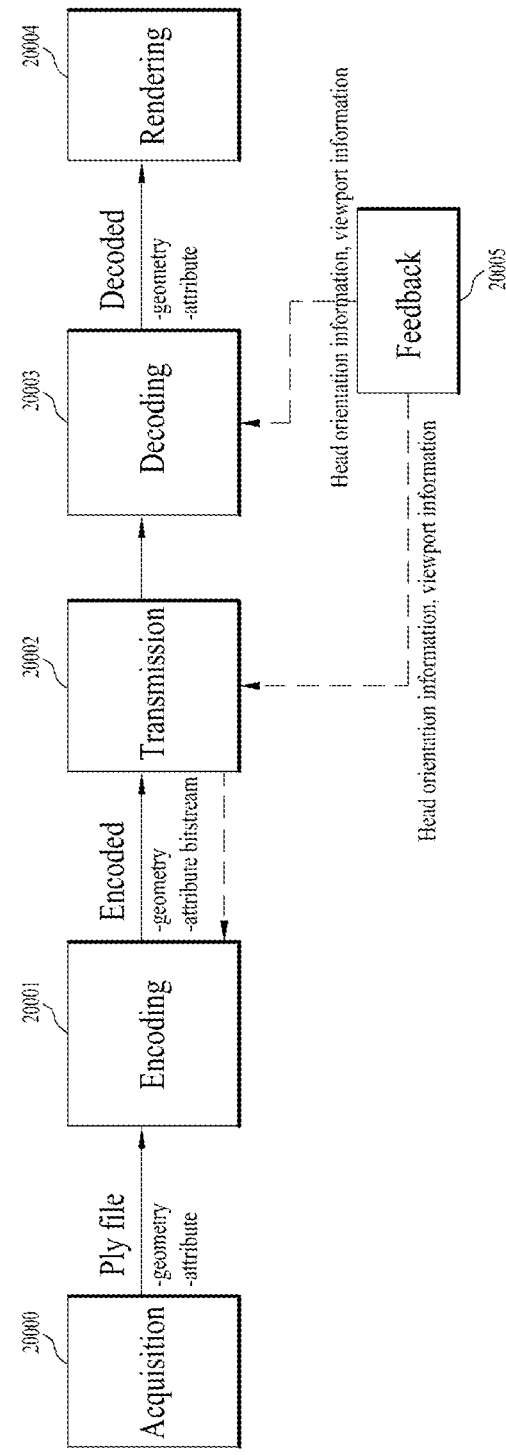
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquisition unit 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquisition unit 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
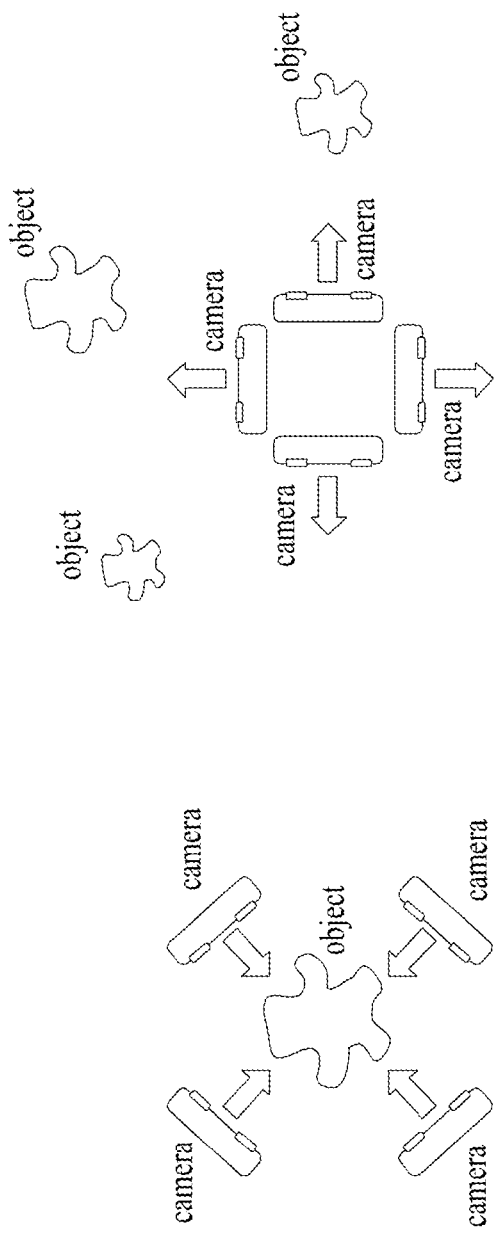
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
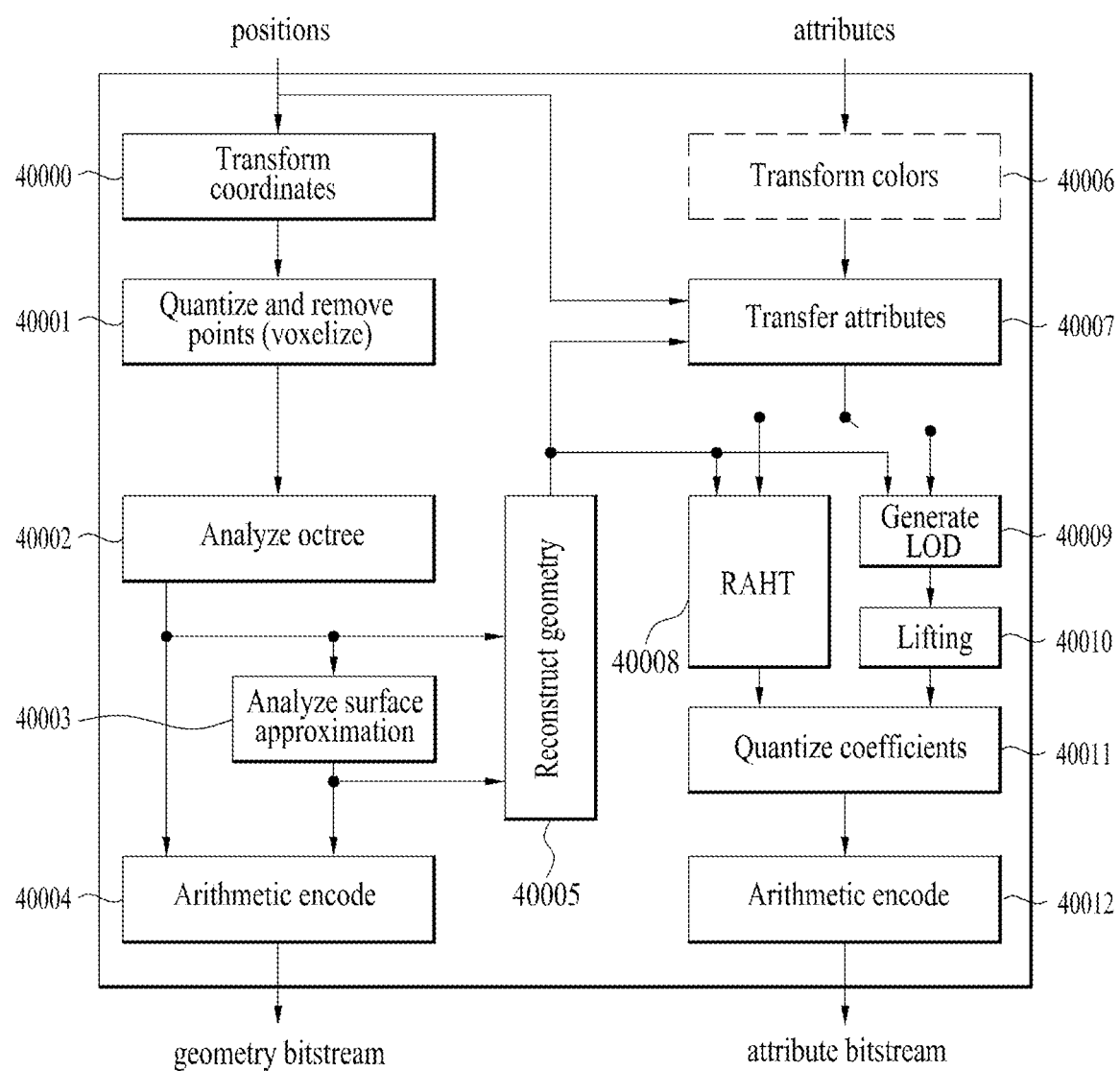
FIG. 4 illustrates an exemplary block diagram of point cloud video encoder according to embodiments.

FIG. 4 illustrates an exemplary point cloud video encoder according to embodiments.

FIG. 4 shows an example of the point cloud video encoder 10002 of FIG. 1. The point cloud video encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 to 2, the point cloud video encoder may perform geometry encoding and attribute encoding. The geometry encoding is performed before the attribute encoding.

The point cloud video encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometric reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. The voxelization means a minimum unit representing position information in 3D spacePoints of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center point of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD). The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud video encoder of FIG. 4 may be implemented by hardware including one or more processors or integrated circuits configured to communicate with one or more memories included in the point cloud content providing apparatus, software, firmware, or a combination thereof. The one or more processors may perform at least one of the operations and/or functions of the elements of the point cloud video encoder of FIG. 4 described above. Additionally, the one or more processors may operate or execute a set of software programs and/or instructions for performing the operations and/or functions of the elements of the point cloud video encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
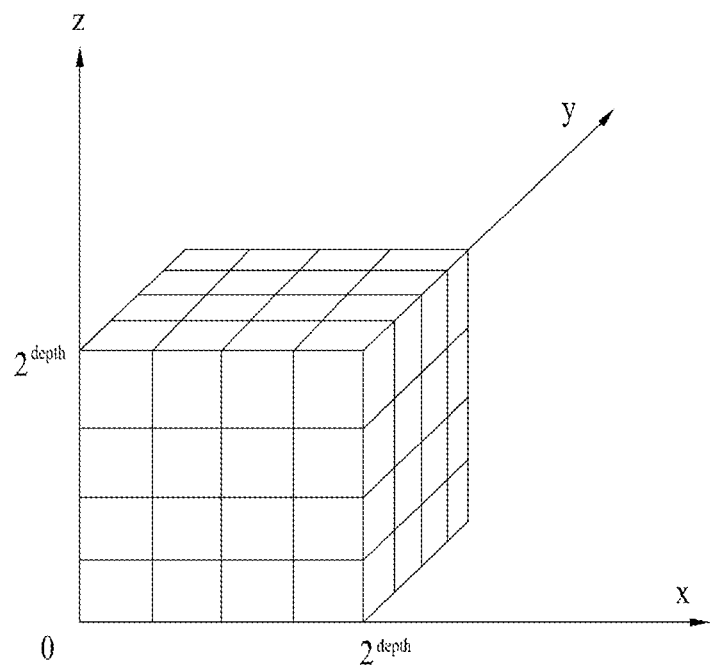
FIG. 5 illustrates an example of voxels in a 3D space according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud video encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the octree analyzer 40002 of the point cloud video encoder performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, $2^d$ may be set to a value constituting the smallest bounding box surrounding all points of the point cloud content (or point cloud video). Here, d denotes the depth of the octree. The value of d is determined in Equation 1. In Equation 1, ($x^{int}_n$, $y^{int}_n$, $z^{int}_n$) denotes the positions (or position values) of quantized points.

$$d = \text{Ceil}(\text{Log } 2(\text{Max}(x^{int}_n, y^{int}_n, z^{int}_n, n=1, \ldots N)+1)) \quad \text{[Equation 1]}$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud video encoder (for example, the arithmetic encoder 40004) according to the embodiments may perform entropy encoding on the occupancy codes. In order to increase the compression efficiency, the point cloud video encoder may perform intra/inter-coding on the occupancy codes. The reception device (for example, the reception device 10004 or the point cloud video decoder 10006) according to the embodiments reconstructs the octree based on the occupancy codes.

The point cloud video encoder (for example, the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud video encoder according to the embodiments may skip voxelization and perform direct coding to directly code the positions of points included in the specific region. The coordinates of a direct coding point according to the embodiments are referred to as direct coding mode (DCM). The point cloud video encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud video decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud video encoder (or the arithmetic encoder 40004) according to the embodiments may perform entropy coding on the positions (or position values) of the points.

The point cloud video encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud video encoder according to the embodiments may specify a level at which trisoup geometry encoding is to be applied. For example, when the specific level is equal to the depth of the octree, the point cloud video encoder does not operate in the trisoup mode. In other words, the point cloud video encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud video encoder according to the embodiments may perform entropy encoding on the starting point (x, y, z) of the edge, the direction vector ($\Delta x$, $\Delta y$, $\Delta z$) of the edge, and the vertex position value (relative position value within the edge). When the trisoup geometry encoding is applied, the point cloud video encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed according to Equation 2 by: i) calculating the centroid value of each vertex, ii) subtracting the center value from each vertex value, and iii) estimating the sum of the squares of the values obtained by the subtraction.

$$\text{(1)}\begin{bmatrix}\mu_x\\\mu_y\\\mu_z\end{bmatrix}=\frac{1}{n}\sum_{i=1}^{n}\begin{bmatrix}x_i\\y_i\\z_i\end{bmatrix}\;\text{(2)}\begin{bmatrix}\overline{x}_i\\\overline{y}_i\\\overline{z}_i\end{bmatrix}-\begin{bmatrix}\mu_x\\\mu_y\\\mu_Z\end{bmatrix}\;\text{(3)}\begin{bmatrix}\sigma_x^2\\\sigma_y^2\\\sigma_z^2\end{bmatrix}=\sum_{i=1}^{n}\begin{bmatrix}\overline{x}_i^2\\\overline{y}_i^2\\\overline{z}_i^2\end{bmatrix} \quad\text{[Equation 2]}$$

Then, the minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through atan 2(bi, ai), and the vertices are ordered based on the value of θ. The table 1 below shows a combination of vertices for creating a triangle according to the number of the vertices. The vertices are ordered from 1 to n. The table 1 below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 1

| n | Triangles formed from vertices ordered 1, ..., n |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |

TABLE 1-continued

Triangles formed from vertices ordered 1, . . . , n

| n | Triangles |
|---|---|
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud video encoder according to the embodiments may voxelize the refined vertices. In addition, the point cloud video encoder may perform attribute encoding based on the voxelized positions (or position values).

FIG. 7 shows an example of a neighbor node pattern according to embodiments.

In order to increase the compression efficiency of the point cloud video, the point cloud video encoder according to the embodiments may perform entropy coding based on context adaptive arithmetic coding.

As described with reference to FIGS. 1 to 6, the point cloud content providing system or the point cloud video encoder 10002 of FIG. 1, or the point cloud video encoder or arithmetic encoder 40004 of FIG. 4 may perform entropy coding on the occupancy code immediately. In addition, the point cloud content providing system or the point cloud video encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 2³=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud video encoder according to the embodiments determines occupancy of neighbor nodes of each node of the octree and obtains a value of a neighbor pattern. The neighbor node pattern is used to infer the occupancy pattern of the node. The up part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The down part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud video encoder may perform coding according to the neighbor node pattern value (for example, when the neighbor node pattern value is 63, 64 kinds of coding may be performed). According to embodiments, the point cloud video encoder may reduce coding complexity by changing a neighbor node pattern value (for example, based on a table by which 64 is changed to 10 or 6).

Figure 8:
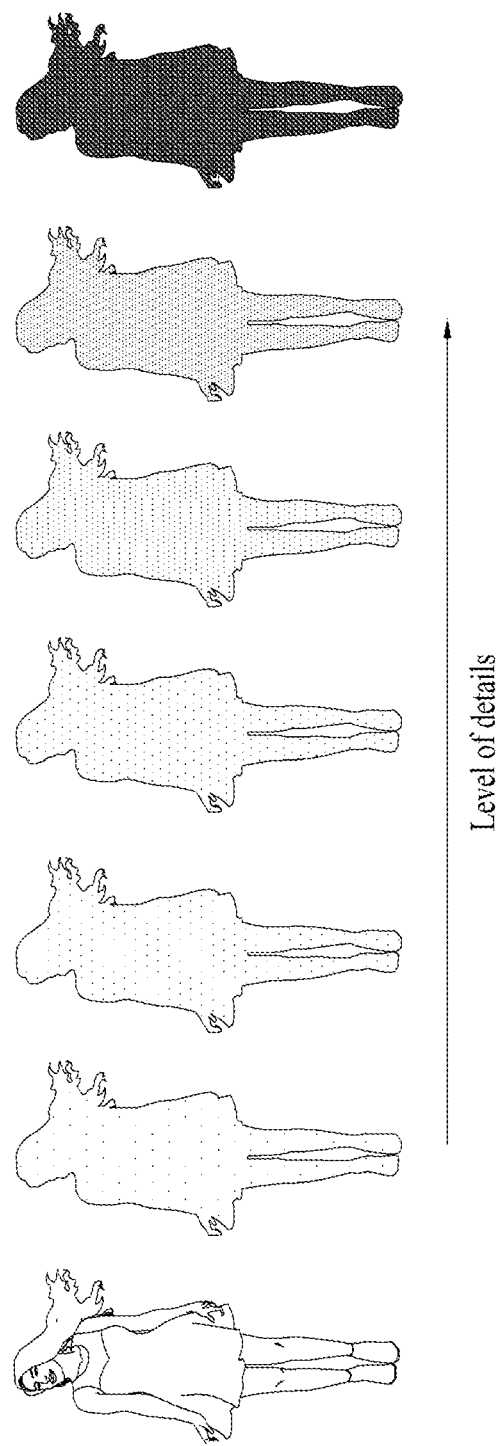
FIG. 8 illustrates an example of point configuration of a point cloud content for each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, upsampling, and voxelization. Since the attribute depends on the geometry, attribute encoding is performed based on the reconstructed geometry.

The point cloud video encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
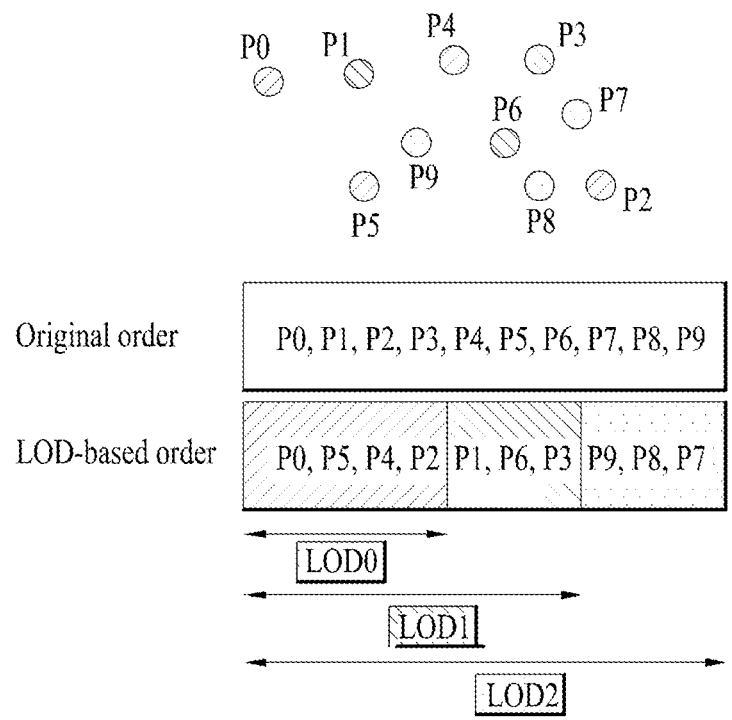
FIG. 9 illustrates an example of point configuration of a point cloud content for each LOD according to embodiments.

FIG. 9 illustrates an example of point configuration for each LOD according to embodiments.

As described with reference to FIGS. 1 to 8, the point cloud content providing system, or the point cloud video encoder (for example, the point cloud video encoder 10002 of FIG. 1, the point cloud video encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud video encoder, but also by the point cloud video decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud video encoder according to the embodiments may perform prediction transform coding based on LOD, lifting transform coding based on LOD, and RAHT transform coding selectively or in combination.

The point cloud video encoder according to the embodiments may generate a predictor for points to perform prediction transform coding based on LOD for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud video encoder according to the embodiments (for example, the coefficient quantizer 40011) may quantize and inversely quantize the residual of each point (which may be called residual attribute, residual attribute value, attribute prediction residual value or prediction error attribute value and so on) obtained by subtracting a predicted attribute (or attribute value) each point from the attribute (i.e., original attribute value) of each point. The quantization process performed for a residual attribute value in a transmission device is configured as shown in table 2. The inverse quantization process performed for a residual attribute value in a reception device is configured as shown in table 3.

TABLE 2

```
int PCCQuantization(int value, int quantStep) {
if( value >=0) {
return floor(value / quantStep + 1.0 / 3.0);
} else {
return -floor(-value / quantStep + 1.0 / 3.0);
}
}
```

TABLE 3

```
int PCCInverseQuantization(int value, int quantStep) {
if( quantStep ==0) {
return value;
} else {
return value * quantStep;
}
}
```

When the predictor of each point has neighbor points, the point cloud video encoder (e.g., the arithmetic encoder 40012) according to the embodiments may perform entropy coding on the quantized and inversely quantized residual values as described above. When the predictor of each point has no neighbor point, the point cloud video encoder according to the embodiments (for example, the arithmetic encoder 40012) may perform entropy coding on the attributes of the corresponding point without performing the above-described operation.

The point cloud video encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud video encoder (e.g., coefficient quantizer 40011) according to the embodiments quantizes the predicted attribute values. In addition, the point cloud video encoder (e.g., the arithmetic encoder 40012) performs entropy coding on the quantized attribute values.

The point cloud video encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud video encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

Equation 3 below represents a RAHT transformation matrix. In Equation 3, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ h_{l_{2x+1,y,z}} \end{bmatrix} T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$ [Equation 3]

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 40012). The weights are calculated as $w_{l-1_{x,y,z}} = w_{l_{2x,y,z}} + w_{l_{2x+1,y,z}}$. The root node is created through the $g_{1_{0,0,0}}$ and $g_{1_{0,0,1}}$ as Equation 4.

$$\begin{bmatrix} gDC \\ h_{0_{0,0,0}} \end{bmatrix} = T_{w1000w1001} \begin{bmatrix} g_{1_{0,0,0z}} \\ g_{1_{0,0,1}} \end{bmatrix}$$ [Equation 4]

The value of gDC is also quantized and subjected to entropy coding like the high-pass coefficients.

Figure 10:
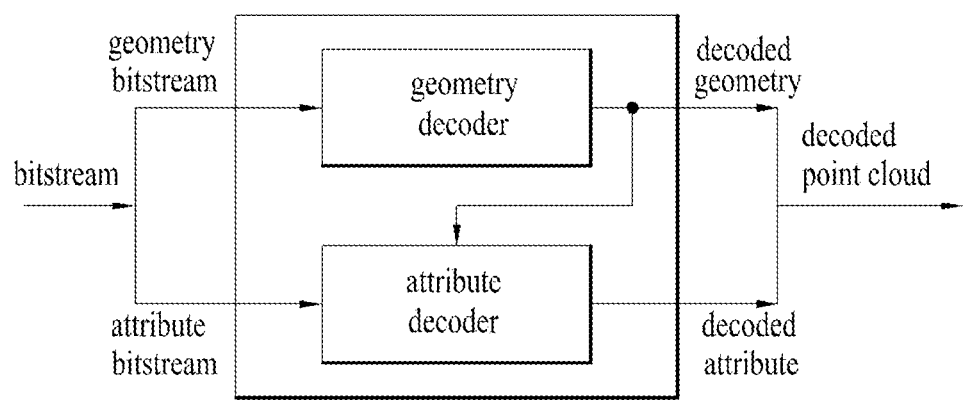
FIG. 10 illustrates an example of a block diagram of a point cloud video decoder according to embodiments.

FIG. 10 illustrates a point cloud video decoder according to embodiments.

The point cloud video decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud video decoder may receive a geometry bitstream and an attribute bitstream contained in one or more bitstreams. The point cloud video decoder includes a geometry decoder and an attribute decoder. The geometry decoder performs geometry decoding on the geometry bitstream and outputs decoded geometry. The attribute decoder performs attribute decoding on the attribute bitstream based on the decoded geometry, and outputs decoded attributes. The decoded geometry and decoded attributes are used to reconstruct point cloud content (a decoded point cloud).

Figure 11:
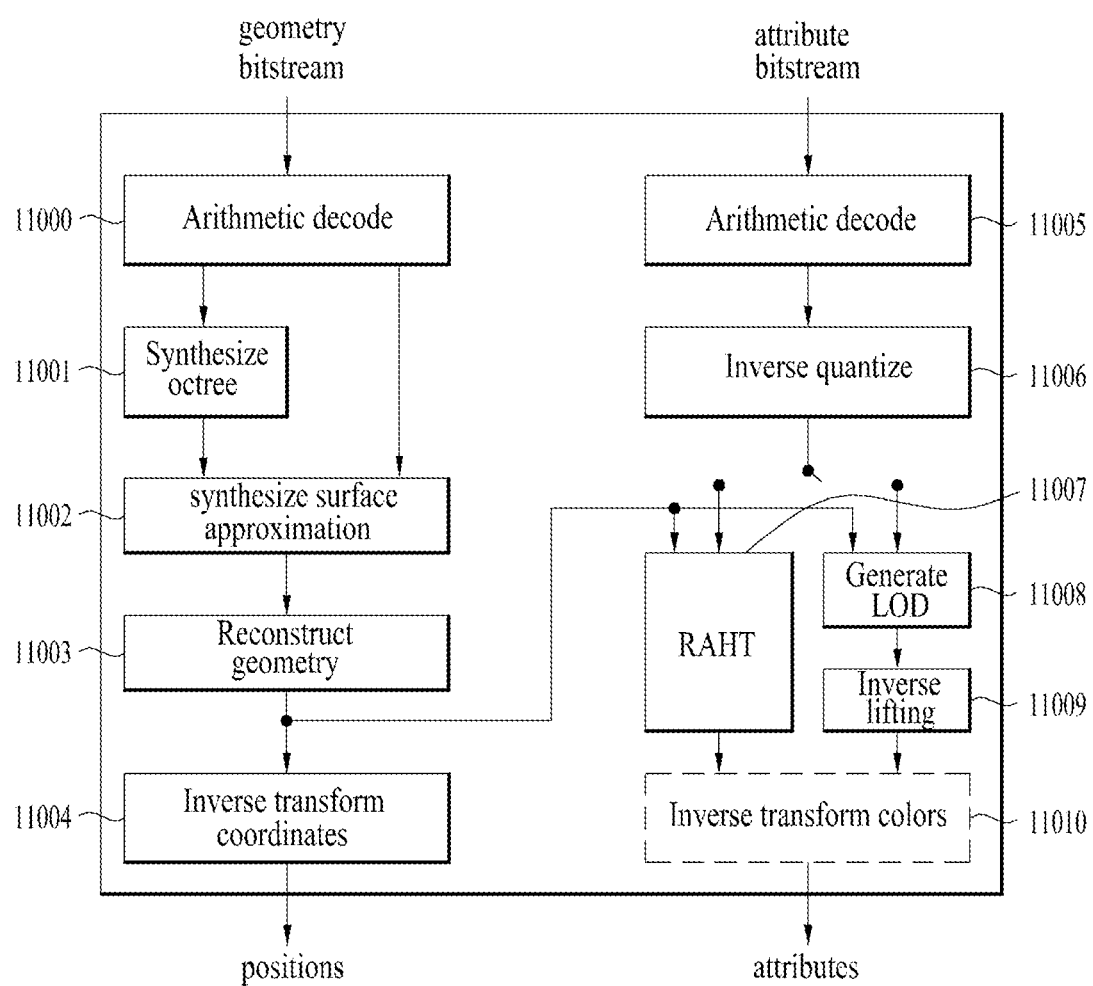
FIG. 11 illustrates an example of a point cloud video decoder according to embodiments.

FIG. 11 illustrates a point cloud video decoder according to embodiments.

The point cloud video decoder illustrated in FIG. 11 is an example of the point cloud video decoder illustrated in FIG. 10, and may perform a decoding operation, which is an inverse process of the encoding operation of the point cloud video encoder illustrated in FIGS. 1 to 9.

As described with reference to FIGS. 1 and 10, the point cloud video decoder may perform geometry decoding and attribute decoding. The geometry decoding is performed before the attribute decoding.

The point cloud video decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct decoding and trisoup geometry decoding. The direct decoding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud video encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud video encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud video encoder.

Although not shown in the figure, the elements of the point cloud video decoder of FIG. 11 may be implemented by hardware including one or more processors or integrated circuits configured to communicate with one or more memories included in the point cloud content providing apparatus, software, firmware, or a combination thereof. The one or more processors may perform at least one or more of the operations and/or functions of the elements of the point cloud video decoder of FIG. 11 described above. Additionally, the one or more processors may operate or execute a set of software programs and/or instructions for performing the operations and/or functions of the elements of the point cloud video decoder of FIG. 11.

Figure 12:
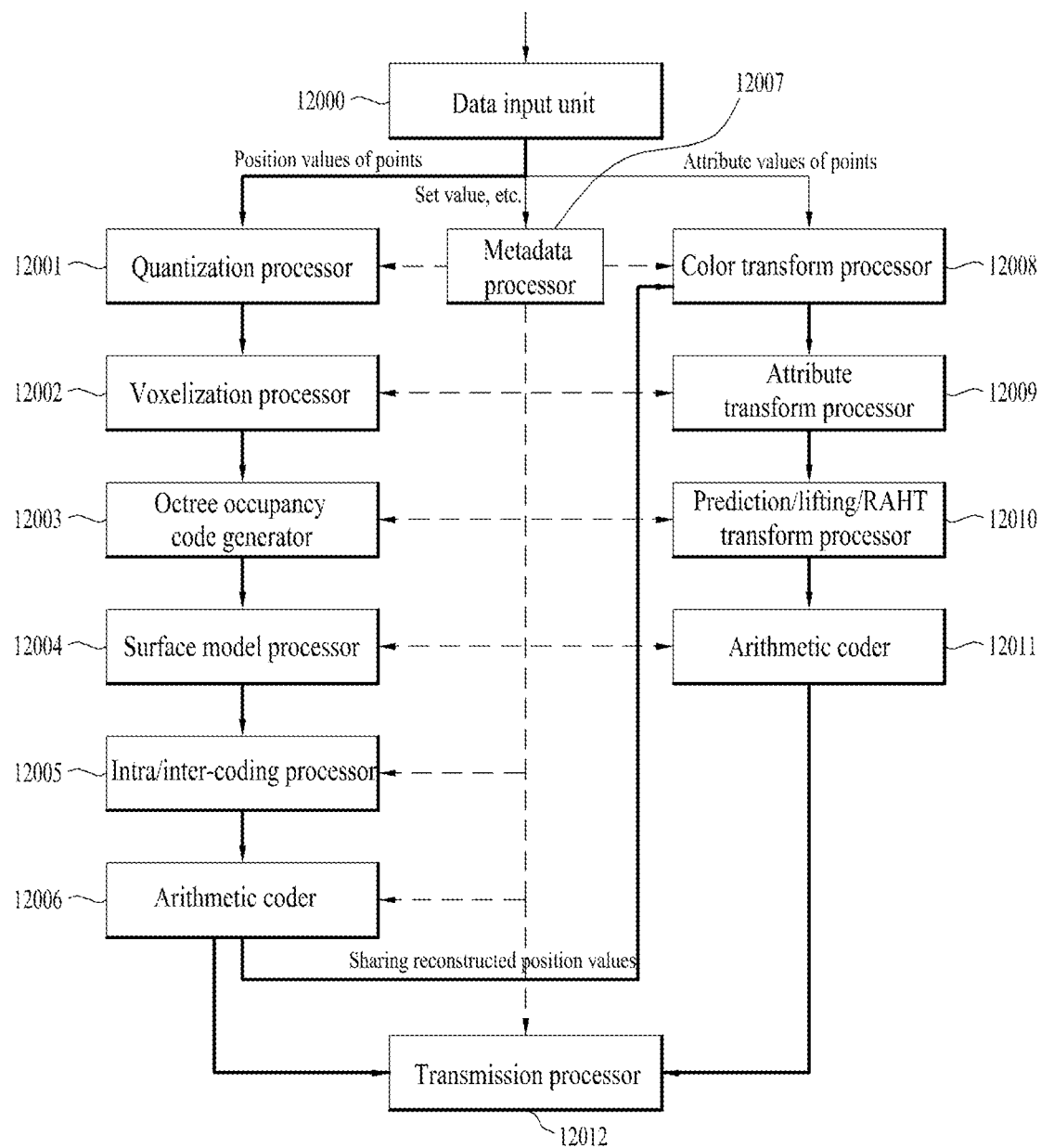
FIG. 12 illustrates a configuration for point cloud video encoding of a transmission device according to embodiments.

FIG. 12 illustrates a transmission device according to embodiments.

The transmission device shown in FIG. 12 is an example of the transmission device 10000 of FIG. 1 (or the point cloud video encoder of FIG. 4). The transmission device illustrated in FIG. 12 may perform one or more of the operations and methods the same as or similar to those of the point cloud video encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquisition unit 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud video encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud video encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 40012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS or tile inventory) for signaling of a tile level, and slice data. The slice data may include information about one or more slices. One slice according to embodiments may include one geometry bitstream Geom00 and one or more attribute bitstreams Attr00 and Attr10. The TPS (or tile inventory) according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
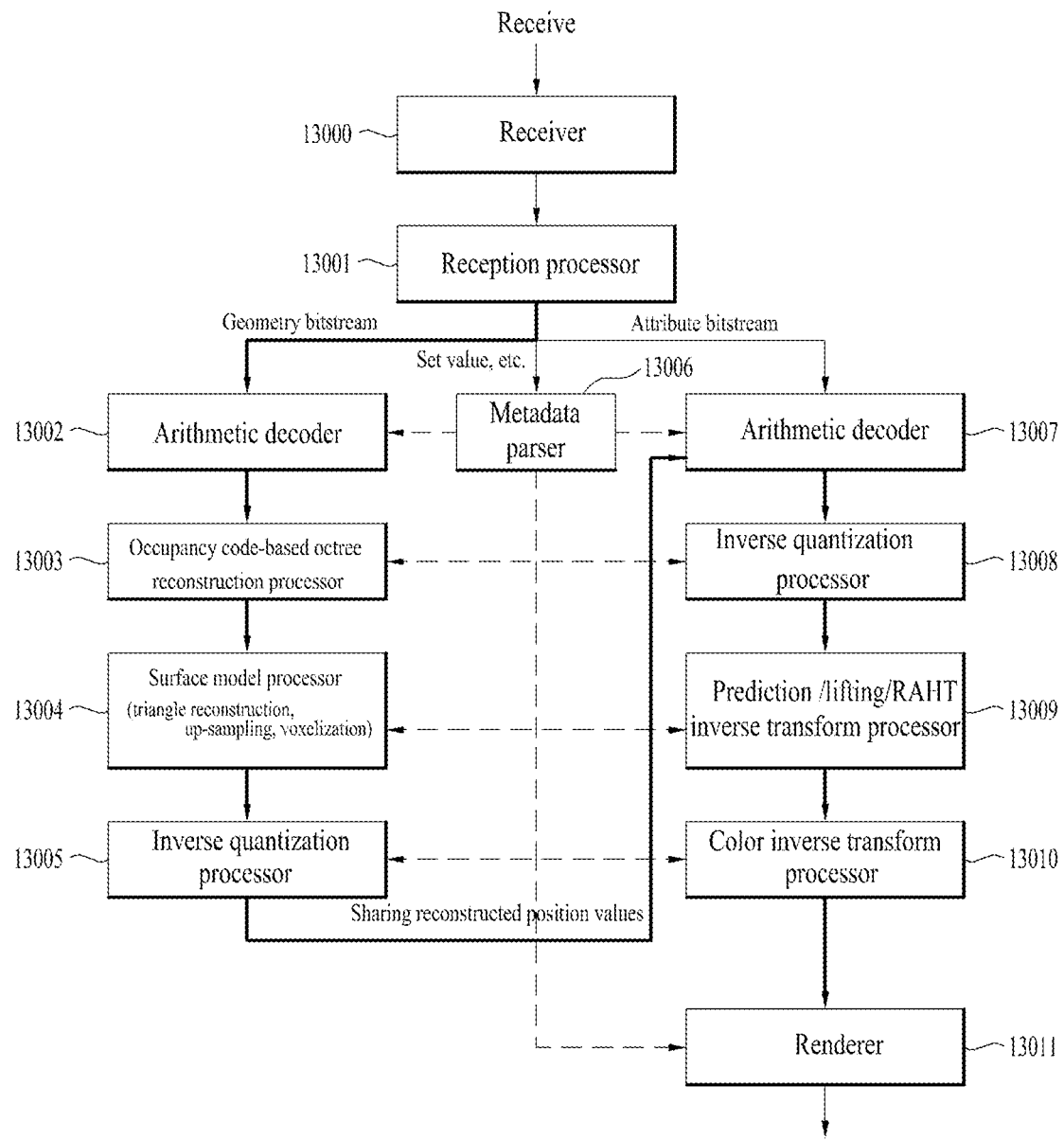
FIG. 13 illustrates a configuration for point cloud video decoding of a reception device according to embodiments.

FIG. 13 illustrates a reception device according to embodiments.

The reception device illustrated in FIG. 13 is an example of the reception device 10004 of FIG. 1 (or the point cloud video decoder of FIGS. 10 and 11). The reception device illustrated in FIG. 13 may perform one or more of the operations and methods the same as or similar to those of the point cloud video decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 1302 according to the embodiments may perform trisoup geometry decoding and related geometry reconstruction (for example, triangle reconstruction, up-sampling, voxelization) based on the surface model method. The surface model processor 1302 performs an operation the same as or similar to that of the surface approximation synthesizer 11002 and/or the geometry reconstructor 11003.

The inverse quantization processor 1305 according to the embodiments may inversely quantize the decoded geometry.

The metadata parser 1306 according to the embodiments may parse metadata contained in the received point cloud data, for example, a set value. The metadata parser 1306 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 1301 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
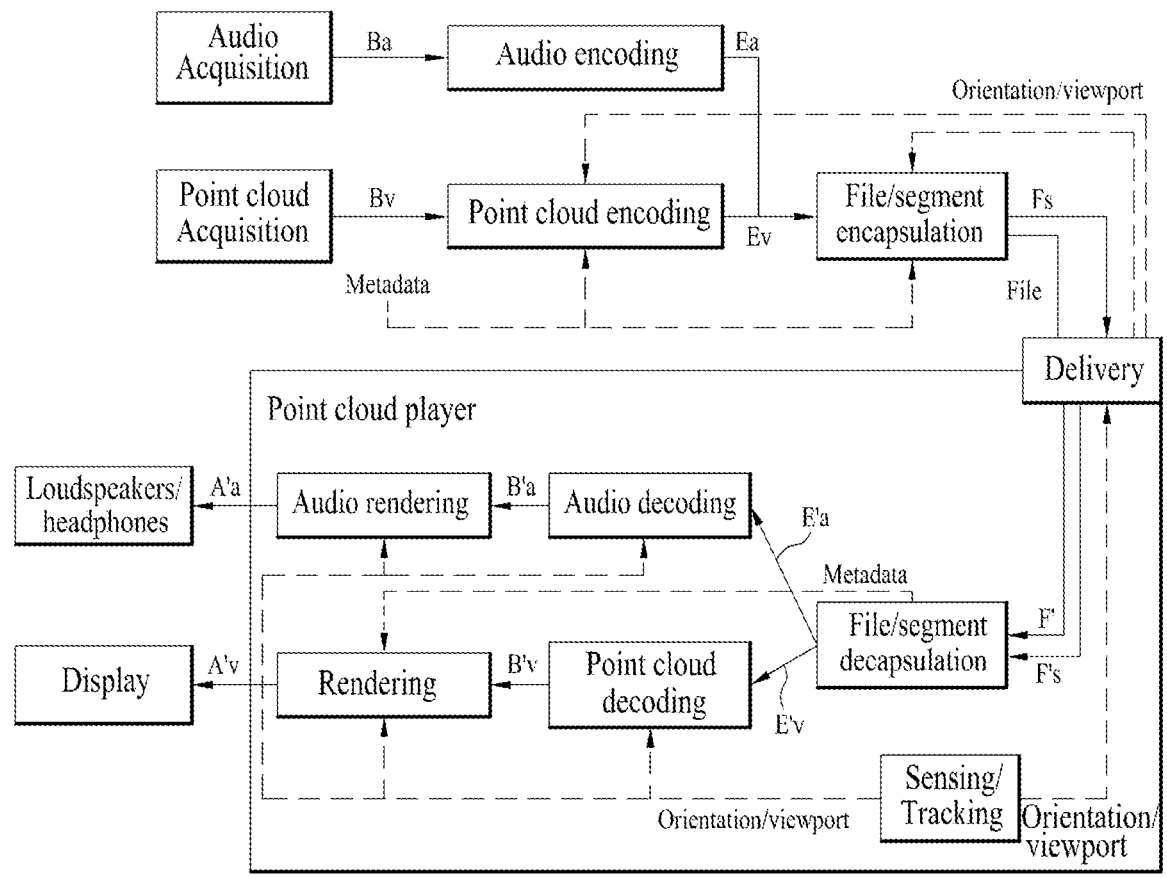
FIG. 14 illustrates an architecture for storing and streaming of G-PCC-based point cloud data according to embodiments.

FIG. 14 shows an overall architecture for storing or streaming of point cloud data compressed based on G-PCC according to embodiments. According to embodiments, FIG. 14 shows an architecture for storing and streaming of point cloud data that supports various services such as VR, AR, MR, and autonomous driving for a user.

In the overall architecture for providing point cloud video described above, point cloud data that undergoes a series of processes of acquisition/encoding/transmission/decoding/rendering may be referred to as point cloud content data or point cloud video data. According to embodiments, the term point cloud content data may also be used as a concept covering metadata or signaling information related to the point cloud data.

According to embodiments, the process of storing and streaming point cloud data may include an acquisition process, an encoding process, a transmission process, a decoding process, a rendering process, and/or a feedback process.

The transmission device shown in the upper part of FIG. 14 may include an acquirer, a point cloud video encoder, and a file/segment encapsulator, and represents a process in which the transmission device described with reference to FIGS. 1 to 13 (for example, the transmission device 10000, the transmission device, or the like) processes and transmits point cloud content.

As described with reference to FIGS. 1 to 13, the transmission device may acquire audio Ba of the point cloud content (Audio Acquisition), encode the acquired audio, and output audio bitstreams Ea. In addition, the transmission device may acquire a point cloud (or point cloud video) By of the point cloud content (Point Acquisition), and perform point cloud video encoding on the acquired point cloud to output point cloud video bitstreams Ev. That is, data (encoded video/image information) on which the point cloud video encoding is performed by the point cloud video encoder of the transmission device through a series of procedures including prediction, transformation, quantization, and entropy coding may be output in the form of a bitstream. The point cloud video encoding of the transmission device is the same as or similar to the point cloud video encoding described with reference to FIGS. 1 to 13 (for example, the encoding of the point cloud encoder of FIG. 4), and thus a detailed description thereof is skipped.

The file/segment encapsulator of the transmission device may encapsulate the generated audio bitstreams and video bitstreams or point cloud related metadata into a file and/or a segment for streaming. The metadata represents signaling information related to content for a point cloud. For example, the metadata may include initial viewing orientation metadata. As another example, the metadata may include information for identifying whether the point cloud data is data indicating the front or the data indicating the back and information related to a capture or the like. Here, the point cloud related metadata may be received from the metadata processor (see FIG. 12). The metadata processor may be included in the point cloud video encoder, or may be configured as a separate component/module. The encapsulated file and/or segment Fs, File may include a file in a file format such as ISOBMFF or a dynamic adaptive streaming over HTTP (DASH) segment. According to embodiments, the point cloud-related metadata may be contained in the encapsulated file format and/or segment. The point cloud-related metadata may be contained in boxes of various levels in the ISOBMFF (ISO International Standards Organization Base Media File Format) file format, or may be contained in a separate track in the file. According to an embodiment, the file/segment encapsulator may encapsulate the point cloud related metadata as a separate file. The transmission device (or transmission processor) according to the embodiments may deliver the point cloud bitstream or a file and/or segment containing the point cloud bitstream to a reception device over a digital storage medium or a network. The transmission device may perform processing according to any transmission protocol for transmission. Data processed for transmission by the transmission device may be delivered over a broadcasting network and/or a broadband. These data may be delivered to the receiving side in an on-demand manner. According to embodiments, the digital storage media may include various storage media such as USB, SD, CD, DVD, Blu-ray, HDD, and SSD. The encapsulation and transmission processing method of the transmission device is the same as that described with reference to FIGS. 1 to 13

(for example, the transmitter 10003, the transmission operation 20002 of FIG. 2, etc.), a detailed description thereof is skipped.

The reception device in the lower part of FIG. 14 may include a file/segment decapsulator, a point cloud video decoder, a renderer, and a sensing/tracking unit. The lower part of FIG. 14 illustrates the process in which the reception device described with reference to FIGS. 1 to 13 (e.g., the reception device of FIG. 13) processes and outputs point cloud content.

According to embodiments, the reception device may include a device configured to output final audio data and final video data (e.g., loudspeakers, headphones, a display), and a point cloud player configured to process point cloud content. The final data output device and the point cloud player may be configured as separate physical devices. The point cloud player may perform geometry-based point cloud compression (G-PCC) coding, and/or video based point cloud compression (V-PCC) coding, and/or next-generation coding.

According to embodiments, the file/segment decapsulator of the reception device may decapsulate point cloud data received in the form of a file and/or a segment over a broadcasting network, a broadband, or a digital storage medium. According to embodiments, the file/segment decapsulator may acquire a point cloud bitstream and/or point cloud related metadata (or a separate metadata bitstream) by decapsulating an ISOBMFF file. The acquired point cloud bitstream may be transmitted to the point cloud video decoder, and the acquired point cloud related metadata (or metadata bitstream) may be transmitted to the metadata parser (see FIG. 13). The point cloud bitstream may include the point cloud related metadata (or metadata bitstream). The metadata parser may be included in the point cloud video decoder or may be configured as a separate component/module. The point cloud related metadata acquired by the file/segment decapsulator may be contained in boxes of various levels in a file format or in a separate track in the file. When necessary, the file/segment decapsulator may receive metadata necessary for decapsulation from the metadata parser. The point cloud related metadata may be delivered to the point cloud video decoder so as to be used for a point cloud decoding procedure, or may be delivered to the renderer so as to be used for a point cloud rendering procedure. That is, the reception device may perform at least one of decapsulation, audio decoding, audio rendering, video decoding, or video rendering based on the metadata. The metadata is similar to or the same as that described with reference to FIGS. 12 and 13. Thus, for parts of the metadata that are not described, refer to the description of FIGS. 12 and 13. The reception and decapsulation methods of the reception device are the same or similar to those described with reference to FIGS. 1 to 13 (for example, the receiver 10005, the receiver 13000, and the reception processor 13001). Thus, for parts of the metadata that are not described, refer to the description of FIGS. 1 to 13.

The reception device according to the embodiments secures an audio bitstream E'a included in the file and/or segment. As shown in the figure, the reception device performs audio decoding on the audio bitstream E'a and outputs decoded audio data B'a. Then, the reception device performs audio rendering on the decoded audio data, and outputs the final audio data A'a through a loudspeaker, a headphone, or the like.

The point cloud video decoder of the reception device performs point cloud video decoding on a video bitstream E'v provided from the file/segment decapsulator, and outputs decoded video data B'v. The point cloud video decoding according to the embodiments is the same as or similar to the point cloud video decoding described with reference to FIGS. 1 to 13 (for example, the decoding by the point cloud video decoder in FIG. 11), a detailed description thereof is skipped.

According to embodiments, the renderer of the reception device may render the decoded video data B'v in 3D space. According to embodiments, the rendered video/image may be displayed through the display. The user may view all or part of the rendered result through a VR/XR/AR/MR display or a general display.

According to embodiments, the sensing/tracking unit of the reception device acquires (or generates or extracts) head orientation information and/or viewport information from the user or the receiving side or calculates the same, and delivers the same to the point cloud video encoder or the file/segment encapsulator of the transmission device through the file/segment decapsulator the point cloud video decoder, or the renderer of the reception device, and/or a feedback channel. The head orientation information may indicate information about the position, angle, motion, and the like of the user's head, or may indicate information about the position, angle, and motion of a viewing device of the user. Based on this information, information on a region currently being viewed by the user in 3D space, that is, viewport information may be calculated.

According to embodiments, the viewport information may be information about a region currently viewed in 3D space by the user through a device or an HMD. A device such as a VR/XR/AR/MR display may extract the viewport region based on the head orientation information (i.e., the position/orientation of the user's head), a vertical or horizontal FOV supported by the device, and the like.

According to embodiments, the reception device receives all point cloud data based on the head orientation information and/or viewport information acquired by the sensing/tracking unit, or receive point cloud data indicated by the orientation information and/or viewport information (i.e., part of the point cloud data).

According to embodiments, the file/segment decapsulator, and/or the point cloud video decoder, and/or renderer of the reception device may decapsulate, decode, or render all point cloud data based on the head orientation information and/or viewport information acquired by the sensing/tracking unit, or may decapsulate, decode, or render point cloud data indicated by the orientation information and/or viewport information (i.e., part of point cloud data). That is, the file/segment decapsulator, and/or the point cloud video decoder, and/or renderer of the reception device may efficiently extract, decode or render only media data of a specific region, i.e., the region indicated by the head orientation information and/or viewport information from the file based on the head orientation information and/or viewport information. In other words, the decapsulation process, point cloud video decoding process, and rendering process of the reception device may be performed based on feedback information, such as the head orientation information and viewport information, and/or metadata. For example, point cloud data about a region currently viewed by the user may be preferentially decapsulated, decoded, and rendered based on the head orientation information and/or the viewport information.

According to embodiments, the point cloud video encoder and/or the file/segment encapsulator of the transmission device may efficiently encode only media data of a specific region, i.e., a region indicated by the head orientation information and/or viewport information or generate and transmit a file based on the head orientation information and/or viewport information acquired and fed back by the sensing/tracking unit. That is, the point cloud video encoder of the transmission device may encode all the point cloud data based on the head orientation information and/or the viewport information, or encode point cloud data indicated by the head orientation information and/or the viewport information (i.e., part of the point cloud data). The file/segment encapsulator may encapsulate all the point cloud data based on the head orientation information and/or viewport information fed back, or encapsulate point cloud data indicated by the head orientation information and/or viewport information (i.e., part of the point cloud data). In addition, the transmission device may deliver all the point cloud data based on the head orientation information and/or viewport information fed back, or deliver point cloud data (i.e., part of the point cloud data) indicated by the orientation information and/or viewport information.

According to embodiments, interactivity may be provided in consumption of point cloud data through a feedback process. According to embodiments, the user may interact with those implemented in the VR/AR/MR/autonomous driving environment. In this case, information related to the interaction may be delivered as feedback information to the transmission device or the service provider. According to an embodiment, the feedback process of delivering feedback information may not be performed.

Details of the feedback information are the same as or similar to those described with reference to FIGS. 1 to 13. Thus, for parts not described herein, refer to the descriptions given above with reference to FIGS. 1 to 13.

Figure 15:
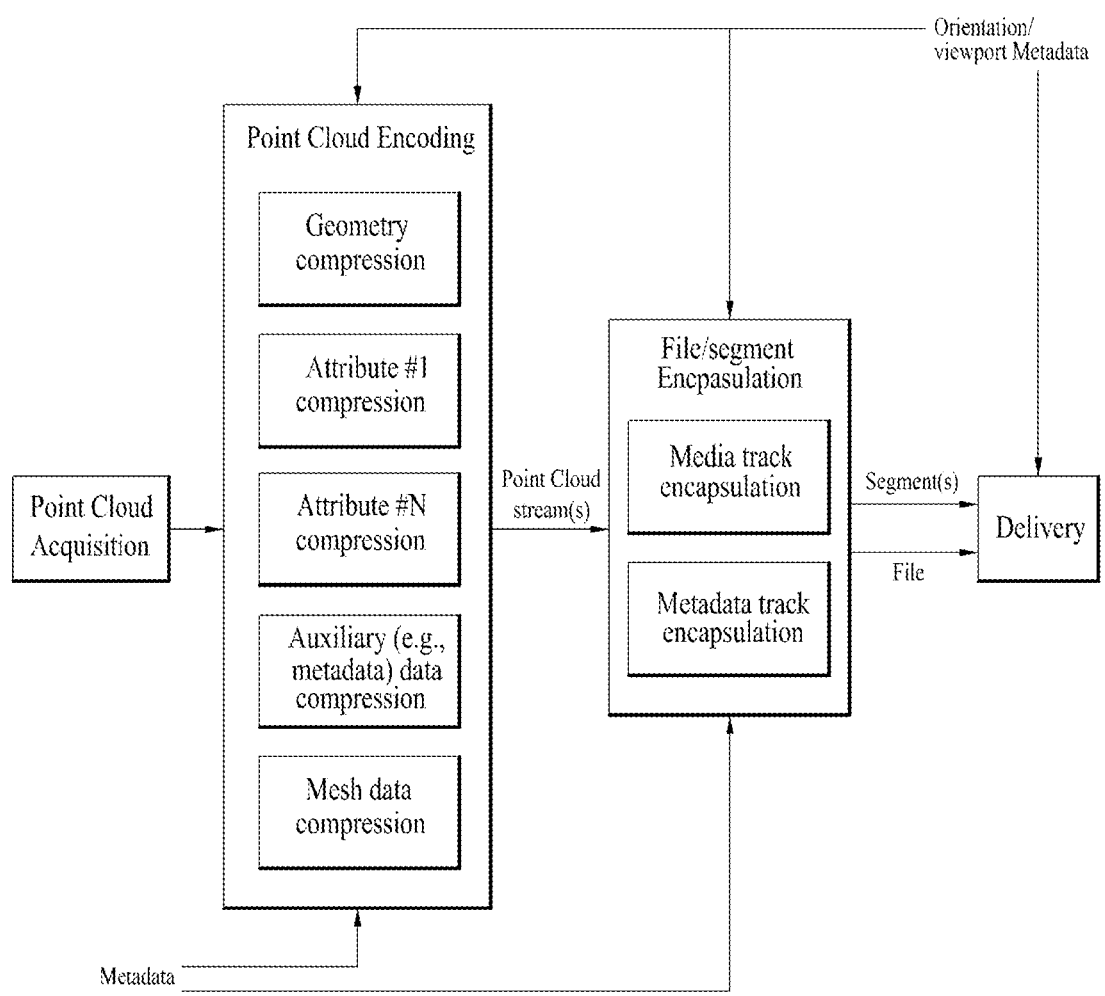
FIG. 15 illustrates an example of storage and transmission of point cloud data according to embodiments.

FIG. 15 shows an exemplary transmission device according to embodiments.

The transmission device of FIG. 15 is a device configured to transmit point cloud content, and corresponds to an example of the transmission device described with reference to FIGS. 1 to 14 (e.g., the transmission device 10000 of FIG. 1, the point cloud video encoder of FIG. 4, the transmission device of FIG. 12, the transmission device of FIG. 14). Accordingly, the transmission device of FIG. 15 performs an operation that is identical or similar to that of the transmission device described with reference to FIGS. 1 to 14.

The transmission device according to the embodiments may perform one or more of point cloud acquisition, point cloud video encoding, file/segment encapsulation and delivery.

Since the operation of point cloud acquisition and delivery illustrated in the figure is the same as or similar to the operation described with reference to FIGS. 1 to 14, a detailed description thereof will be omitted.

As described above with reference to FIGS. 1 to 14, the transmission device according to the embodiments may perform geometry encoding and attribute encoding. The geometry encoding may be referred to as geometry compression, and the attribute encoding may be referred to as attribute compression. As described above, one point may have one geometry and one or more attributes. Accordingly, the transmission device performs attribute encoding on each attribute. The figure illustrates that the transmission device performs one or more attribute compressions (attribute #1 compression, . . . , attribute #N compression). In addition, the transmission device according to the embodiments may perform auxiliary compression. The auxiliary compression is performed on the metadata. Details of the metadata are the same as or similar to those described with reference to FIGS. 1 to 14, and thus a description thereof will be omitted. The transmission device may also perform mesh data compression. The mesh data compression according to the embodiments may include the trisoup geometry encoding described with reference to FIGS. 1 to 14.

The transmission device according to the embodiments may encapsulate bitstreams (e.g., point cloud streams) output according to point cloud video encoding into a file and/or a segment. According to embodiments, the transmission device may perform media track encapsulation for carrying data (for example, media data) other than the metadata, and perform metadata track encapsulation for carrying metadata. According to embodiments, the metadata may be encapsulated into a media track.

As described with reference to FIGS. 1 to 14, the transmission device may receive feedback information (orientation/viewport metadata) from the reception device, and perform at least one of the point cloud video encoding, file/segment encapsulation, and delivery operations based on the received feedback information. Details are the same as or similar to those described with reference to FIGS. 1 to 14, and thus a description thereof will be omitted.

Figure 16:
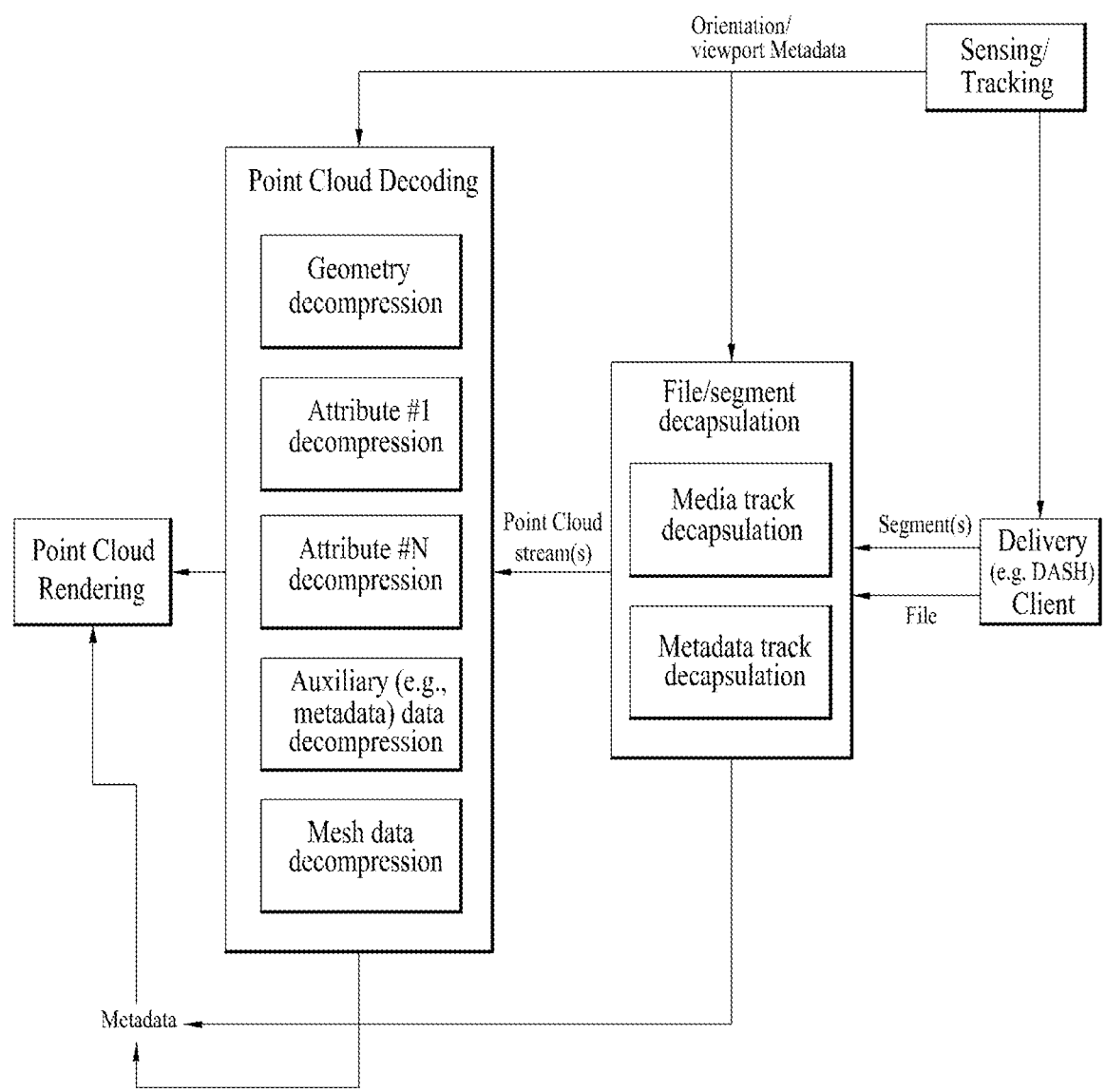
FIG. 16 illustrates an example of a reception device according to embodiments.

FIG. 16 shows an exemplary reception device according to embodiments.

The reception device of FIG. 16 is a device for receiving point cloud content, and corresponds to an example of the reception device described with reference to FIGS. 1 to 14 (for example, the reception device 10004 of FIG. 1, the point cloud video decoder of FIG. 11, and the reception device of FIG. 13, the reception device of FIG. 14). Accordingly, the reception device of FIG. 16 performs an operation that is identical or similar to that of the reception device described with reference to FIGS. 1 to 14. The reception device of FIG. 16 may receive a signal transmitted from the transmission device of FIG. 15, and perform a reverse process of the operation of the transmission device of FIG. 15.

The reception device according to the embodiments may perform at least one of delivery, file/segment decapsulation, point cloud video decoding, and point cloud rendering.

Since the point cloud reception and point cloud rendering operations illustrated in the figure are the same as those described with reference to FIGS. 1 to 14, a detailed description thereof will be omitted.

As described with reference to FIGS. 1 to 14, the reception device according to the embodiments decapsulate the file and/or segment acquired from a network or a storage device. According to embodiments, the reception device may perform media track decapsulation for carrying data (for example, media data) other than the metadata, and perform metadata track decapsulation for carrying metadata. According to embodiments, in the case where the metadata is encapsulated into a media track, the metadata track decapsulation is omitted.

As described with reference to FIGS. 1 to 14, the reception device may perform geometry decoding and attribute decoding on bitstreams (e.g., point cloud streams) secured through decapsulation. The geometry decoding may be referred to as geometry decompression, and the attribute decoding may be referred to as attribute decompression. As described above, one point may have one geometry and one or more attributes, each of which is encoded by the transmission device. Accordingly, the reception device performs attribute decoding on each attribute. The figure illustrates that the reception device performs one or more attribute decompressions (attribute #1 decompression, . . . , attribute #N decompression). The reception device according to the embodiments may also perform auxiliary decompression. The auxiliary decompression is performed on the metadata.

Details of the metadata are the same as those described with reference to FIGS. 1 to 14, and thus a disruption thereof will be omitted. The reception device may also perform mesh data decompression. The mesh data decompression according to the embodiments may include the trisoup geometry decoding described with reference to FIGS. 1 to 14. The reception device according to the embodiments may render the point cloud data that is output according to the point cloud video decoding.

As described with reference to FIGS. 1 to 14, the reception device may secure orientation/viewport metadata using a separate sensing/tracking element, and transmit feedback information including the same to a transmission device (for example, the transmission device of FIG. 15). In addition, the reception device may perform at least one of a reception operation, file/segment decapsulation, and point cloud video decoding based on the feedback information. Details are the same as those described with reference to FIGS. 1 to 14, and thus a description thereof will be omitted.

Figure 17:
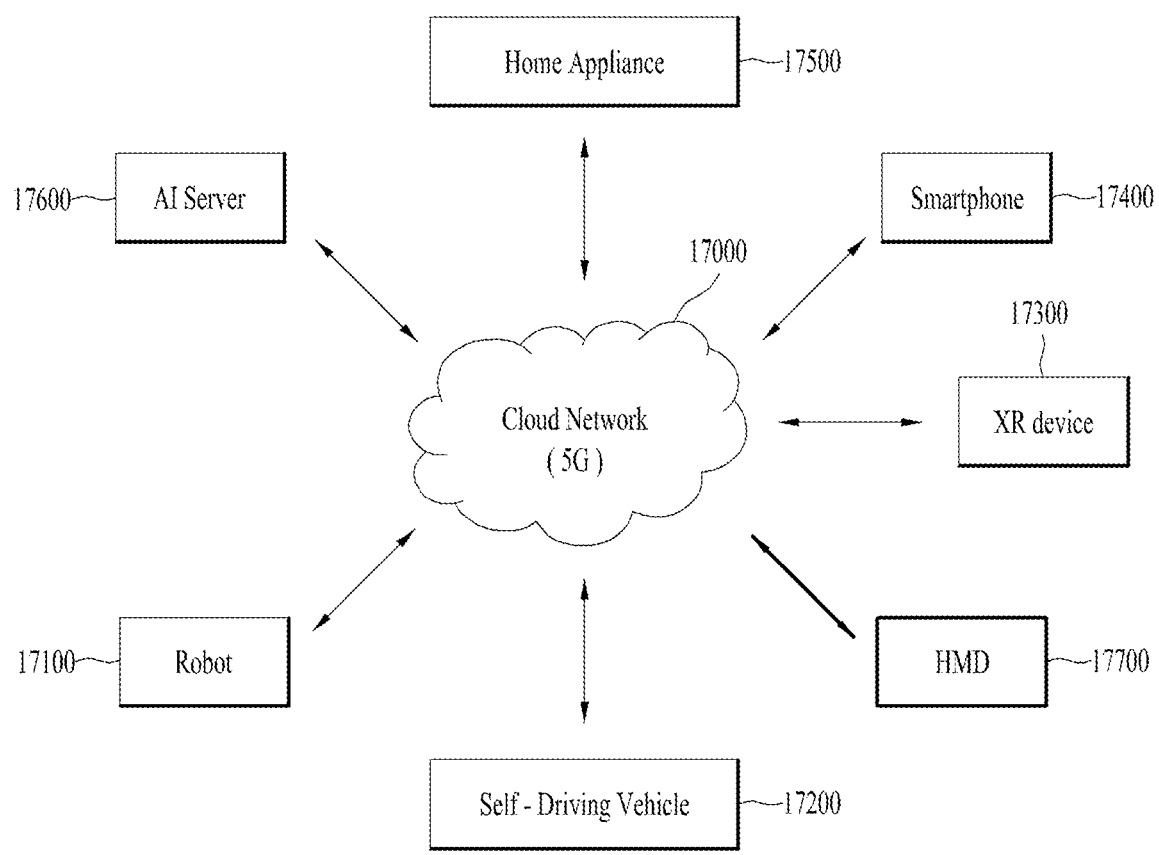
FIG. 17 illustrates an exemplary structure operatively connectable with a method/device for transmitting and receiving point cloud data according to embodiments.

FIG. 17 shows an exemplary structure operatively connectable with a method/device for transmitting and receiving point cloud data according to embodiments.

The structure of FIG. 17 represents a configuration in which at least one of a server 17600, a robot 17100, a self-driving vehicle 17200, an XR device 17300, a smartphone 17400, a home appliance 17500, and/or a head-mount display (HMD) 17700 is connected to a cloud network 17100. The robot 17100, the self-driving vehicle 17200, the XR device 17300, the smartphone 17400, or the home appliance 17500 is referred to as a device. In addition, the XR device 17300 may correspond to a point cloud compressed data (PCC) device according to embodiments or may be operatively connected to the PCC device.

The cloud network 17000 may represent a network that constitutes part of the cloud computing infrastructure or is present in the cloud computing infrastructure. Here, the cloud network 17000 may be configured using a 3G network, 4G or Long Term Evolution (LTE) network, or a 5G network.

The server 17600 may be connected to at least one of the robot 17100, the self-driving vehicle 17200, the XR device 17300, the smartphone 17400, the home appliance 17500, and/or the HMD 17700 over the cloud network 17000 and may assist in at least a part of the processing of the connected devices 17100 to 17700.

The HMD 17700 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 17100 to 17500 to which the above-described technology is applied will be described. The devices 17100 to 17500 illustrated in FIG. 17 may be operatively connected/coupled to a point cloud data transmission device and reception according to the above-described embodiments.

<PCC+XR>

The XR/PCC device 17300 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 17300 may analyze 3D point cloud data or image data acquired through various sensors or from an external device and generate position data and attribute data about 3D points. Thereby, the XR/PCC device 17300 may acquire information about the surrounding space or a real object, and render and output an XR object. For example, the XR/PCC device 17300 may match an XR object including auxiliary information about a recognized object with the recognized object and output the matched XR object.

<PCC+Self-Driving+XR>

The self-driving vehicle 17200 may be implemented as a mobile robot, a vehicle, an unmanned aerial vehicle, or the like by applying the PCC technology and the XR technology.

The self-driving vehicle 17200 to which the XR/PCC technology is applied may represent a self-driving vehicle provided with means for providing an XR image, or a self-driving vehicle that is a target of control/interaction in the XR image. In particular, the self-driving vehicle 17200 which is a target of control/interaction in the XR image may be distinguished from the XR device 17300 and may be operatively connected thereto.

The self-driving vehicle 17200 having means for providing an XR/PCC image may acquire sensor information from sensors including a camera, and output the generated XR/PCC image based on the acquired sensor information. For example, the self-driving vehicle 17200 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 17200 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud compression data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

According to embodiments, point cloud content (or referred to as G-PCC content) represents volumetric media encoded using G-PCC.

According to embodiments, point cloud data (i.e., G-PCC data) represents volumetric encoding of a point cloud composed of a sequence of point cloud frames. Each point cloud frame includes a number of points, their positions, and their attributes. It may vary from one frame to another. That is, each point cloud frame represents a set of 3D points specified by Cartesian coordinates (x, y, z) (i.e., positions) of 3D points and zero or more attributes at a specific time instance. In addition, geometry represents a set of Cartesian coordinates associated with a point cloud frame, and an attribute represents a scalar or vector property optionally associated with each point in point cloud data, such as color, reflectance, frame index, or the like.

According to embodiments, the point cloud video encoder may further perform a spatial partition process of spatially partitioning the point cloud data into one or more 3D blocks before encoding the point cloud data. That is, in order to perform and process encoding and transmission operations of the transmission device and decoding and rendering operations of the reception device in real time with low latency, the transmission device may spatially partition the point cloud data into a plurality of 3D blocks. In addition, the transmission device may independently or non-independently encode the spatially partitioned 3D blocks, thereby enabling random access and parallel encoding in the 3D space occupied by the point cloud data. Further, the transmission device and the reception device may prevent errors from being accumulated in the encoding and decoding process by independently or non-independently performing encoding and decoding on each of spatially partitioned 3D blocks.

According to embodiments, a 3D block may represent a tile group, a tile, a slice, a coding unit (CU), or a prediction unit (PU), a transform unit (TU).

Figure 18:
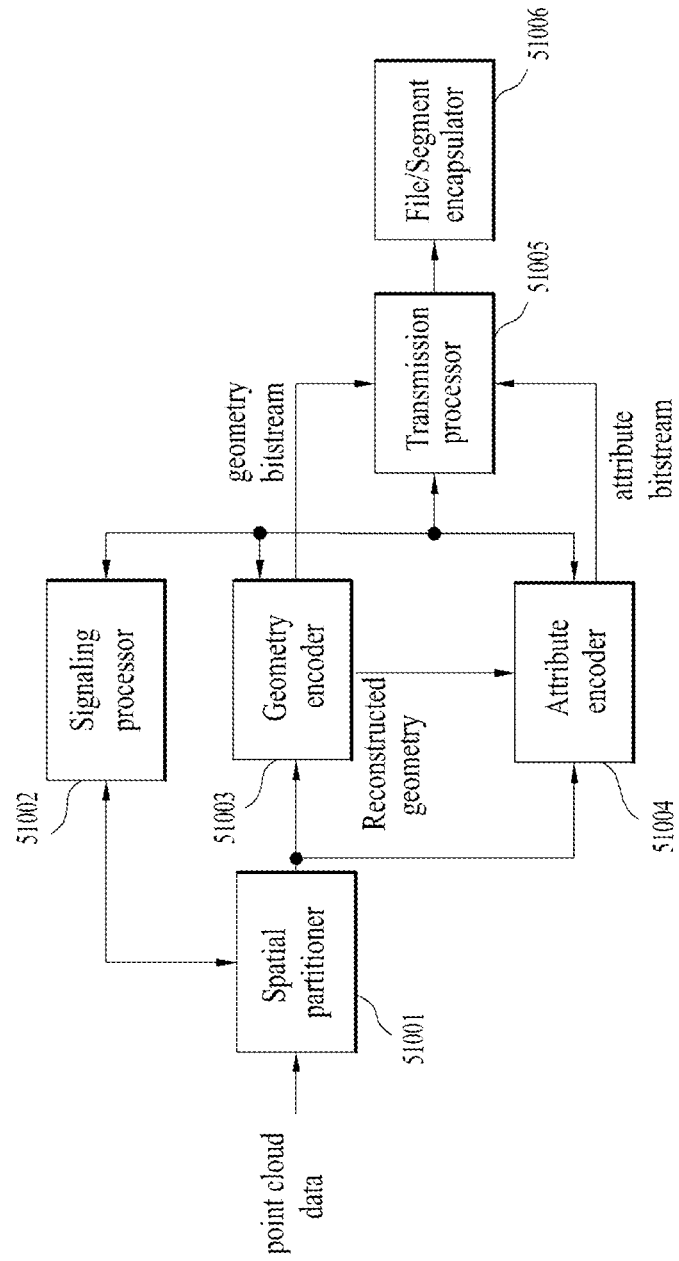
FIG. 18 illustrates an example of a point cloud transmission device according to embodiments.

FIG. 18 is a diagram illustrating another example of a point cloud transmission device according to embodiments. In this example, a space partitioner is provided.

The point cloud transmission device according to the embodiments may include a space partitioner 51001, a signaling processor 51002, a geometry encoder 51003, an attribute encoder 51004, a transmission processor 51005, and a file/segment encapsulator 51006. According to embodiments, the space partitioner 51001, the geometry encoder 51003, and the attribute encoder 51004 may be referred to as a point cloud video encoder.

According to embodiments, the space partitioner 51001 may spatially partition the input point cloud data into one or more tiles and/or one or more slices based on a bounding box and/or a sub-bounding box. According to embodiments, the space partitioner 51010 may partition point cloud data into one or more tiles, and may partition each tile into one or more slices.

According to an embodiment, the signaling information for spatial partitioning is entropy-encoded by the signaling processor 51002 and then output to the transmission processor 51005 in the form of a bitstream.

Figure 19:
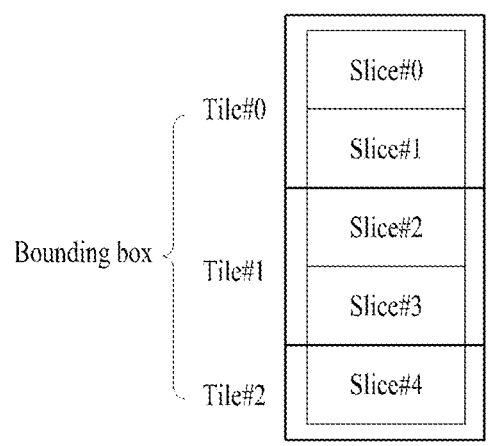
FIG. 19 illustrates an embodiment of partitioning a bounding box into one or more tiles and/or one or more slices according to embodiments.

FIG. 19 illustrates spatially partitioning a bounding box into one or more 3D blocks according to an embodiment.

According to embodiments, a point cloud object corresponding to point cloud data may be represented in the form of a coordinate-based box, which is referred to as a bounding box. That is, the bounding box corresponds to a rectangular cuboid that may contain all points of a point cloud. In other words, the bounding box may be defined as a rectangular cuboid including a source point cloud frame. According to embodiments, a point cloud frame is a set of 3D points specified by Cartesian coordinates (x, y, z) of 3D points and zero or more attributes at a specific time instance.

FIG. 19 illustrates an example in which an overall bounding box of point cloud data is partitioned into three tiles i.e., tile #0, tile #1 and tile #2. FIG. 19 also illustrates an example in which tile #0 is partitioned into slice #0 and slice #1, tile #1 is partitioned into slice #2 and slice #3, and tile #2 is partitioned into slice #4. The examples of FIG. 19 are intended to provide understanding of the present disclosure to those skilled in the art, and the number of tiles formed by partitioning the bounding box, and the number of slices formed by partitioning each tile may be changed.

According to embodiments, a tile, or a slice may represent a partial region of a 3D space occupied by point cloud data. According to embodiments, the bounding box (i.e., point cloud data) is partitioned into one or more tiles and each tile partitioned into one or more slices. Thus, the point cloud video encoder may perform parallel encoding on the point cloud data, and the point cloud video decoder may perform parallel decoding on the point cloud data.

According to embodiments, a slice may represent a unit of data that is independently encoded by the point cloud video encoder and/or a unit of data that is independently decoded by the point cloud video decoder. That is, a slice is a set of points that may be independently encoded or decoded. According to embodiments, a slice may represent a set of data in a 3D space occupied by point cloud data, or may represent a set of some data among point cloud data. That is, a slice may represent a series of syntax elements representing a part or the entirety of the coded point cloud frame. According to embodiments, a slice may represent a region or set of points included in a tile. According to embodiments, a tile may be partitioned into one or more slices based on the number of points included in the tile. That is, one tile may be defined as a rectangular cuboid in the bounding box of the point cloud frame, and consists of a group of slices. In other words, a tile may be a group of slices a group of slices with bounding box information. According to embodiments, the bounding box information of each tile may be specified in the tile inventory (or TPS). According to embodiments, a tile may overlap another tile in the bounding box. The tile may be partitioned into one or more slices based on the number of points, and some data may be split or merged in the partitioning process. That is, a slice may be a unit that may be independently encoded or decoded within a corresponding tile. In addition, geometry information and attribute information of each slice may be independently encoded or decoded. According to embodiments, each slice may contain an index that identifies a tile to which the slice belongs.

According to embodiments, the point cloud video encoder may encode point cloud data in a slice unit or a tile unit including one or more slices. According to embodiments, the point cloud video decoder may decode point cloud data in a slice unit or a tile unit including one or more slices.

In addition, the point cloud video encoder may perform quantization and/or transformation differently for each tile or for each slice. The point cloud video decoder may perform inverse quantization and/or inverse transformation differently for each tile or for each slice.

When the point cloud data (i.e., bounding box) is spatially partitioned into one or more tiles and/or one or more slices as described above, the reception device needs signaling information to decode some point cloud data corresponding to a specific tile or a specific slice in the entire point cloud data. And, signaling information related to 3D spatial region(s) for supporting spatial access to point cloud data is needed for the reception device is required. More specifically, to enable spatial access of point cloud data before decoding in the reception device, the association between at least one spatial region and the corresponded point cloud data (i.e., the corresponded part of the point cloud data) needs to be indicated effectively in a file level (or file format level). In other words, when the reception device renders point cloud data based on the user's viewport, etc, to extract and decode some necessary point cloud data from the entire point cloud data, the association between 3D spatial regions and tiles needs to be signaled in file level (or file format level). In the present disclosure, a 3D spatial region may be referred to as a 3D region or a spatial region and may include a cubic region or a cuboid region.

According to embodiments, signaling information necessary to extract and decode only some point cloud data from a file, that is, signaling information for spatial access (or partial access), may include 3D bounding box information, 3D spatial domain information (or cubic region information), tile information, and/or tile inventory information. The signaling information may be stored in a sample in a track, a sample entry, a sample group, a track group, or a separate metadata track. Storage and signaling of the 3D bounding box information, 3D spatial region information (or cubic region information), tile information, and/or tile inventory information included in the signaling information will be described in detail later.

The positions of one or more 3D blocks spatially partitioned by the space partitioner 51001 are output to the geometry encoder 51003, and the attribute information (or attributes) is output to the attribute encoder 51004. According to embodiments, a 3D block may be a tile group, a tile, a slice, a coding unit (CU), a prediction unit (PU), or a transform unit (TU). According to embodiments, the positions may be position information about points included in a partitioned 3D block, and are referred to as geometry information.

The geometry encoder 51003 constructs and encodes an octree based on the positions output from the space partitioner 51001, and output a geometry bitstream. In addition, the geometry encoder 51003 may reconstruct the octree and/or the approximated octree and output the same to the attribute encoder 51004. The reconstructed octree may be referred to as reconstructed geometry (or restored geometry).

The attribute encoder 51004 encodes the attributes of points output from the space partitioner 51001 based on the reconstructed geometry output from the geometry encoder 51003, and outputs an attribute bitstream.

The geometry encoder 51003 may performed some or all of the operations of the coordinate transformer 40000, the quantizer 40001, the octree analyzer 40002, the surface approximation analyzer 40003, the arithmetic encoder 40004, and the geometry reconstructor 40005 of FIG. 4, or perform some or all of the operations of the quantization processor 12001, the voxelization processor 12002, the octree occupancy code generator 12003, the surface model processor 12004, the intra/inter-coding processor 12005, and the arithmetic coder 12006 of FIG. 12.

The attribute encoder 51004 may perform some or all of the operations of the color transformer 40006, the attribute transformer 40007, the RAHT transformer 40008, the LOD generator 40009, the lifting transformer 40010, the coefficient quantizer 40011, and the arithmetic encoder 40012 of FIG. 4, or perform some or all of the operations of the color transform processor 12008, the attribute transform processor 12009, the prediction/lifting/RAHT transform processor 12010, and the arithmetic coder 12011 of FIG. 12.

The signaling processor 51002 may generate and/or process signaling information and output the processed signaling information to the transmission processor 51005 in the form of a bitstream. The signaling information generated and/or processed by the signaling processor 51002 may be provided to the geometry encoder 51003, the attribute encoder 51004, the transmission processor 51005, and/or the file/segment encapsulator 51006 for geometry encoding, attribute encoding, and transmission processing, or the signaling processor 51002 may be provided with signaling information generated by the signaling processor 51002, the geometry encoder 51003, the attribute encoder 51004, the transmission processor 51005, and/or the file/segment encapsulator 51006. The signaling processor 51002 may provide information fed back from the reception device (e.g., head orientation information and/or viewport information) to the geometry encoder 51003, the attribute encoder 51004, the transmission processor 51005, and/or the file/ segment encapsulator 51006.

In the present disclosure, signaling information may be signaled and transmitted in a unit of parameter set (sequence parameter set (SPS), geometry parameter set (GPS), attribute parameter set (APS), tile parameter set (TPS) (or tile inventory), etc.). It may be signaled and transmitted on the basis of a coding unit of each image, such as a slice or a tile. Moreover, in the present disclosure, signaling information for supporting spatial access may include 3D bounding box information, 3D spatial region information (or cubic region information), tile information, and/or tile inventory information, and may be signaled in an intra-track sample, a sample entry, a sample group, or a track group, or may be signaled and transmitted in a separate metadata track. According to embodiments, the signaling information for supporting spatial access may be generated by the signaling processor 51002 and signaled in an intra-track sample, a sample entry, a sample group, or a track group, or may be signaled in a separate metadata track. Alternatively, it may be generated by the file/segment encapsulator 51006 and signaled in an intra-track sample, a sample entry, a sample group, or a track group, or may be signaled in a separate metadata track. In the present disclosure, the signaling information may include metadata (e.g., a set value, etc.) related to point cloud data. Depending on the application, the signaling information may be defined in the system level, such as the file format, dynamic adaptive streaming over HTTP (DASH), or MPEG media transport (MMT), or the wired interface level, such as High Definition Multimedia Interface (HDMI), Display Port, Video Electronics Standards Association (VESA), or CTA.

A method/device according to the embodiments may signal related information to add/perform an operation of the embodiments. The signaling information according to embodiments may be used in a transmission device and/or a reception device.

The transmission processor 51005 may perform an operation and/or a transmission method identical or similar to the operation and/or transmission method of the transmission processor 12012 of FIG. 12, and may perform an operation and/or a transmission method identical or similar to the operation and/or transmission method of the transmitter 1003 of FIG. 1. Description of the details will be omitted, and reference will be made to the description of FIG. 1 or 12.

The transmission processor 51005 may output the geometry bitstream output from the geometry encoder 51003, the attribute bitstream output from the attribute encoder 51004, and the signaling bitstream output from the signaling processor 51002 to the file/segment encapsulator 51006, or may multiplex the same into one bitstream and output the bitstream to the file/segment encapsulator 51006.

According to an embodiment, the file/segment encapsulator 51006 encapsulates and transmits the input bitstream as a file or segment. According to an embodiment, the file is in an ISOBMFF file format.

According to an embodiment, the file/segment encapsulator 51006 encapsulates a G-PCC bitstream composed of TLV (Type-Length-Value) encapsulation structures into a file. The TLV encapsulation structures which comprise of a G-PCC bitstream may include a geometry bitstream output from the geometry encoder 51003, an attribute bitstream output from the attribute encoder 51004 and/or a signaling bitstream output from the signaling processor 51002. According to an embodiment, the G-PCC bitstream may be generated in the transmission processor 51005 or the file/segment encapsulator 51006. According to an embodiment, the G-PCC bitstream may be stored in one single track or multiple tracks of a file. Details related to the encapsulation structure and the track will be described later.

According to embodiments, a file or segment may be transmitted to the reception device through the file/segment encapsulator 51006 or a delivery unit (not shown), or may be stored in a digital storage medium (e.g., USB, SD, CD, DVD, Blu-ray, HDD, SSD, etc.). The delivery unit according to the embodiments may perform wired/wireless communication with the reception device over a network such as 4G, 5G, or 6G. In addition, the delivery unit may perform a necessary data processing operation according to a network system (for example, a communication network system such as 4G, 5G, or 6G). In addition, the delivery unit may transmit the encapsulated data in an on-demand manner.

Figure 20:
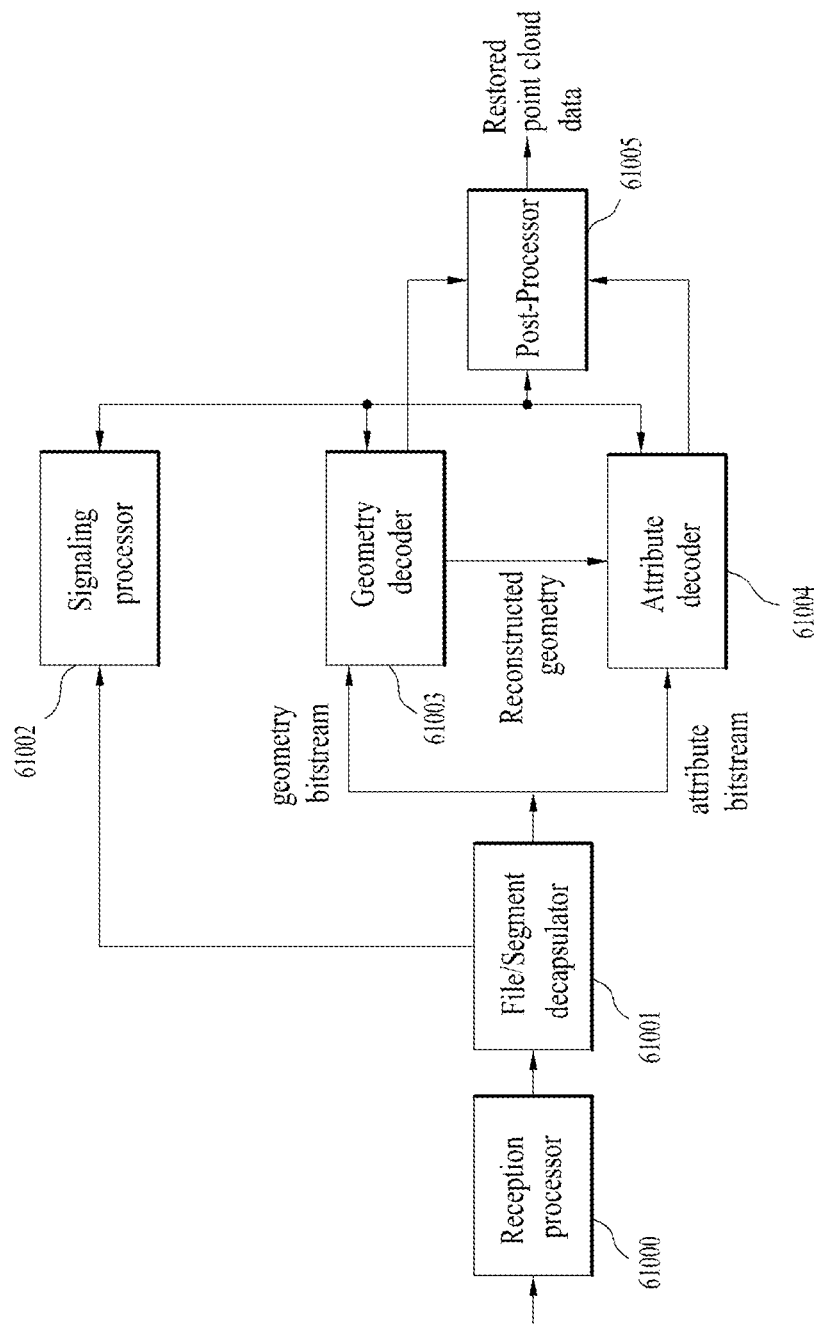
FIG. 20 illustrates an example of a point cloud reception device according to embodiments.

FIG. 20 is a diagram showing another exemplary point cloud reception device according to embodiments.

The point cloud reception device according to the embodiments may include a reception processor 61000, a file/segment decapsulator 61001, a signaling processor 61002, a geometry decoder 61003, an attribute decoder 61004, and a post-processor 61005. According to embodiments, the geometry decoder 61003 and the attribute decoder 61004 may be collectively referred to as a point cloud video decoder. According to embodiments, the point cloud video decoder may be referred to as a PCC decoder, a PCC decoding unit, a point cloud video decoder, a point cloud video decoding unit, or the like.

The reception device according to the embodiments may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The reception processor 61000 according to the embodiments receives a G-PCC bitstream containing point cloud video data or a file/segment into which the G-PCC bitstream is encapsulated from a delivery unit or a storage medium. The reception processor 61000 may perform a necessary data processing operation according to a network system (for example, a communication network system such as 4G, 5G, or 6G).

The file/segment decapsulator 61001 according to the embodiments may decapsulate the received file/segment and output a G-PCC bitstream.

According to embodiments, a G-PCC bitstream composed of TLV encapsulation structures that includes a geometry bitstream, an attribute bitstream, and a signaling bitstream may be received through multiple tracks of the file, or may be received through a single track of the file. In other words, the file/segment decapsulator 61001 decapsulates the G-PCC bitstream composed of TLV encapsulation structures from the single track or the multiple tracks of the file and demultplexes the geometry bitstream, the attribute bitstream and/or the signaling bitstream from the G-PCC bitstream. Furthermore, the demultiplexed signaling bitstream is output to the signaling processor 61002, the geometry bitstream is output to the geometry decoder 61003, and the attribute bitstream is output to the attribute decoder 61004.

According to embodiments, the file/segment decapsulator 61001 and/or the signaling processor 61002 may acquire signaling information for supporting spatial access from a sample in a track, a sample entry, a sample group, or a track group, or from a separate metadata track, and be provided the acquired signaling information to the geometry decoder 61003, the attribute decoder 61004, and/or the post-processor 61005. The signaling information for supporting the spatial access may include 3D bounding box information, 3D spatial region information (or cubic region information), tile information, and/or tile inventory information. That is, the signaling information for supporting the spatial access is a signaling information of a file level (or file format level).

According to embodiments, the file/segment decapsulator 61001 may output a geometry bitstream and an attribute bitstream of tile(s) related to a 3D spatial region desiring a spatial access based on the signaling information for the spatial access to the geometry decoder 61003 and the attribute decoder 61004, respectively.

According to embodiments, a tile is a rectangular cuboid within an overall bounding box of point cloud data. In addition, a G-PCC bitstream may be partitioned (divided) into one or more 3D spatial regions (also referred to as cubic regions or cuboid regions) within the overall bounding box. Namely, a 3D spatial region is a specific 3D volume of a 3D space of the overall bounding box and a tile is a specific rectangular cuboid within the overall bounding box. Therefore, each 3D spatial region may be related to one or more tiles and the signaling information for the spatial access includes information related to the association between 3D spatial regions and tiles.

The signaling processor 61002 May parse and process, from the input signaling bitstream, signaling information, for example, information contained in the SPS, GPS, APS, tile inventory (also referred to as TPS), metadata, and the like and provide the same to the geometry decoder 61003, the attribute decoder 61004, and the post-processor 61005. That is, the signaling information such as the SPS, GPS, APS, and tile inventory is a signaling information of a bitstream level. According to embodiments, the tile inventory may be signaled in a file level and/or a bitstream level.

According to an embodiment, when the point cloud data is partitioned into tiles and/or slices at the transmitting side as shown in FIG. 19, the tile inventory includes the number of slices included in each tile, and accordingly the point cloud video decoder may check the number of slices and quickly parse information for parallel decoding.

Accordingly, the point cloud video decoder according to the present disclosure may quickly parse a bitstream containing point cloud data as it receives an SPS having a reduced amount of data. As a result, a point cloud video decoder may decode tiles upon receiving the tiles, and may decode each slice based on the GPS and APS included in each tile for each tile. Thereby, decoding efficiency may be maximized.

That is, the geometry decoder 61003 of the point cloud video decoder may reconstruct the geometry by performing the reverse process of the operation of the geometry encoder 51003 of FIG. 18 on the input geometry bitstream based on signaling information (e.g., geometry related parameters). The geometry restored (or reconstructed) by the geometry decoder 61003 is provided to the attribute decoder 61004. The attribute decoder 61004 of the point cloud video decoder may restore the attribute by performing the reverse process of the operation of the attribute encoder 51004 of FIG. 18 on the input attribute bitstream based on signaling information (e.g., attribute related parameters) and the reconstructed geometry. According to embodiments, when the point cloud data is partitioned into tiles and/or slices at the transmitting side as shown in FIG. 19, the geometry decoder 61003 and the attribute decoder 61004 perform geometry decoding and attribute decoding on a tile-by-tile basis and/or slice-by-slice basis. Herein, a tile may be a tile related to a 3D spatial region desiring a spatial access.

The geometry decoder 61003 according to the embodiments may perform some or all of the operations of the arithmetic decoder 11000, the octree synthesis unit 11001, the surface approximation synthesis unit 11002, the geometry reconstruction unit 11003, and the coordinates inverse transformation unit 11004 of FIG. 11, or may perform some or all of the operations of the arithmetic decoder 13002, the occupancy code-based octree reconstruction processor 13003, the surface model processor 13004, and the inverse quantization processor 13005 of FIG. 13.

The attribute decoder 61004 according to the embodiments may perform some or all of the operations of the arithmetic decoder 11005, the inverse quantization unit 11006, the RAHT transformation unit 11007, the LOD generation unit 11008, the inverse lifting unit 11009, and the color inverse transformation unit 11010 of FIG. 11, or may perform some or all of the operations of the arithmetic decoder 13007, the inverse quantization processor 13008, the prediction/lifting/RAHT inverse transformation processor 13009, and the color inverse transformation processor 13010 of FIG. 13.

The post-processor 61005 may reconstruct the point cloud data by matching the restored geometry with the restored attributes. In addition, when the reconstructed point cloud data is in a tile and/or slice unit, the post-processor 61005 may perform a reverse process of the spatial partitioning at the transmitting side based on the signaling information. For example, when the bounding box in the transmission device as shown in FIG. 19 is partitioned into tiles and/or slices, the tiles and/or slices may be combined based on the signaling information to restore the bounding box of point cloud data.

In another embodiment, when the bounding box is partitioned into tiles and/or slices at the transmitting side, the post-processor 61005 may reconstruct a part of the bounding box by combining some slices and/or some tiles based on the signaling information. Herein, a tile may be a tile related to a 3D spatial region desiring a spatial access.

Figure 21:
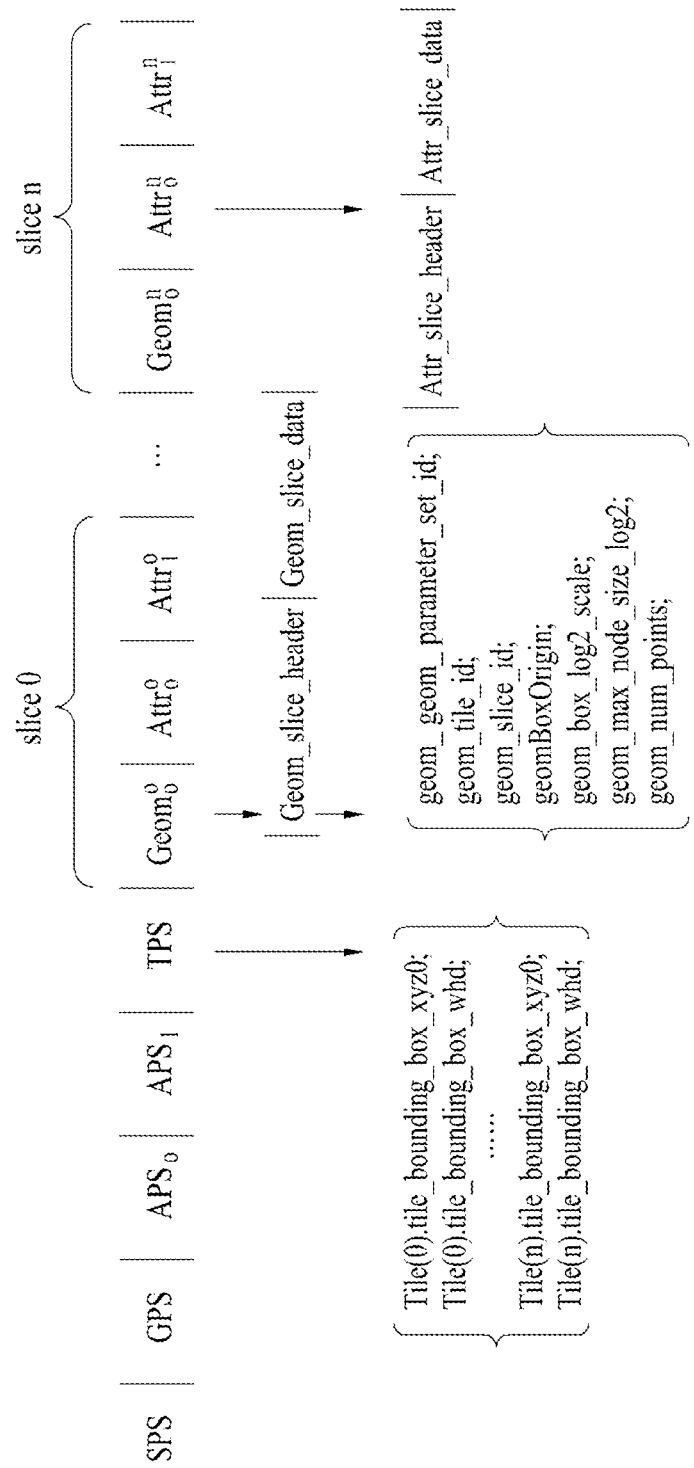
FIG. 21 illustrates an exemplary bitstream structure for point cloud data for transmission/reception according to embodiments.

FIG. 21 shows an exemplary bitstream structure for point cloud data for transmission/reception according to embodiments.

When a geometry bitstream, an attribute bitstream, and a signaling bitstream according to embodiments are configured as one bitstream (or G-PCC bitstream), the bitstream may include one or more sub-bitstreams. The bitstream according to the embodiments may include a sequence parameter set (SPS) for sequence level signaling, a geometry parameter set (GPS) for signaling of geometry information coding, one or more attribute parameter sets ($APS_S$) ($APS_0$, $APS_1$) for signaling of attribute information coding, a tile inventory (also referred to as TPS) for tile level signaling, and one or more slices (slice 0 to slice n). That is, a bitstream of point cloud data according to embodiments may include one or more tiles, and each of the tiles may be a group of slices including one or more slices (slice 0 to slice n). The tile inventory (or TPS) according to the embodiments may contain information about each of the one or more tiles (e.g., coordinate value information and height/size information about the bounding box). Each slice may include one geometry bitstream (Geom0) and/or one or more attribute bitstreams (Attr0 and Attr1). For example, a slice 0) may include one geometry bitstream)($Geom0^0$ and one or more attribute bitstreams ($Attr0^0$, $Attr1^0$).

The geometry bitstream in each slice may be composed of a geometry slice header (geom_slice_header) and geometry slice data (geom_slice_data). According to embodiments, geom_slice_header may include identification information (geomparameter_set_id), a tile identifier (geom_tile_id), and a slice identifier (geom_slice_id) for a parameter set included in the GPS, and information (geomBoxOrigin, geom_box_log 2_scale, geom_max_node_size_log 2, geom_num_points) about data contained in the geometry slice data (geom_slice_data). geomBoxOrigin is geometry box origin information indicating the origin of the box of the geometry slice data, geom_box_log 2_scale is information indicating the log scale of the geometry slice data, geom_max_node_size_log 2 is information indicating the size of the root geometry octree node, and geom_num_points is information related to the number of points of the geometry slice data. According to embodiments, the geom_slice_data may include geometry information (or geometry data) about the point cloud data in a corresponding slice.

Each attribute bitstream in each slice may be composed of an attribute slice header (attr_slice_header) and attribute slice data (attr_slice_data). According to embodiments, the attr_slice_header may include information about the corresponding attribute slice data. The attribute slice data may contain attribute information (or attribute data) about the point cloud data in the corresponding slice. When there is a plurality of attribute bitstreams in one slice, each of the bitstreams may contain different attribute information. For example, one attribute bitstream may contain attribute information corresponding to color, and another attribute bitstream may contain attribute information corresponding to reflectance.

Figure 22:
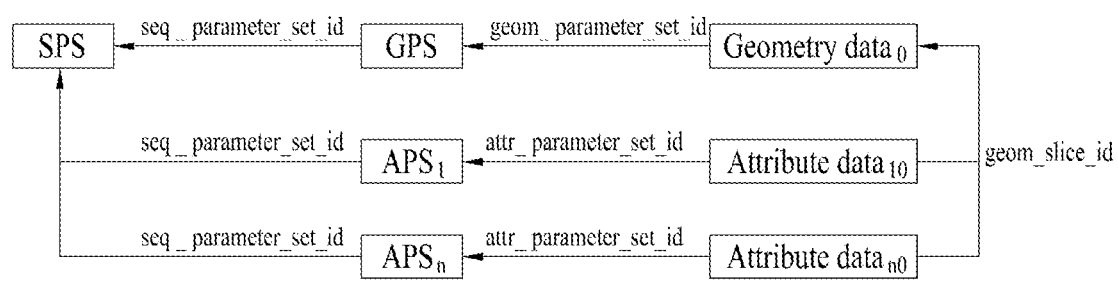
FIG. 22 illustrates an exemplary bitstream structure for point cloud data according to embodiments.

FIG. 22 shows an exemplary bitstream structure for point cloud data according to embodiments.

Figure 23:
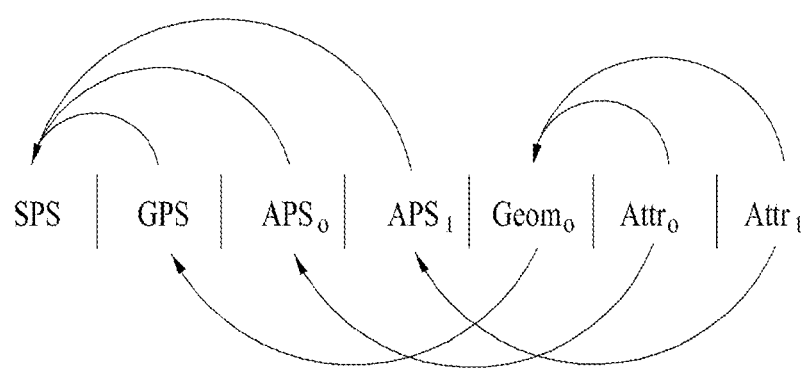
FIG. 23 illustrates a connection relationship between components in a bitstream of point cloud data according to embodiments.

FIG. 23 illustrates a connection relationship between components in a bitstream of point cloud data according to embodiments.

The bitstream structure for the point cloud data illustrated in FIGS. 22 and 23 may represent the bitstream structure for point cloud data shown in FIG. 21.

According to the embodiments, the SPS may include an identifier (seq_parameter_set_id) for identifying the SPS, and the GPS may include an identifier (geomparameter_set_id) for identifying the GPS and an identifier (seq_parameter_set_id) indicating an active SPS to which the GPS belongs. The APS may include an identifier (attr_parameter_set_id) for identifying the APS and an identifier (seq_parameter_set_id) indicating an active SPS to which the APS belongs. According to embodiments, geometry data may include a geometry slice header and geometry slice data. The geometry slice header may include an identifier (geom_parameter_set_id) of an active GPS to be referred to by a corresponding geometry slice. The geometry slice header may further include an identifier (geom_slice_id) for identifying a corresponding geometry slice and/or an identifier (geom_tile_id) for identifying a corresponding tile. The geometry slice data may include a geometry bitstream belonging to a corresponding slice. According to embodiments, attribute data may include an attribute slice header and attribute slice data. The attribute slice header may include an identifier (attr_parameter_set_id) of an active APS to be referred to by a corresponding attribute slice and an identifier (geom_slice_id) for identifying a geometry slice related to the attribute slice. The attribute slice data may include an attribute bitstream belonging to a corresponding slice.

That is, the geometry slice refers to the GPS, and the GPS refers the SPS. In addition, the SPS lists available attributes, assigns an identifier to each of the attributes, and identifies a decoding method. The attribute slice is mapped to output attributes according to the identifier. The attribute slice has a dependency on the preceding (decoded) geometry slice and the APS. The APS refers to the SPS.

According to embodiments, parameters necessary for encoding of the point cloud data may be newly defined in a parameter set of the point cloud data and/or a corresponding slice header. For example, when encoding of the attribute information is performed, the parameters may be added to the APS. When tile-based encoding is performed, the parameters may be added to the tile and/or slice header.

As shown in FIGS. 21, 22, and 23, the bitstream of the point cloud data provides tiles or slices such that the point cloud data may be partitioned and processed by regions. According to embodiments, the respective regions of the bitstream may have different importances. Accordingly, when the point cloud data is partitioned into tiles, a different filter (encoding method) and a different filter unit may be applied to each tile. When the point cloud data is partitioned into slices, a different filter and a different filter unit may be applied to each slice.

When the point cloud data is partitioned into regions and compressed, the transmission device and the reception device according to the embodiments may transmit and receive a bitstream in a high-level syntax structure for selective transmission of attribute information in the partitioned regions.

The transmission device according to the embodiments may transmit point cloud data according to the bitstream structure as shown in FIGS. 21, 22, and 23. Accordingly, a method to apply different encoding operations and use a good-quality encoding method for an important region may be provided. In addition, efficient encoding and transmission may be supported according to the characteristics of point cloud data, and attribute values may be provided according to user requirements.

The reception device according to the embodiments may receive the point cloud data according to the bitstream structure as shown in FIGS. 21, 22, and 23. Accordingly, different filtering (decoding) methods may be applied to the respective regions (regions partitioned into tiles or into slices), rather than a complexly decoding (filtering) method being applied to the entire point cloud data. Therefore, better image quality in a region important to the user and an appropriate latency to the system may be ensured.

A field, which is a term used in syntaxes of the present disclosure described below, may have the same meaning as a parameter or element.

FIG. 24 shows an embodiment of a syntax structure of a sequence parameter set (SPS) (seq_parameter_set( )) according to the present disclosure. The SPS may contain sequence information about a point cloud data bitstream.

The SPS according to the embodiments may include a main_profile_compatibility_flag field, a unique_point_positions_constraint_flag field, a level_idc field, an sps_seq_parameter_set_id field, an sps_bounding_box_present_flag field, an sps_source_scale_factor field, an numerator_minus1 field, an source_scale_factor_denominator_minus1 field, an sps_num_attribute_sets field, an log 2_max_frame_idx field, an axis_coding_order field, an sps_bypass_stream_enabled_flag field, and an sps_extension_flag field.

The main_profile_compatibility_flag field may indicate whether the bitstream conforms to a main profile. For example, the main_profile_compatibility_flag field equal to 1 may indicate that the bitstream conforms to the main profile. For another example, the main_profile_compatibility_flag field equal to 0 may indicate that the bitstream conforms to a profile other than the main profile.

When the value of the unique_point_positions_constraint_flag field is 1, all output points may have unique positions in each point cloud frame referred to by the current SPS. When the value of the unique_point_positions_constraint_flag field is 0, two or more output points may have the same position in a point cloud frame referred to by the current SPS. For example, even though all points are unique in each slice, slices and other points within a frame may overlap. In this case, the unique_point_positions_constraint_flag field is set to 0.

The level_idc field indicates a level to which the bitstream conforms.

The sps_seq_parameter_set_id field provides an identifier for the SPS for reference by other syntax elements.

The sps_bounding_box_present_flag field may indicate whether a bounding box is present in the SPS. For example, the sps_bounding_box_present_flag field equal to 1 indicates that a bounding box is present in the SPS and the sps_bounding_box_present_flag field equal to 0 indicates that the size of the bounding box is undefined.

When the sps_bounding_box_present_flag field is equal to 1, the SPS according to embodiments may further include an sps_bounding_box_offset_x field, an sps_bounding_box_offset_y field, an sps_bounding_box_offset_z field, an sps_bounding_box_offset_log 2_scale field, an sps_bounding_box_size_width field, an sps_bounding_box_size_height field, and an sps_bounding_box_size_depth field.

The sps_bounding_box_offset_x field indicates the x offset of the source bounding box in the Cartesian coordinates. When the x offset of the source bounding box is not present, the value of sps_bounding_box_offset_x is 0.

The sps_bounding_box_offset_y field indicates the y offset of the source bounding box in the Cartesian coordinates. When the y offset of the source bounding box is not present, the value of sps_bounding_box_offset_y is 0.

The sps_bounding_box_offset_z field indicates the z offset of the source bounding box in the Cartesian coordinates. When the z offset of the source bounding box is not present, the value of sps_bounding_box_offset_z is 0.

The sps_bounding_box_offset_log 2_scale field indicates a scale factor to scale the quantized x, y, and z source bounding box offsets.

The sps_bounding_box_size_width field indicates the width of the source bounding box in the Cartesian coordinates. When the width of the source bounding box is not present, the value of the sps_bounding_box_size_width field may be 1.

The sps_bounding_box_size_height field indicates the height of the source bounding box in the Cartesian coordinates. When the height of the source bounding box is not present, the value of the sps_bounding_box_size_height field may be 1.

The sps_bounding_box_size_depth field indicates the depth of the source bounding box in the Cartesian coordinates. When the depth of the source bounding box is not present, the value of the sps_bounding_box_size_depth field may be 1.

The sps_source_scale_factor_numerator_minus1 field plus 1 indicates the scale factor numerator of the source point cloud.

The sps_source_scale_factor_denominator_minus1 field plus 1 indicates the scale factor denominator of the source point cloud.

The sps_num_attribute_sets field indicates the number of coded attributes in the bitstream.

The SPS according to embodiments includes an iteration statement repeated as many times as the value of the sps_num_attribute_sets field. In an embodiment, i is initialized to 0, and is incremented by 1 each time the iteration statement is executed. The iteration statement is repeated until the value of i becomes equal to the value of the sps_num_attribute_sets field. The iteration statement may include an attribute_dimension_minus [i] field and an attribute_instance_id[i] field.

The attribute_dimension_minus [i] field plus 1 specifies the number of components of the i-th attribute.

The attribute_instance_id[i] field specifies an instance ID of the i-th attribute.

According to embodiments, when a value of attribute_dimension_minus [i] field is greater than 1, the iteration statement may further include an attribute_secondary_bitdepth_minus [i] field, an attribute_cicp_colour_primaries[i] field, an attribute_cicp_transfer_characteristics[i] field, an attribute_cicp_matrix_coeffs[i] field, an attribute_cicp_video_full_range_flag[i] field, and a known_attribute_label_flag[i] field.

The attribute_secondary_bitdepth_minus [i] plus 1 specifies a bitdepth for a second component of the i-th attribute signal(s).

The attribute_cicp_colour_primaries[i] field indicates chromaticity coordinates of the color attribute source primaries of the i-th attribute.

The attribute_cicp_transfer_characteristics[i] field either indicates the reference opto-electronic transfer characteristic function of the colour attribute as a function of a source input linear optical intensity with a nominal real-valued range of 0 to 1 or indicates the inverse of the reference electro-optical transfer characteristic function as a function of an output linear optical intensity.

The attribute_cicp_matrix_coeffs[i] field describes the matrix coefficients used in deriving luma and chroma signals from the green, blue, and red, or Y, Z, and X primaries.

The attribute_cicp_video_full_range_flag[i] field indicates the black level and range of the luma and chroma signals as derived from E'T, E'PB, and E'PR or E'R, E'G, and E'B real-valued component signals.

The known_attribute_label_flag[i] field specifies whether a know_attribute_label[i] field or an attribute_label_four_bytes[i] field is signaled for the i-th attribute. For example, the value of the known_attribute_label_flag[i] field equal to 0 specifies that the known_attribute_label field is signaled for the ith attribute. The known_attribute_label_flag[i] field equal to 1 specifies that the attribute_label_four_bytes[i] field is signaled for the ith attribute.

The known_attribute_label[i] field indicates the type of the i-th attribute. For example, when the value of the known_attribute_label[i] field is 0, it may indicate that the i-th attribute is color. When the value of the known_attribute_label[i] field is 1, it may indicate that the i-th attribute is reflectance. When the value of the known_attribute_label [i] field is 2, it may indicate that the i-th attribute is frame index. In addition, when the value of the known_attribute_label[i] field is 4, it indicates that the i-th attribute is transparency. When the value of the known_attribute_label[i] field is 5, it indicates that the i-th attribute is normals.

The attribute_label_four_bytes[i] field indicates a known attribute type in a 4-byte code.

FIG. 25 is a table showing an example of attribute types allocated to the attribute_label_four_bytes[i] field. FIG. 25 exemplarily shows that attribute_label_four_bytes[i] equal to 0 indicates that the i-th attribute is color, attribute_label_four_bytes[i] equal to 1 indicates that the i-th attribute is reflectance, attribute_label_four_bytes[i] equal to 2 indicates that the i-th attribute is frame index, attribute_label_four_bytes[i] equal to 4 indicates that the i-th attribute is transparency, and attribute_label_four_bytes[i] equal to 5 indicates that the i-th attribute is normals.

The log 2_max_frame_idx field specifies the number of bits used to signal a frame_idx syntax variable.

The axis_coding_order field i specifies the correspondence between the X, Y, and Z output axis labels and the three position components in the reconstructed point cloud RecPic [pointidx] [axis] with axis=0, . . . , 2.

FIG. 26 is a table showing an example of mapping output X, Y, and Z axis labels to indices axis of RecPIC [i][axis] according to embodiments.

The sps_bypass_stream_enabled_flag field equal to 1 may specify that the bypass coding mode is used on reading the bitstream. As another example, the sps_bypass_stream_enabled_flag field equal to 0 may specify that the bypass coding mode is not used on reading the bitstream.

The sps_extension_flag field indicates whether the sps_extension_data syntax structure is present in the corresponding SPS syntax structure. For example, when the sps_extension_present_flag field is equal to 1, it indicates that the sps_extension_data syntax structure is present in the SPS syntax structure. When the sps_extension_present_flag field is equal to 0, it indicates that the sps_extension_data syntax structure is not present in the SPS syntax structure.

According to embodiments, when the sps_extension_flag field is equal to 1, the SPS may further include a sps_extension_data_flag field.

The sps_extension_data_flag field may have any value.

FIG. 27 shows an embodiment of a syntax structure of the geometry parameter set (GPS) (geometry_parameter_set( )) according to the present disclosure. The GPS according to the embodiments may contain information on a method of encoding geometry information about point cloud data contained in one or more slices.

According to embodiments, the GPS may include a gps_geom_parameter_set_id field, a gps_seq_parameter_set_id field, a gps_box_present_flag field, a unique geometry_points_flag field, a geometry_planar_mode_flag field, a geometry_angular_mode_flag field, a neighbour_context_restriction_flag field, an inferred_direct_coding_mode_enabled_flag field, a bitwise_occupancy_coding_flag field, an adjacent_child_contextualization_enabled_flag field, a log 2_neighbour_avail_boundary field, a log 2_intra_pred_max_node_size field, a log 2_trisoup_node_size field, a geom_scaling_enabled_flag field, a gps_implicit_geom_partition_flag field, and a gps_extension_flag field.

The gps_geom_parameter_set_id field provides an identifier for the GPS for reference by other syntax elements.

The gps_seq_parameter_set_id field specifies the value of sps_seq_parameter_set_id for the active SPS.

The gps_box_present_flag field specifies whether additional bounding box information is provided in a geometry slice header that references the current GPS. For example, the gps_box_present_flag field equal to 1 may specify that additional bounding box information is provided in a geometry header that references the current GPS. Accordingly, when the gps_box_present_flag field is equal to 1, the GPS may further include a gps_gsh_box_log 2_scale_present_flag field.

The gps_gsh_box_log 2_scale_present_flag field specifies whether the gps_gsh_box_log 2_scale field is signaled in each geometry slice header that references the current GPS. For example, the gps_gsh_box_log 2_scale_present_flag field equal to 1 may specify that the gps_gsh_box_log 2_scale field is signaled in each geometry slice header that references the current GPS. As another example, the gps_gsh_box_log 2_scale_present_flag field equal to 0 may specify that the gps_gsh_box_log 2_scale field is not signaled in each geometry slice header and a common scale for all slices is signaled in the gps_gsh_box_log 2_scale field of the current GPS.

When the gps_gsh_box_log 2_scale_present_flag field is equal to 0, the GPS may further include a gps_gsh_box_log 2_scale field.

The gps_gsh_box_log 2_scale field indicates the common scale factor of the bounding box origin for all slices that refer to the current GPS.

The unique geometry points flag field indicates whether, in all slices that refer to the current GPS, all output points have unique positions within a slice. For example, the unique geometry points flag field equal to 1 indicates that in all slices that refer to the current GPS, all output points have unique positions within a slice. The unique geometry points flag field equal to 0 indicates that in all slices that refer to the current GPS, the two or more of the output points may have the same position within a slice.

The geometry_planar_mode_flag field indicates whether the planar coding mode is activated. For example, the geometry_planar_mode_flag field equal to 1 indicates that the planar coding mode is activated. The geometry_planar_mode_flag equal to 0 indicates that the planar coding mode is not activated.

When the geometry_planar_mode_flag field is equal to 1, that is, TRUE, the GPS may further include a geom_planar_mode_th_idcm field, a geom_planar_mode_th[1] field, and a geom_planar_mode_th[2] field.

The geom_planar_mode_th_idcm field may specify a value of a threshold of activation for the direct coding mode.

The geom_planar_mode_th[i] field specifies, for i in the range 0 . . . 2, the value of the threshold of activation for the planar coding mode along the i-th most probable direction for the planar coding mode to be efficient.

The geometry_angular_mode_flag field indicates whether the angular coding mode is active. For example, when the geometry_angular_mode_flag field is equal to 1, it may indicate that the angular coding mode is active. When the geometry_angular_mode_flag field is equal to 0, it may indicate that the angular coding mode is not active.

When the value of the geometry_angular_mode_flag field is 1, that is, TRUE, the GPS may further include a lidar_head_position[0] field, a lidar_head_position[1] field, a lidar_head_position[2] field, a number_lasers field, a planar_buffer_disabled field, a implicit_qtbt_angular_max_node_min_dim_log 2_to_split_z field, and an implicit_qtbt_angular_max_diff_to_split_z field.

The lidar_head_position[0] field, the lidar_head_position[1] field, and the lidar_head_position[2] field may represent (X, Y, Z) coordinates of the lidar head in a coordinate system with the internal axes.

The number_lasers field indicates the number of lasers used for the angular coding mode.

According to embodiments, the GPS includes an iteration statement iterated as many times as the value of the number_lasers field. In this case, according to an embodiment, i is initialized to 0, and is incremented by 1 each time the iteration statement is executed. The iteration statement is iterated until the value of i becomes equal to the value of the number lasers field. This iteration statement may include a laser angle[i] field and a laser correction[i] field.

The laser angle[i] field indicates the tangent of the elevation angle of the i-th laser relative to the horizontal plane defined by the 0-th and first internal axes.

The laser correction[i] field indicates correction of the i-th laser position related to the lidar_head_position[2] field along the second internal axis.

When the planar_buffer_disabled field is equal to 1, it indicates that tracking the closest nodes using a buffer is not used in the process of coding the planar mode flag field and the plane position in the planar mode. When the planar_buffer_disabled field is equal to 0, it indicates that tracking the closest nodes using a buffer is used.

The implicit_qtbt_angular_max_node_min_dim_log 2_to_split_z field indicates a log 2 value of a node size below which horizontal split of nodes is preferred to vertical split.

The implicit_qtbt_angular_max_diff_to_split_z field indicates the log 2 value of the maximum vertical over horizontal node size ratio allowed for a node.

The neighbour_context_restriction_flag field equal to 0 indicates that geometry node occupancy of the current node is coded with the contexts determined from neighboring nodes which are located inside the parent node of the current node. The neighbour_context_restriction_flag field equal to 1 indicates that geometry node occupancy of the current node is coded with the contexts determined from neighboring nodes which are located inside or outside the parent node of the current node.

The inferred_direct_coding_mode_enabled_flag field indicates whether the direct_mode_flag field is present in the geometry node syntax. For example, the inferred_direct_coding_mode_enabled_flag field equal to 1 indicates that the direct_mode_flag field may be present in the geometry node syntax. For example, the inferred_direct_coding_mode_enabled_flag field equal to 0 indicates that the direct_mode_flag field is not present in the geometry node syntax.

The bitwise_occupancy_coding_flag field indicates whether geometry node occupancy is encoded using bitwise contextualization of the syntax element occupancy map. For example, the bitwise_occupancy_coding_flag field equal to 1 indicates that geometry node occupancy is encoded using bitwise contextualisation of the syntax element occupancy map. For example, the bitwise_occupancy_coding_flag field equal to 0 indicates that geometry node occupancy is encoded using the dictionary encoded syntax element occupancy_byte.

The adjacent_child_contextualization_enabled_flag field indicates whether the adjacent children of neighboring octree nodes are used for bitwise occupancy contextualization. For example, the adjacent_child_contextualization_enabled_flag field equal to 1 indicates that the adjacent children of neighboring octree nodes are used for bitwise occupancy contextualization. For example, the adjacent_child_contextualization_enabled_flag field equal to 0 indicates that the children of neighbouring octree nodes are not used for the occupancy contextualization.

The log 2_neighbour_avail_boundary field specifies the value of the variable NeighbAvailBoundary that is used in the decoding process. For example, when the neighbour_context_restriction_flag field is equal to 1, NeighbAvailabilityMask may be set equal to 1. For example, when the neighbour_context_restriction_flag field is equal to 0, NeighbAvailabilityMask may be set equal to 1<<log 2_neighbour_avail_boundary.

The log 2_intra_pred_max_node_size field specifies the octree node size eligible for occupancy intra prediction.

The log 2_trisoup_node_size field specifies the variable TrisoupNodeSize as the size of the triangle nodes.

The geom_scaling_enabled_flag field indicates whether a scaling process for geometry positions is invoked during the geometry slice decoding process. For example, the geom_scaling_enabled_flag field equal to 1 specifies that a scaling process for geometry positions is invoked during the geometry slice decoding process. The geom_scaling_enabled_flag field equal to 0 specifies that geometry positions do not require scaling.

The geom_base_qp field specifies the base value of the geometry position quantization parameter.

The gps_implicit_geom_partition_flag field specifies whether the implicit geometry partition is enabled for the sequence or slice. For example, the gps_implicit_geom_partition_flag field equal to 1 specifies that the implicit geometry partition is enabled for the sequence or slice. The gps_implicit_geom_partition_flag field equal to 0 specifies that the implicit geometry partition is disabled for the sequence or slice. When the gps_implicit_geom_partition_flag field is equal to 1, the following two fields, that is, gps_max_num_implicit_qtbt_before_ot and gps_min_size_implicit_qtbt are signaled.

The gps_max_num_implicit_qtbt_before_ot field specifies the maximal number of implicit QT and BT partitions before OT partitions. The variable K is then initialized by the gps_max_num_implicit_qtbt_before_ot field as follows:

K=gps_max_num_implicit_qtbt_before_ot.

The gps_min_size_implicit_qtbt field specifies the minimal size of implicit QT and BT partitions. The variable M is then initialized by the gps_min_size_implicit_qtbt field as follows:

M=gps_min_size_implicit_qtbt.

The gps_extension_flag field specifies whether the gps_extension_data syntax structure is present in the GPS syntax structure. For example, the gps_extension_flag field equal to 1 specifies that the gps_extension_data syntax structure is present in the GPS syntax. For example, the gps_extension_flag field equal to 0 specifies that this syntax structure is not present in the GPS syntax.

When the value of the gps_extension_flag field is equal to 1, the GPS according to the embodiments may further include a gps_extension_data flag field.

The gps_extension_data flag field may have any value. Its presence and value do not affect the decoder conformance to profiles.

FIG. 28 shows an embodiment of a syntax structure of the attribute parameter set (APS) (attribute_parameter_set( )) according to the present disclosure. The APS according to the embodiments may contain information on a method of encoding attribute information about point cloud data contained in one or more slices.

The APS according to the embodiments may include an aps_attr_parameter_set_id field, an aps_seq_parameter_set_id field, an attr_coding_type field, an aps_attr_initial_qp field, an aps_attr_chroma_qp_offset field, an aps_slice_qp_delta_present_flag field, and an aps_extension_flag field.

The aps_attr_parameter_set_id field provides an identifier for the APS for reference by other syntax elements.

The aps_seq_parameter_set_id field specifies the value of sps_seq_parameter_set_id for the active SPS.

The attr_coding_type field indicates the coding type for the attribute.

FIG. 29 is a table showing exemplary attribute coding types allocated to the attr_coding_type field.

In this example, the attr_coding_type field equal to 0 indicates predicting weight lifting as the coding type. The attr_coding_type field equal to 1 indicates RAHT as the coding type. The attr_coding_type field equal to 2 indicates fix weight lifting.

The aps_attr_initial_qp field specifies the initial value of the variable SliceQp for each slice referring to the APS.

The aps_attr_chroma_qp_offset field specifies the offsets to the initial quantization parameter signaled by the syntax aps_attr_initial_qp.

The aps_slice_qp_delta_present_flag field specifies whether the ash_attr_qp_delta_luma and ash_attr_qp_delta_chroma syntax elements are present in the attribute slice header (ASH). For example, the aps_slice_qp_delta_present_flag field equal to 1 specifies that the ash_attr_qp_delta_luma and ash_attr_qp_delta_chroma syntax elements are present in the ASH. For example, the aps_slice_qp_delta_present_flag field specifies that the ash_attr_qp_delta_luma and ash_attr_qp_delta_chroma syntax elements are not present in the ASH.

When the value of the attr_coding_type field is 0 or 2, that is, the coding type is predicting weight lifting or fix weight lifting, the APS according to the embodiments may further include a lifting_num_pred_nearest_neighbours_minus1 field, a lifting_search_range_minus1 field, and a lifting_neighbour_bias[k] field.

The lifting num_pred_nearest_neighbours_minus1 field plus 1 specifies the maximum number of nearest neighbors to be used for prediction. According to embodiments, a value of NumPredNearedtNeighbours is set equal to a value of the lifting num_pred_nearest_neighbours_minus1 field.

The lifting_search_range_minus1 field plus 1 specifies the search range used to determine nearest neighbors to be used for prediction and to build distance-based levels of detail. The variable LiftingSearchRange for specifying a search range may acquire by adding 1 to a value of the lifting_search_range_minus1 field (LiftingSearchRange=lifting_search_range_minus1+1).

The lifting_neighbour_bias[k] field specifies a bias used to weight the k-th components in the calculation of the Euclidean distance between two points as part of the nearest neighbor derivation process.

According to embodiments, when the value of the attr_coding_type field is 2, that is, when the coding type indicates fix weight lifting, the APS may further include a lifting_scalability_enabled_flag field.

The lifting_scalability_enabled_flag field specifies whether the attribute decoding process allows the pruned octree decode result for the input geometry points. For example, the lifting_scalability_enabled_flag field equal to 1 specifies that the attribute decoding process allows the pruned octree decode result for the input geometry points. The lifting_scalability_enabled_flag field equal to 0 specifies that that the attribute decoding process requires a complete octree decode result for the input geometry points.

When the value of the lifting_scalability_enabled_flag field is false, the APS according to the embodiments may further include a lifting_num_detail_levels_minus1 field.

The lifting_num_detail_levels_minus1 field plus 1 specifies the number of levels of detail for the attribute coding. The variable LevelDetailCount for specifying the number of LODs may acquire by adding 1 to a value of the lifting_num_detail_levels_minus1 field (LevelDetailCount=lifting_num_detail_levels_minus1+1).

According to embodiments, when the value of the lifting_num_detail_levels_minus1 field is greater than 1, the APS may further include a lifting_lod_regular_sampling_enabled_flag field.

The lifting_lod_regular_sampling_enabled_flag field specifies whether levels of detail (LOD) are built by a regular sampling strategy. For example, the lifting_lod_regular_sampling_enabled_flag field equal to 1 specifies that levels of detail (LOD) are built by using a regular sampling strategy. The lifting_lod_regular_sampling_enabled_flag filed equal to 0 specifies that a distance-based sampling strategy is used instead.

When the value of the lifting_scalability_enabled_flag field is false, the APS according to embodiments may include an iteration statement repeated as many times as the value of the lifting_num_detail_levels_minus1 field. In an embodiment, the index (idx) is initialized to 0 and incremented by 1 every time the iteration statement is executed, and the iteration statement is repeated until the index (idx) is greater than the value of the lifting_num_detail_levels_minus1 field. This iteration statement may include a lifting_sampling_period_minus2 [idx] field when the value of the lifting_lod_regular_sampling_enabled_flag field is true (e.g., 1), and may include a lifting_sampling_distance_squared_scale_minus1 [idx] field when the value of the lifting_lod_regular_sampling_enabled_flag field is false (e.g., 0). Furthermore, when the value of the idx is not 0 (i.e., idx !=0), the APS may further include a lifting_sampling_distance_squared_offset [idx] field.

The lifting_sampling_period_minus2 [idx] field plus 2 specifies the sampling period for the level of detail idx.

The lifting_sampling_distance_squared_scale_minus1 [idx] field plus 1 specifies a scale factor for the derivation of the square of the sampling distance for the LOD idx.

The lifting_sampling_distance_squared_offset [idx] field specifies an offset for the derivation of the square of the sampling distance for the LOD idx.

When the value of the attr_coding_type field is 0, that is, when the coding type is predicting weight lifting, the APS according to the embodiments may further include a lifting_adaptive_prediction_threshold field, a lifting_intra_lod_prediction_num_layers field, a lifting_max_num_direct_predictors field, and an inter_component_prediction_enabled_flag field.

The lifting_adaptive_prediction_threshold field specifies the threshold to enable adaptive prediction. According to embodiments, the variable AdaptivePredictionThreshold specifying a threshold to switch an adaptive predictor selection mode is set equal to a value of the lifting_adaptive_prediction_threshold field (AdaptivePredictionThreshold=lifting_adaptive_prediction_threshold).

The lifting_intra_lod_prediction_num_layers field specifies the number of LOD layers where decoded points in the same LOD layer could be referred to generate a prediction value of a target point. For example, the lifting_intra_lod_prediction_num_layers field equal to a value of the variable LevelDetailCount indicates that target point could refer to decoded points in the same LOD layer for all LOD layers. For example, the lifting_intra_lod_prediction_num_layers field equal to 0 indicates that target point could not refer to decoded points in the same LoD layer for any LoD layers. The lifting_max_num_direct_predictors field specifies the maximum number of predictors to be used for direct prediction. The value of the lifting_max_num_direct_predictors field shall be in the range of 0 to LevelDetailCount.

The inter_component_prediction_enabled_flag field specifies whether the primary component of a multi component attribute is used to predict the reconstructed value of non-primary components. For example, if the inter_component_prediction_enabled_flag field equal to 1 specifies that the primary component of a multi component attribute is used to predict the reconstructed value of non-primary components. The inter_component_prediction_enabled_flag field equal to 0 specifies that all attribute components are reconstructed independently.

When the value of the attr_coding_type field is 1, that is, when the attribute coding type is RAHT, the APS according to the embodiments may further include an raht_prediction_enabled_flag field.

The raht_prediction_enabled_flag field specifies whether the transform weight prediction from the neighbor points is enabled in the RAHT decoding process. For example, the raht_prediction_enabled_flag field equal to 1 specifies the transform weight prediction from the neighbor points is enabled in the RAHT decoding process. The raht_prediction_enabled_flag field equal to 0 specifies that the transform weight prediction is disabled in the RAHT decoding process.

According to embodiments, when the value of the raht_prediction_enabled_flag field is TRUE, the APS may further include a raht_prediction_threshold0 field and a raht_prediction_threshold1 field.

The raht_prediction_threshold0 field specifies a threshold to end the transform weight prediction from the neighbour points.

The raht_prediction_threshold1 field specifies a threshold to skip the transform weight prediction from the neighbour points.

The aps_extension_flag field specifies whether the aps_extension_data syntax structure is present in the APS syntax structure. For example, the aps_extension_flag field equal to 1 specifies that the aps_extension_data syntax structure is present in the APS syntax structure. For example, the aps_extension_flag field equal to 0 specifies that this syntax structure is not present in the APS syntax structure.

When the value of the aps_extension_flag field is 1, the APS according to the embodiments may further include an aps_extension_data flag field.

The aps_extension_data flag field may have any value. Its presence and value do not affect decoder conformance to profiles.

FIG. 30 shows an embodiment of a syntax structure of the tile inventory (tile_inventory( )) according to the present disclosure. According to embodiments, the tile inventory may be referred to as a tile parameter set (TPS).

The tile inventory according to the embodiments includes a tile_frame_idx field and a num_tiles_minus1 field.

The tile_frame_idx field specifies an identifier of associated point cloud frame associated with the tile inventory.

The num_tiles_minus field plus 1 specifies the number of tile bounding boxes presenting in the tile inventory.

The tile inventory according to the embodiments includes an iteration statement repeated as many times as the value of the num_tiles_minus1 field. In an embodiment, i is initialized to 0, and is incremented by 1 each time the iteration statement is executed. The iteration statement is repeated until the value of i becomes equal to the value of the num_tiles_minus1 field. The iteration statement may include a tile_bounding_box_offset_x[i] field, a tile_bounding_box_offset_y[i] field, a tile_bounding_box_offset_z[i] field, a tile_bounding_box_size_width[i] field, a tile_bounding_box_size_height[i] field, and a tile_bounding_box_size_depth[i] field.

The tile_bounding_box_offset_x[i] field indicates the x offset of the i-th tile in the Cartesian coordinates. When not present, the value of tile_bounding_box_offset_x[0] is inferred to be sps_bounding_box_offset_x.

The tile_bounding_box_offset_y[i] field indicates the y offset of the i-th tile in the Cartesian coordinates. When not present, the value of tile_bounding_box_offset_y[0] is inferred to be sps_bounding_box_offset_y.

The tile_bounding_box_offset_z[i] field indicates the z offset of the i-th tile in the Cartesian coordinates. When not present, the value of tile_bounding_box_offset_z[0] is inferred to be sps_bounding_box_offset_z.

The tile_bounding_box_size_width[i] field indicates the width of the i-th tile in the Cartesian coordinates. When not present, the value of tile_bounding_box_size_width[0] is inferred to be sps_bounding_box_size_width.

The tile_bounding_box_size_height[i] field indicates the height of the i-th tile in the Cartesian coordinates. When not present, the value of tile_bounding_box_size_height[0] is inferred to be sps_bounding_box_size_height.

The tile_bounding_box_size_depth[i] field indicates the depth of the i-th tile in the Cartesian coordinates. When not present, the value of tile_bounding_box_size_depth[0] is inferred to be sps_bounding_box_size_depth.

FIG. 31 shows an embodiment of a syntax structure of frame boundary marker( ) according to the present disclosure, wherein the syntax structure is internally empty.

FIG. 32 shows an embodiment of a syntax structure of a geometry slice bitstream( ) according to the present disclosure.

The geometry slice bitstream (geometry_slice_bitstream( )) according to the embodiments may include a geometry slice header (geometry_slice_header( )) and geometry slice data (geometry_slice_data( )). The geometry slice bitstream may be referred to as a geometry slice. Also, the attribute slice bitstream may be referred to as an attribute slice.

FIG. 33 shows an embodiment of a syntax structure of the geometry slice header (geometry_slice_header( )) according to the present disclosure.

A bitstream transmitted by the transmission device (or a bitstream received by the reception device) according to the embodiments may contain one or more slices. Each slice may include a geometry slice and an attribute slice. The geometry slice includes a geometry slice header (GSH). The attribute slice includes an attribute slice header (ASH).

The geometry slice header (geometry_slice_header( ) according to embodiments may include a gsh_geometry_parameter_set_id field, a gsh_tile_id field, a gsh_slice_id field, a frame_idx field, a gsh_num_points field, and a byte_alignment( )) field.

When the value of the gps_box_present_flag field included in the GPS is 'true' (e.g., 1), and the value of the gps_gsh_box_log 2_scale_present_flag field is 'true' (e.g., 1), the geometry slice header (geometry_slice_header( )) according to the embodiments may further include a gsh_box_log 2_scale field, a gsh_box_origin_x field, a gsh_box_origin_y field, and a gsh_box_origin_z field.

The gsh_geometry_parameter_set_id field specifies the value of the gps_geom_parameter_set_id of the active GPS.

The gsh_tile_id field specifies the value of the tile id that is referred to by the GSH.

The gsh_slice_id specifies id of the slice for reference by other syntax elements.

The frame_idx field specifies the log 2_max_frame_idx+1 least significant bits of a notional frame number counter. Consecutive slices with differing values of frame_idx form parts of different output point cloud frames. Consecutive slices with identical values of frame_idx without an intervening frame boundary marker data unit form parts of the same output point cloud frame.

The gsh_num_points field specifies the maximum number of coded points within the corresponded slice. It is a requirement of bitstream conformance that a value of the gsh_num_points field is greater than or equal to the number of decoded points in the slice.

The gsh_box_log 2_scale field specifies the scaling factor of the bounding box origin for the slice.

The gsh_box_origin_x field specifies the x value of the bounding box origin scaled by the value of the gsh_box_log 2_scale field.

The gsh_box_origin_y field specifies the y value of the bounding box origin scaled by the value of the gsh_box_log 2_scale field.

The gsh_box_origin_z field specifies the z value of the bounding box origin scaled by the value of the gsh_box_log 2_scale field.

In this case, the variables slice_origin_x, slice_origin_y, and slice_origin_z may be derived as follows.

If the gps_gsh_box_log 2_scale_present_flag field is equal to 0, originScale is set equal to gsh_box_log 2_scale.

If the gps_gsh_box_log 2_scale_present_flag field is equal to 1, originScale is set equal to gps_gsh_box_log 2_scale.

If the gps_box_present_flag field is equal to 0, the values of the variables slice_origin_x, slice_origin_y, and slice_origin_z are inferred to be 0.

If the gps_box_present_flag field is equal to 1, the following equations will be applied to the variables slice_origin_x, slice_origin_y, and slice_origin_z.

slice origin_x=gsh_box_origin_x<<originScale
slice_origin_y=gsh_box_origin_y<<originScale
slice origin_z=gsh_box_origin_z<<originScale When the value of the gps_implicit_geom_partition_flag field is 'true' (i.e., 0), the geometry slice header ((geometry_slice_header( )) may further include a gsh_log 2_max_nodesize_x field, a gsh_log 2_max_nodesize_y_minus_x field, and a gsh_log 2_max_nodesize_z_minus_y field. When the value of the gps_implicit_geom_partition_flag field is 'false' (i.e., 1), the geometry slice header may further include a gsh_log 2_max_nodesize field.

The gsh_log 2_max_nodesize_x field specifies the bounding box size in the x dimension, i.e., MaxNodesizeXLog 2 that is used in the decoding process as follows.

MaxNodeSizeXLog 2=gsh_log 2_max_nodesize_x
MaxNodeSizeX=1<<MaxNodeSizeXLog 2

The gsh_log 2_max_nodesize_y_minus_x field specifies the bounding box size in the y dimension, i.e., MaxNodeSizeYLog 2 that is used in the decoding process as follows.

MaxNodeSizeYLog 2=gsh_log 2_max_nodesize_y_minus_x+MaxNodeSizeXLog 2.
MaxNodeSizeY=1<<MaxNodeSizeYLog 2.

The gsh_log 2_max_nodesize_z_minus_y field specifies the bounding box size in the z dimension, i.e., MaxNodeSizeZLog 2 that is used in the decoding process as follows.

MaxNodeSizeZLog 2=gsh_log 2_max_nodesize_z_minus_y+MaxNodeSizeYLog 2
MaxNodeSizeZ=1<<MaxNodeSizeZLog 2

When the value of the gps_implicit_geom_partition_flag field is 1, the gsh_log 2_max_nodesize field is obtained as follows.

gsh_log 2_max_nodesize=max{MaxNodeSizeXLog 2, MaxNodeSizeYLog 2, MaxNodeSizeZLog 2}

The gsh_log 2_max_nodesize field specifies the size of the root geometry octree node when the gps_implicit_geom_partition_flag field is equal to 0.

Here, the variables MaxNodeSize and MaxGeometryOctreeDepth are derived as follows.

MaxNodeSize=1<<gsh_log 2_max_nodesize
MaxGeometryOctreeDepth=gsh_log 2_max_nodesize-log 2_trisoup_node_size When the value of the geom_scaling_enabled_flag field is 'true', the geometry slice header (geometry_slice_header( )) according to the embodiments may further include a geom_slice_qp_offset field and a geom_octree_qp_offsets_enabled_flag field.

The geom_slice_qp_offset field specifies an offset to the base geometry quantization parameter geom_base_qp.

The geom_octree_qp_offsets_enabled_flag field specifies whether the geom_octree_qp_ofsets_depth field is present in the geometry slice header. For example, the geom_octree_qp_offsets_enabled_flag field equal to 1 specifies that the geom_octree_qp_ofsets_depth field is present in the geometry slice header. The geom_octree_qp_offsets_enabled_flag field equal to 0 specifies that the geom_octree_qp_ofsets_depth field is not present.

The geom_octree_qp_offsets_depth field specifies the depth of the geometry octree.

FIG. 34 shows an embodiment of a syntax structure of geometry slice data (geometry_slice_data( )) according to the present disclosure. The geometry slice data (geometry_slice_data( )) according to the embodiments may carry a geometry bitstream belonging to a corresponding slice.

The geometry_slice_data( ) according to the embodiments may include a first iteration statement repeated as many times as by the value of MaxGeometryOctreeDepth. In an embodiment, the depth is initialized to 0 and is incremented by 1 each time the iteration statement is executed, and the first iteration statement is repeated until the depth becomes equal to MaxGeometryOctreeDepth. The first iteration statement may include a second loop statement repeated as many times as the value of NumNodesAtDepth. In an embodiment, nodeidx is initialized to 0 and is incremented by 1 each time the iteration statement is executed. The second iteration statement is repeated until nodeidx becomes equal to NumNodesAtDepth. The second iteration statement may include xN=NodeX[depth][nodeIdx], yN=NodeY[depth][nodeIdx], zN=NodeZ[depth][nodeIdx], and geometry_node(depth, nodeIdx, xN, yN, zN). MaxGeometryOctreeDepth indicates the maximum value of the geometry octree depth, and NumNodesAtDepth[depth] indicates the number of nodes to be decoded at the corresponding depth. The variables NodeX[depth][nodeIdx], NodeY[depth][nodeIdx], and NodeZ[depth][nodeIdx] indicate the x, y, z coordinates of the Idx-th node in decoding order at a given depth. The geometry bitstream of the node of the depth is transmitted through geometry_node(depth, nodeIdx, xN, yN, zN).

The geometry slice data (geometry_slice_data( )) according to the embodiments may further include geometry_trisoup_data( ) when the value of the log 2_trisoup_node_size field is greater than 0. That is, when the size of the triangle nodes is greater than 0, a geometry bitstream subjected to trisoup geometry encoding is transmitted through geometry trisoup data( ).

FIG. 35 shows an embodiment of a syntax structure of attribute slice bitstream( ) according to the present disclosure.

The attribute slice bitstream (attribute_slice_bitstream ( )) according to the embodiments may include an attribute slice header (attribute_slice_header( )) and attribute slice data (attribute_slice_data( )).

FIG. 36 shows an embodiment of a syntax structure of an attribute slice header (attribute_slice_header( )) according to the present disclosure.

The attribute slice header (attribute slice header( ) according to the embodiments may include an ash_attr_parameter_set_id field, an ash_attr_sps_attr_idx field, an ash_attr_geom_slice_id field, an ash_attr_layer_qp_delta_present_flag field, and an ash_attr_region_qp_delta_present_flag field.

When the value of the aps_slice_qp_delta_present_flag field of the APS is 'true' (e.g., 1), the attribute_slice_header( ) may further include an ash_attr_qp_delta_luma field and when the value of the attribute_dimension_minus1 [ash_attr_sps_attr_idx] field is greater than 0, the attribute_slice_header( ) may further include an ash_attr_qp_delta_chroma field.

The ash_attr_parameter_set_id field specifies the value of the aps_attr_parameter_set_id field of the current active APS.

The ash_attr_sps_attr_idx field specifies an attribute set in the currently active SPS.

The ash_attr_geom_slice_id field specifies the value of the gsh_slice_id field of the current geometry slice header.

The ash_attr_qp_delta_luma field specifies a luma delta quantization parameter (qp) derived from the initial slice qp in the active attribute parameter set.

The ash_attr_qp_delta_chroma field specifies the chroma delta qp derived from the initial slice qp in the active attribute parameter set.

The variables InitialSliceQpY and InitialSliceQpC are derived as follows.

InitialSliceQpY=aps_attrattr_initial_qp+ash_attr_qp_delta_luma

InitialSliceQpC=aps_attrattr_initial_qp+aps_attr_chroma_qp_offset+ash_attr_qp_delta_chroma The ash_attr_layer_qp_delta_present_flag field indicates whether the ash_attr_layer_qp_delta_luma field and the ash_attr_layer_qp_delta_chroma field are present in the attribute slice header (ASH) for each layer. For example, the ash_attr_layer_qp_delta_present_flag field equal to 1 indicates that the ash_attr_layer_qp_delta_luma field and the ash_attr_layer_qp_delta_chroma field are present in the ASH. The ash_attr_layer_qp_delta_present_flag field equal to 0 indicates that the ash_attr_layer_qp_delta_luma field and the ash_attr_layer_qp_delta_chroma field are absent from the ASH.

When the value of the ash_attr_layer_qp_delta_present_flag field is TRUE, the attribute slice header may further include an ash_attr_num_layer_qp_minus1 field.

ash_attr_num_layer_qp_minus1 plus 1 indicates the number of layers in which the ash_attr_qp_delta_luma field and the ash_attr_qp_delta_chroma field are signaled. When the ash_attr_num_layer_qp field is not signaled, the value of the ash_attr_num_layer_qp field will be 0. According to embodiments, NumLayerQp, which specifies the number of layers, may be obtained acquired by adding 0 to the value of the ash_attr_num_layer_qp_minus1 field (NumLayerQp=ash_attr_num_layer_qp minus1+1).

According to embodiments, when the value of the ash_attr_layer_qp_delta_present_flag field is TRUE, the geometry slice header may include an iteration statement according to the value of NumLayerQp. In this case, according to an embodiment, i is initialized to 0, and is incremented by 1 each time the iteration statement is executed. The iteration statement is iterated until the value of i becomes equal to the value of NumLayerQp. This iteration statement includes an ash_attr_layer_qp_delta_luma[i] field. In addition, when the value of the attribute_dimension_minus1[ash_attr_sps_attr_idx] field is greater than 0, the iteration statement may further include an ash_attr_layer_qp_delta_chroma[i] field.

The ash_attr_layer_qp_delta_luma field indicates the luma delta quantization parameter (qp) from the InitialSliceQpY in each layer.

The ash_attr_layer_qp_delta_chroma field indicates the chroma delta qp from the InitialSliceQpC in each layer.

The variables SliceQpY[i] and SliceQpC[i] with i=NumLayerQPNumQPLayer−1 are derived as follows.

```
for ( i = 0; i < NumLayerQPNumQPLayer; i++) {
SliceQpY[i] = InitialSliceQpY + ash_attr_layer_qp_delta_luma[i]
SliceQpC[i] = InitialSliceQpC + ash_attr_layer_qp_delta_chroma[i]
}
```

When the value of the ash_attr_region_qp_delta_present_flag field is equal to 1, the attribute slice header (attribute_slice_header( )) according to the embodiments indicates that ash_attr_region_qp_delta, region bounding box origin, and size are present in the current attribute slice header. The ash_attr_region_qp_delta_present_flag field equal to 0 indicates the ash_attr_region_qp_delta, region bounding box origin and size are not present in the current ASH.

In other words, when the ash_attr_layer_qp_delta_present_flag field is equal to 1, the attribute slice header may further include an ash_attr_qp_region_box_origin_x field, an ash_attr_qp_region_box_origin_y field, an ash_attr_qp_region_box_origin_z field, an ash_attr_qp_region_box_width field, an ash_attr_qp_region_box_height field, an ash_attr_qp_region_box_depth field, and an ash_attr_region_qp_delta field.

The ash_attr_qp_region_box_origin_x field indicates the x offset of the region bounding box relative to slice_origin_x.

The ash_attr_qp_region_box_origin_y field indicates the y offset of the region bounding box relative to slice_origin_y.

The ash_attr_qp_region_box_origin_z field i indicates the z offset of the region bounding box relative to slice_origin_z.

The ash_attr_qp_region_box_size_width field indicates the width of the region bounding box.

The ash_attr_qp_region_box_size_height field indicates the height of the region bounding box.

The ash_attr_qp_region_box_size_depth field indicates the depth of the region bounding box.

The ash_attr_region_qp_delta field specifies the delta qp from the SliceQpY[i] and SliceQpC[i] of the region specified.

According to embodiments, the variable RegionboxDeltaQp specifying the region box delta quantization parameter is set equal to the value of the ash_attr_region_qp_delta field (RegionboxDeltaQp=ash_attr_region_qp_delta).

FIG. 37 shows a syntax structure of attribute slice data (attribute slice data( ) according to an embodiment of the present disclosure. The attribute slice data (attribute slice data( ) may carry an attribute bitstream belonging to a corresponding slice. The attribute slice data may include an attribute or attribute related data in relation to a part or the entirety of the point cloud.

In FIG. 37, the zerorun field specifies the number of 0 prior to predIndex or residual.

In addition, the predIndex[i] field specifies a predictor index for decoding the value of the i-th point of the attribute. The value of the predIndex[i] field ranges from 0 to the value of the max_num_predictors field.

As described above, a bitstream of point cloud data output from the transmission processor 51005 may include an SPS, a GPS, one or more APSs, tile inventory, and one or more slices. The one or more slices may include a geometry slice, one or more attribute slices, and one or more metadata slices. The geometry slice according to the embodiments consists of a geometry slice header and geometry slice data, and each of the attribute slices includes an attribute slice header and attribute slice data. Each of the metadata slices includes a metadata slice header and metadata slice data. For example, in the point cloud transmission device of FIG. 18, a geometry slice structure, an attribute slice structure, and a metadata slice structure may be generated by the geometry encoder 51003, the attribute encoder 51004, and the signaling processor 51002, respectively, may be generated by the transmission processor 51005, or may be generated using a separate module/component.

FIG. 38 shows an embodiment of a syntax structure of metadata_slice_bitstream( ) according to the present disclosure.

The metadata slice bitstream (metadata_slice_bitstream( )) according to the embodiments may include a metadata slice header (metadata_slice_header( )) and metadata slice data (metadata_slice_data( )).

FIG. 39 shows an embodiment of a syntax structure of a metadata slice header (metadata_slice_header( )) according to the present disclosure.

The metadata slice header (metadata_slice_header( )) according to the embodiments may include an msh_slice_id field, an msh_geom_slice_id field, an msh_attr_id field, and an msh_attr_slice_id field.

The msh_slice_id field indicates an identifier for identifying the metadata slice bitstream.

The msh_geom_slice_id field indicates an identifier for identifying a geometry slice related to the metadata carried in the metadata slice.

The msh_attr_id field indicates an identifier for identifying an attribute related to the metadata carried in the metadata slice.

The msh_attr_slice_id field indicates an identifier for identifying an attribute slice related to the metadata carried in the metadata slice.

FIG. 40 shows a syntax structure of metadata slice data (metadata_slice_data( )) according to an embodiment of the present disclosure.

The metadata slice data (metadata_slice_data( )) includes a metadata bitstream (metadata_bitstream( )) containing a metadata slice.

The metadata slice header and/or metadata slice data of a metadata slice bitstream according to embodiments may include metadata about point cloud data, for example, a setting value, or 3D block related information such as a tile and a slice.

According to embodiments, the bitstream of the encoded point cloud data includes parameter sets (e.g., SPS, GPS, APS, tile inventory), one or more geometry slices (or geometry slice bitstreams), one or more attribute slices (or attribute slice bitstreams), and/or one or more metadata slices (or metadata slice bitstreams) as shown in FIGS. 21 to 40.

According to an embodiment of the present disclosure, the bitstream of point cloud data is configured as a G-PCC bitstream composed of a sequence of TLV (Type-Length-Value) structures. The TLV structures in the present disclosure may be referred to as TLV encapsulation structures, G-PCC TLV encapsulation structures, or G-PCC TLV structures. According to embodiments, the G-PCC bitstream includes TLV encapsulation structures carrying parameter sets, a coded geometry bitstream (or referred to as a geometry slice), and zero or more coded attribute bitstreams (or referred to as attribute slices). That is, each TLV structure may include one of a sequence parameter set, a geometry parameter set, an attribute parameter set, a geometry slice, an attribute slice, and a metadata slice according to the type information. In one embodiment, the G-PCC bitstream composed of the TLV encapsulation structures may be transmitted directly to the receiving side. In another embodiment, the G-PCC bitstream composed of the TLV encapsulation structures may be encapsulated into a file/segment by the file/segment encapsulator of FIG. 14, 15, or 18 and transmitted to the receiving side.

According to embodiments, the transmission processor 51005 or the file/segment encapsulator 51006 or a separate module/component may generate TLV encapsulation structures including coded geometry bitstream, zero or more coded attribute bitstreams, and/or parameter sets. The G-PCC bitstream in the present disclosure is composed of TLV encapsulation structures.

Figure 41:
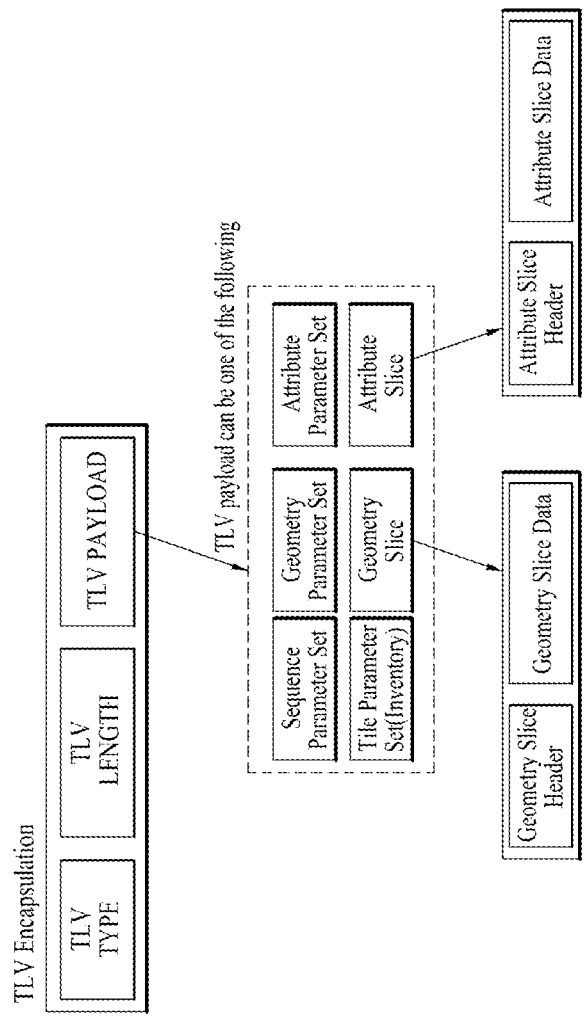
FIG. 41 illustrates an example of a TLV encapsulation structure according to embodiments.

FIG. 41 shows an example of TLV encapsulation structures according to embodiments. Each TLV encapsulation structure consists of a TLV type, a TLV length, and a TLV payload. In present disclosure, the TLV type may be referred to as type information about the TLV payload, a TLV length may be referred to as length information about the TLV payload, and the TLV payload may be referred to as a payload (or payload bytes). According to embodiments, data contained in the TLV payload is distinguished through the type information about the TLV payload. In addition, the length of the TLV payload is indicated through the length information about the TLV payload. TLV payloads of the TLV encapsulation structures may include an SPS, a GPS, one or more APSs, tile inventory, a geometry slice, one or more attribute slices, and one or more metadata slices. According to embodiments, the TLV payload of each TLV encapsulation structure may contain one of an SPS, a GPS, one or more APSs, tile inventory, a geometry slice, one or more attribute slices, and one or more metadata slices according to the type information about the TLV payload.

The information contained in the SPS may include part or all of the information contained in the SPS of FIG. 24, and accordingly refer to the description of FIG. 24 for details. The information contained in the tile inventory may include part or all of the information contained in the tile inventory of FIG. 30, and accordingly refer to the description of FIG. 30 for details. The information contained in the GPS may include part or all of the information contained in the GPS of FIG. 27, and accordingly refer to the description of FIG. 27 for details. The information contained in the APS may include part or all of the information contained in the APS of FIG. 28, and accordingly refer to the description of FIG. 28 for details.

For details of the geometry slice, refer to the description of FIGS. 32 to 34. For details of the attribute slice, refer to the description of FIGS. 35 to 37.

The metadata may be used by the receiver to decode a geometry or attribute slice or to render reconstructed point clouds. According to embodiments, metadata may be contained in the G-PCC bitstream.

For example, when the point cloud has different color values according to the viewing orientation (or viewpoint) as shown in FIG. 2 or 14, the metadata may be a viewing orientation (or viewpoint) associated with information about each color among the attribute values of the point cloud. For example, when the color of the points constituting the point cloud displayed when viewed from (0, 0, 0) is rendered differently from the color thereof displayed when viewed from (0, 90, 0), there may be two kinds of color information associated with each point. In addition, in order to render appropriate color information according to the user's viewing orientation (or viewpoint) in the rendering operation, the viewing orientation (or viewpoint) associated with corresponding color information should be transmitted. To this end, each metadata slice may contain one or more viewing orientations (or viewpoints), and may contain information on a slice containing attribute information associated therewith.

Thereby, the player may find an associated attribute slice based on the information contained in the appropriate metadata slice according to the user's viewing orientation (or viewpoint), decode the same, and perform rendering based on the decoding result. Accordingly, attribute values according to the user's viewing orientation (viewpoint) may be rendered and provided.

FIG. 42 shows an exemplary syntax structure of tlv_encapsulation( ) according to embodiments. In an embodiment, tlv_encapsulation( ) of FIG. 42 includes a tlv_type field, a tlv_num_payload_bytes field, and a tlv_payload_byte field.

The tlv_type field indicates the type of data contained in the tlv_payload_byte field.

The tlv_num_payload_bytes field indicates the length of the tlv_payload_byte field.

The tlv_payload_byte field is repeated as many times as the value of the tlv_num_payload_bytes field, and contains data indicated by the tlv_type field.

In one embodiment, the tlv_type field corresponds to the TLV type of FIG. 41, the tlv_num_payload_bytes field corresponds to the TLV length of FIG. 41, and the tlv_payload_byte field corresponds to the TLV payload of FIG. 41.

FIG. 43 exemplarily shows payload types for a TLV encapsulation structure allocated to the tlv_type field according to embodiments.

Referring to FIG. 43, in one embodiment, the tlv_type field equal to 0 indicates that data contained in the payload of the TLV encapsulation structure is a sequence parameter set. The tlv_type field equal to 1 indicates that the data is a geometry parameter set. The tlv_type field equal to 2 indicates that the data is a geometry slice. The tlv_type field equal to 3 indicates that the data is an attribute parameter set. The tlv_type field equal to 4 indicates that the data is an attribute slice. The tlv_type field equal to 5 indicates that the data is tile inventory (or a tile parameter set). The tlv_type field equal to 6 indicates that the data is a frame boundary marker. The tlv_type field equal to 7 indicates that the data is a metadata slice. The geometry slice according to the embodiments contains geometry data that is decoded independently from another slice. The attribute slice according to the embodiments contains attribute data that is decoded independently from another slice. The metadata slice according to the embodiments contains metadata that is decoded independently from another slice.

The meaning, order, deletion, addition, and the like of values assigned to the tlv_type field may be easily changed by those skilled in the art, and accordingly the present invention will not be limited to the above-described embodiment.

In an embodiment, the payload of the TLV encapsulation structure conforms to the format of a High Efficiency Video Coding (HEVC) Network Abstraction Layer (NAL) unit.

As described above, the G-PCC bitstream composed of TLV encapsulation structures may be transmitted to the receiving side as it is, or may be encapsulated in the form of a file/segment and transmitted to the receiving side by the file/segment encapsulator of FIG. 14, 15, or 18.

According to embodiments, the file/segment encapsulator of the transmission device of FIG. 14, 15, or 18 may encapsulate the G-PCC bitstream into a file and transmit the file. According to embodiments, the file may be decapsulated into the G-PCC bitstream by the file/segment decapsulator of the reception device of FIG. 14, 16, or 20.

For example, a G-PCC bitstream consisting of TLV encapsulation structures carrying parameter sets, geometry slices (or referred to as coded geometry bitstreams), and zero or more attribute slices (or referred to as coded attribute bitstreams) may be encapsulated in an ISOBMFF (ISO Base Media File Format)-based file format by the file/segment encapsulator of FIG. 14, 15, or 18.

In this case, according to an embodiment, the G-PCC bitstream consisting of TLV encapsulation structures is stored in a single track or multiple tracks in the ISOBMFF-based file.

According to embodiments, the ISOBMFF-based file may be referred to as a container, a container file, a media file, a G-PCC file, or the like. Specifically, the file may be composed of a box and/or information, which may be referred to as ftyp, moov, or mdat.

The ftyp box (file type box) may provide information related to a file type or file compatibility for a corresponding file. The receiver may identify the file by referring to the ftyp box.

The mdat box is referred to as a media data box, and contains actual media data. According to embodiments, a geometry slice (or referred to as a coded geometry bitstream) and zero or more attribute slices (or referred to as coded attribute bitstreams) are included in a sample of the mdat box in the file. According to embodiments, the sample may be referred to as a G-PCC sample.

The moov box, which is also referred to as a movie box, may contain metadata about the media data of the file. For example, it may contain information necessary for decoding and playback of the corresponding media data, and may include information on tracks and samples of the file. The moov box may serve as a container for all metadata. The moov box may be a box of the highest layer among the metadata-related boxes.

According to embodiments, the moov box includes a trak box providing information related to a track of the file. The trak box includes a mdia box (MediaBox) providing media information of the corresponding track and a corresponding a track reference container (tref) box for reference between the track and a sample of the file corresponding to the track.

The mdia box may include a media information container (minf) box providing information on the corresponding media data and a handler (hdlr) box (HandlerBox) indicating the type of a stream.

The minf box may include a sample table (stbl) box that provides metadata related to a sample of the mdat box.

The stbl box may include a sample description (stsd) box that provides information on an employed coding type and initialization information necessary for the coding type.

According to embodiments, the stsd box may include a sample entry for a track.

According to embodiments, signaling information (or metadata) such as a sequence parameter set, a geometry parameter set, an attribute parameter set, and a tile inventory may be contained in a sample entry of the moov box or a sample of the mdat box in a file.

In the present disclosure, a track carrying part or all of the G-PCC bitstream in a file may be referred to as a G-PCC track. According to embodiments, the G-PCC track may be defined as a volumetric visual track carrying a geometry slice (or referred to as a coded geometry bitstream), or an attribute slice (or referred to as a coded attribute bitstream), or both the geometry slice and the attribute slice.

According to embodiments, the volumetric visual track may be identified by a volumetric visual media handler type 'volv' in the hdlr box (HandlerBox) of the mdia box (MediaBox) and/or a volumetric visual media header (vvhd) in the minf box of the mdia box (MediaBox). The minf box is referred to as a media information container or a media information box. The minf box is included in the mdia box. The mdia box is included in a trak box. The trak box is included in the moov box of the file. A single volumetric visual track or multiple volumetric visual tracks may are present in the file.

According to embodiments, volumetric visual tracks may use the VolumetricVisualMediaHeaderBox in the MediaInformationBox. The MediaInformationBox is referred to as a minf box, and the VolumetricVisualMediaHeaderBox is referred to as a vvhd box. According to embodiments, the volumetric visual media header (vvhd) box may be defined as follows.

Box Type: 'vvhd'
Container: MediaInformationBox
Mandatory: Yes
Quantity: Exactly one The syntax of the volumetric visual media header box (that is, the vvhd type box) according to embodiments is shown below.

```
aligned(8) class VolumetricVisualMediaHeaderBox
    extends FullBox('vvhd', version = 0, 1) {
}
```

In the syntax above, the version field may have an integer value indicating the version of the box.

According to embodiments, volumetric visual tracks may use VolumetricVisualSampleEntry for transmission of signaling information as follows.

```
class VolumetricVisualSampleEntry(codingname) extends SampleEntry
(codingname) {
    unsigned int(8)[32] compressorname;
    // other boxes from derived specifications
}
```

In the syntax above, the compressorname field indicates the name of the compressor for informative purposes.

According to embodiments, a sample entry from which the VolumetricVisualSampleEntry is inherited (that is, the higher class of the VolumetricVisualSampleEntry) includes a GPCC decoder configuration box (GPCCConfigurationBox).

According to embodiments, the GPCCConfigurationBox may contain GPCCDecoderConfigurationRecord( ) as follows.

```
class GPCCConfigurationBox extends Box('gpcC') {
    GPCCDecoderConfigurationRecord( ) GPCCConfig;
}
```

According to embodiments, the GPCCDecoderConfigurationRecord( ) provides G-PCC decoder configuration information for geometry-based point cloud content.

According to embodiments, the syntax of the GPCCDecoderConfigurationRecord( ) may be defined as follows.

```
aligned(8) class GPCCDecoderConfigurationRecord {
    unsigned int(8) configurationVersion = 1;
    unsigned int(8) profile_idc;
    unsigned int(24) profile_compatibility_flags;
    unsigned int(8) level_idc;
    unsigned int(8) numOfSetupUnitArrays;
    for (i=0; i< numOfSetupUnitArrays; i++) {
        unsigned int(7) SetupUnitType;
        bit(1)   SetupUnit completeness;
        unsigned int(8) numOfSepupUnit;
        for (i=0; numOfSepupUnit; i++) {
            tlv_encapsulation setupUnit;
        }
    }
    // additional fields
}
```

The configurationVersion is a version field. Incompatible changes to the record are indicated by a change in the version number. Also, compatible extensions to this record will extend it and will not change the configuration version code.

Values for the profile_idc field, profile_compatibility_flags field, and level_idc field are valid for all parameter sets that are activated when the stream described by this record is decoded.

The profile_idc field indicates a profile a profile to which the stream associated with this configuration record conforms. According to embodiments, the profile_idc field may include a profile code to indicate a specific profile of G-PCC.

When the value of the profile_compatibility_flags field is 1, it indicates that the bitstream conforms to the profile indicated by the profile_idc field. According to embodiments, each bit in the profile_compatibility_flags field may only be set if all the parameter sets set that bit.

The level_idc field includes a profile level code. According to embodiments, the level indication level_idc shall indicate a level of capability equal to or greater than the highest level indicated for the highest tier in all the parameter sets.

The numOfSetupUnitArrays field may indicate the number of arrays of G-PCC setup units of the type indicated by the setupUnitTye field. That is, it indicates the number of arrays of G-PCC setup units included in GPCCDecoderConfigurationRecord( ).

According to embodiments, an iteration statement iterated as many times as the value of the numOfSetupUnitArrays field is contained in the GPCCDecoderConfigurationRecord( ). The iteration statement may include a setupUnit array. In this case, according to an embodiment, i is initialized to 0, and is incremented by 1 each time the iteration statement is executed. The iteration statement is iterated until the value of i becomes equal to the value of numOfSetupUnitArrays.

The setupUnit array includes constant G-PCC TLV encapsulation structures for a bitstream referenced by a volumetric visual sample entry in which GPCCDecoderConfigurationRecord( ) is present. In the present disclosure, the type of G-PCC TLV encapsulation structures is restricted to indicate one of a sequence parameter set, a geometry parameter set, an attribute parameter set, and a tile inventory.

The setupUnitType field indicates the type of G-PCC setup units. That is, the value of the setupUnitTye field may be one of values indicating SPS, GPS, APS, and tile inventory.

The setupUnit completeness equal to 1 may indicate that all setup units of the given type are in the following array and none are in the stream. setupUnit completeness equal to 0 may indicate that additional setup units of the indicated type may be in the stream.

The numOfSetupUnits field indicates the number of G-PCC setup units of the type indicated by the setupUnitTye field.

According to embodiments, an iteration statement iterated as many times as the value of the numOfSetupUnits field is contained in GPCCDecoderConfigurationRecord( ) The iteration statement may contain setupUnit. In this case, according to an embodiment, i is initialized to 0, and is incremented by 1 each time the iteration statement is executed. The iteration statement is iterated until the value of i becomes equal to the value of the numOfSetupUnits field.

The setupUnit is an instance of a TLV encapsulation structure carrying the setup unit of the type indicated by the setupUnitTye field, for example SPS, GPS, APS, or a tile inventory (or TPS).

According to embodiments, volumetric visual tracks may use VolumetricVisualSample for actual data transmission.

According to embodiments, a volumetric visual sample entry may be referred to as a sample entry or a G-PCC sample entry, and VolumetricVisualSample may be referred to as a sample or a G-PCC sample.

According to embodiments, a single volumetric visual track or multiple volumetric visual tracks may be present in the file.

According to embodiments, the single volumetric visual track may be referred to as a single track or a G-PCC single track, and the multiple volumetric visual tracks may be referred to as multiple tracks or multiple G-PCC tracks.

According to embodiments, the signaling processor 51002 and/or the file/segment encapsulator 51006 may add, to the sample entry, signaling information related to grouping of samples, grouping of tracks, encapsulation of a single track of the G-PCC bitstream, or encapsulation of multiple tracks of the G-PCC bitstream, or signaling information for supporting spatial access in the form of a box or FullBox. The signaling information may include at least one of a GPCC entry information box (GPCCEntryInfoBox), a GPCC component type box (GPCCComponentTypeBox), a cubic region information box (CubicRegionInfoBox), a 3D bounding box information box (3DBoundingBoxInfoBox), or a tile inventory box (TileInventoryBox). The respective boxes will be described in detail below.

G-PCC Entry Information Structure

According to embodiments, the syntax of the GPCCEntryInfoBox may be defined as follows.

```
class GPCCEntryInfoBox extends Box('gpsb') {
    GPCCEntryInfoStruct ( );
}
```

In the syntax above, the GPCCEntryInfoBox having a sample entry type of 'gpsb' may include GPCCEntryInfoStruct ( ).

The syntax of the GPCCEntryInfoStruct ( ) may be defined as follows.

```
aligned(8) class GPCCEntryInfoStruct {
    unsigned int (1)        main_entry_flag;
    unsigned int(1)         dependent_on;
    if(dependent_on) {      //non-entry
        unsigned int(16)    dependency_id;
    }
}
```

The GPCCEntryInfoStruct ( ) may include a main_entry_flag field and a dependent_on field.

The main_entry_flag field indicates whether it is an entry point for decoding a G-PCC bitstream.

The dependent_on field indicates whether its decoding is dependent on others. When present in the sample entry, the dependent_on field indicates that decoding of samples in the track is dependent on other tracks.

When the value of the dependent_on field is TRUE, the GPCCEntryInfoStruct( ) may further include a dependency_id field.

The dependency_id field indicates the identifier of tracks to decode the associated data. When it is present in the sample entry, the dependency_id field indicates the identifier of a track carrying a G-PCC sub-bitstream on which decoding of samples in the track is dependent. When it is present in the sample group, the dependency_id field indicates the identifier of samples carrying a G-PCC sub-bitstream on which decoding of associated samples is dependent on.

According to embodiments, information included in GPCCEntryInfoBox including GPCCEntryInfoStruct( ) or GPCCEntryInfoStruct( ) may be referred to as G-PCC entry information.

According to embodiments, the G-PCC entry information is used for multiple tracks and may be signaled in a sample entry.

G-PCC Component Information Structure

According to embodiments, the syntax of the G-PCC component type box (GPCCComponentTypeBox) may be defined as follows.

```
aligned(8) class GPCCComponentTypeBox extends FullBox('gtyp',
version = 0, 0) {
    GPCCComponentTypeStruct( );
}
```

According to embodiments, GPCCComponentTypeBox having a sample entry type of 'gtyp' may contain GPCCComponentTypeStruct( ).

The syntax of the GPCCComponentTypeStruct( ) may be defined as follows.

```
aligned(8) class GPCCComponentTypeStruct {
    unsigned int(8)         numOfComponents;
    for (i=0; i< numOfComponents; i++) {
        unsigned int(8)     gpcc_type;
        if(gpcc_type == 4)
            unsigned int(8) AttrIdx;
    }
    // additional fields
}
```

The numOfComponents field indicates the number of G-PCC components signaled in the GPCCComponentTypeStruct.

According to embodiments, an iteration statement iterated as many times as the value of the numOfComponents field may be included in the GPCCComponentTypeStruct. The iteration statement may include a gpcc_type field. In this case, according to an embodiment, i is initialized to 0, and is incremented by 1 each time the iteration statement is executed. The iteration statement is iterated until the value of i becomes equal to the value of numOfComponents.

The gpcc_type field indicates the type of the G-PCC component. For example, gpcc_type equal to 2 may indicate the geometry component. gpcc_type equal to 4 may indicate the attribute component.

When the value of the gpcc_type field is 4, that is, when it indicates the attribute component, the iteration statement may further include an AttrIdx field.

The AttrIdx field may indicate the identifier of an attribute signaled in SPS( ).

According to embodiments, a G-PCC component type box (GPCCComponentTypeBox) may be included in a sample entry for multiple tracks. When the GPCCComponentTypeBox is present in a sample entry of tracks carrying a part or all of the G-PCC bitstream, the GPCCComponentTypeStruct( ) may indicate one or more G-PCC component types carried by the respective tracks.

According to embodiments, GPCCComponentTypeStruct( ) or GPCCComponentTypeBox including GPCCComponentTypeStruct( ) may be referred to as G-PCC component information.

3D Point Information Structure

According to embodiments, the syntax of 3D point information structure (3DPointStruct) may be defined as follows.

```
aligned(8) class 3DPointStruct( ) {
    unsigned int(16)        pos_x;
    unsigned int(16)        pos_y;
    unsigned int(16)        pos_z;
}
```

The 3DPointStruct( ) may contain a pos_x field, a pos_y field, and a pos_z field.

The pos_x field, posy field, and pos_z field may indicate x, y, and z offsets in Cartesian coordinates.

According to embodiments, the 3D point information (3DPointStruct) may be included in cubic region information.

Cubic Region Information Structure

According to embodiments, the cubic region information box (CubicRegionInfoBox) may contain CubicRegionStruct( ) and/or CubicRegionSetStruct( ).

According to embodiments, the syntax of CubicRegionInfoBox containing CubicRegionSetStruct( ) may be defined as follows.

```
aligned(8) class CubicRegionInfoBox extends FullBox('gpcr', 0, 0) {
CubicRegionSetStruct ( );
}
```

According to embodiments, the syntax of CubicRegionSetStruct( ) contained in CubicRegionInfoBox having a sample entry type of 'gpcr' may be defined as follows.

```
aligned(8) class CubicRegionSetStruct( ) {
    unsinged int(16)        num_regions;
    unsigned int(1)         tile_id_present;
    for(i=0; i< num_regions; i++){
    CubicRegionStruct( );
    if(tile_id present){
    unsigned int(8) num_tiles[i];
    for(int j=0; j < num_tiles; j++)
    unsigned int(16) tile_id[j];
    }
    }
}
```

The num_regions field may indicate the number of spatial regions included in the CubicRegionSetStruct( ) That is, the num_regions field may indicate the number of 3D spatial regions of point cloud data.

The tile_id_present field indicates whether the identifier of tiles related to a corresponding spatial region is present. For example, the tile_id_present field equal to 0 may indicate that the identifier of tiles related to the spatial region is not present. The tile_id_present field equal to 1 may indicate that the identifier of tiles related to the spatial region is present.

According to embodiments, a first iteration statement iterated as many times as the value of the num_regions field may be included in CubicRegionSetStruct( ). The first iteration statement may include CubicRegionStruct( ). In this case, according to an embodiment, i is initialized to 0, and is incremented by 1 each time the first iteration statement is executed. The first iteration statement is iterated until the value of i becomes equal to the value of the num_regions field.

The CubicRegionStruct( ) provides 3D spatial region information about some or all point cloud data indicated by an anchor point and a spatial region size along X, Y, and Z axes related to the anchor point.

According to embodiments, when the value of the tile_id_present field is TRUE (i.e., 1), the first iteration statement may further contain a num_tiles[i] field.

The num_tiles[i] field indicates the number of tiles related to the i-th spatial region.

According to embodiments, the first iteration statement may include a second iteration statement iterated as many times as the value of the num_tiles[i] field. The second iteration statement may contain tile_id[j] field. In this case, according to an embodiment, j is initialized to 0, and is incremented by 1 each time the second iteration statement is executed. The second iteration statement is iterated until the value of j becomes equal to the value of the num_tiles[i] field.

The tile_id[j] field indicates an identifier of the j-th tile related to the i-th spatial region.

That is, the second iteration statement includes identification information for identifying tile(s) to which point cloud data of the i-th spatial region belongs.

According to embodiments, the syntax of the CubicRegionStruct( ) may be defined as follows.

```
aligned(8) class CubicRegionStruct( ) {
    unsinged int(16)        cubic_region_id;
    3DPointStruct           anchor_point;
    unsigned int(16)        cubic_region_dx;
    unsigned int(16)        cubic_region_dy;
    unsigned int(16)        cubic_region_dz;
}
```

The CubicRegionStruct( ) may contain a cubic_region_id field, an anchor_point field, a cubic_region_dx field, a cubic_region_dy field, and a cubic_region_dz field.

The cubic_region_id field may indicate an identifier of the corresponded cubic region (or the corresponded spatial region).

The anchor_point field may indicate the origin point of the cubic region.

cubic_region_dx, cubic_region_dy, and cubic_region_dz may indicate the extension of this cubic region along the X, Y, Z axes, respectively relative to the point indicated by the anchor_point.

The CubicRegionInfoBox may further include tile information related to a spatial region. For example, when the i-th spatial region relates to two tiles, identifiers of the two tiles related to the i-th spatial region may be provided.

As described above, the CubicRegionInfoBox provides related 3D spatial region information including X, Y, and Z coordinate of the anchor point and the size of the spatial region along the X, Y, and Z axes related to the anchor point. According to embodiments, when the CubicRegionInfoBox is present in the sample entry of a track carrying a geometry bitstream and/or an attribute bitstream, it indicates static 3D spatial region information about point cloud data carried in the track.

According to embodiments, information included in CubicRegionSetStruct( ) and/or CubicRegionInfoBox containing CubicRegionStruct( ), or CubicRegionSetStruct( ) containing CubicRegionStruct( ), or CubicRegionSetStruct( ), or CubicRegionStruct( ) may be referred to as cubic region information, 3D region information, 3D spatial region information, or spatial region information.

According to embodiments, the cubic region information may be included in G-PCC 3D bounding box information, the sample entry of a single track, the sample entry of multiple tracks, information for sample grouping, or information for track grouping.

G-PCC 3D Bounding Box Information Structure

According to embodiments, the syntax of the 3D bounding box information box (3DBoundingBoxInfoBox) may be defined as follows.

```
aligned(8) class 3DBoundingBoxInfoBox extends FullBox('gpbb', 0, 0) {
    3DBoundingBoxInfoStruct( );
}
```

According to embodiments, 3DBoundingBoxInfoBox having a sample entry type of 'gpbb' may contain 3DBoundingBoxInfoStruct( )

The syntax of 3DBoundingBoxInfoStruct( ) may be defined as follows.

```
aligned(8) class 3DBoundingBoxInfoStruct extends
CubicRegionStruct( ) {
    unsinged int(16)        3d_bb_log2_scale;
    CubicRegionStruct       3d_bb_info;
    unsinged int(7)         reserved = 0 ;
    unsinged int(1)         source_presence;
    if(source_presence){
        unsinged int(16)    3d_bb_log2_scale_src;
        CubicRegionStruct   3d_bb_src_info;
    }
}
```

The 3DBoundingBoxInfoStruct inherits CubicRegionStruct( ) and may include a 3d_bb_log 2_scale field, a 3d_bb_info, and a source_presence field.

The 3d_bb_info may include 3D bounding box information about the point cloud data. The 3D bounding box information may include the origin and extension of the region along the X, Y, Z axes, of the point cloud data.

The 3d_bb_log 2_scale may indicate the scaling factor to scale the 3D bounding box information indicated by fields in 3d_bb_info.

The source presence may indicate whether the 3D bounding box information of source point cloud data is present.

When the value of source presence is TRUE, that is, when it indicates that the bounding box information of the source point cloud data is present, 3DboundingBoxInfoStruct( ) may include 3d_bb_log 2_scale_src and 3d_bb_src_info.

The 3d_bb_src_info may indicate the 3D bounding box information. The 3D bounding box information may include the origin and the extension of the region along the X, Y, Z axes, of the source point cloud data.

The 3d_bb_log 2_scale_src may indicate the scaling factor to scale the 3D bounding box information of the source point cloud data indicated by fields in 3d_bb_src_info.

According to embodiments, information included in 3DBoundingBoxInfoStruct( ) or 3DBoundingBoxInfoBox including 3DBoundingBoxInfoStruct( ) may be referred to as G-PCC 3D bounding box information or 3D bounding box information.

According to embodiments, the G-PCC 3D bounding box information may be included in a sample entry of a single track, a sample entry of multiple tracks, information for grouping samples, or information for grouping tracks.

G-PCC 3D Tile Information Structure

According to embodiments, the syntax of 3D tile information (TileInfoStruct) may be defined as follows.

```
aligned(8) class TileInfoStruct( ) {
    unsinged int(16)    tile_id;
    unsinged int(16)    tile_frame_idx;
    unsinged int(16)    tile_bounding_box_offset_x;
    unsinged int(16)    tile_bounding_box_offset_y;
    unsinged int(16)    tile_bounding_box_offset_z;
    unsinged int(16)    tile_bounding_box_size_width;
    unsinged int(16)    tile_bounding_box_size_height;
    unsinged int(16)    tile_bounding_box_size_depth;
}
```

TileInfoStruct( ) may include a tile_id field, a tile_frame_idx field, a tile_bounding_box_offset_x field, a tile_bounding_box_offset_y field, a tile_bounding_box_offset_z field, a tile_bounding_box_size_width field, a tile_bounding_box_size_height field, and a tile_bounding_box_size_depth field.

The tile_id field indicates the identifier of a corresponding 3D tile.

The tile_frame_idx field specifies the identifier of an associated point cloud frame associated with the 3D tile.

The tile_bounding_box_offset_x field, the tile_bounding_box_offset_y field, and the tile_bounding_box_offset_z field may indicate x, y, and z offsets of the 3D tile in Cartesian coordinates.

The tile_bounding_box_size_width field, the tile_bounding_box_size_height field, and the tile_bounding_box_size_depth field indicate the width, height, and depth of the 3D tile in Cartesian coordinates.

According to embodiments, 3D tile information (referred to as TileInfoStruct or G-PCC 3D tile information) may be included in signaling information for 3D tile track grouping.

G-PCC 3D Tile Inventory Information Structure

According to embodiments, the syntax of a tile inventory box (TileInventoryBox) may be defined as follows.

```
aligned(8) class TileInventoryBox extends FullBox('gpti', 0, 0) {
    TileInventoryStruct ( );
}
```

According to embodiments, TileInventoryBox having a sample entry type of 'gpti' may contain TileInventoryStruct( ).

According to embodiments, the syntax structure of TileInventoryStruct( ) may be defined as follows.

```
aligned(8) class TileInventoryStruct( ) {
    unsinged int(16)    tile_frame_idx;
    unsinged int(16)    num_tiles_minus 1;
    for(i=0; I < num_tiles_minus1 ; i++){
        unsinged int(16)    tile_id;
        unsinged int(16)    tile_bounding_box_offset_x[i];
        unsinged int(16)    tile_bounding_box_offset_y[i];
        unsinged int(16)    tile_bounding_box_offset_z[i];
        unsinged int(16)    tile_bounding_boxsizewidth[i];
        unsinged int(16)    tile_bounding_box_size_height[i];
        unsinged int(16)    tile_bounding_box_size_depth[i];
    }
}
```

TileInventoryStruct( ) may contain a tile_frame_idx field and a num_tiles_minus1 field.

The tile_frame_idx may specify the identifier of an associated point cloud frame associated with the tile inventory structure (or box).

The num_tiles_minus1 field plus 1 may indicate the number of tile bounding boxes present in the tile inventory.

According to embodiments, TileInventoryStruct( ) may contain an iteration statement iterated as many times as the value of num_tiles_minus1. In this case, according to an embodiment, i is initialized to 0, and is incremented by 1 each time the iteration statement is executed. The iteration statement is iterated until the value of i becomes equal to the value of the num_tiles_minus1 field.

The iteration statement may contain a tile_id field, a tile_bounding_box_offset_x[i] field, a tile_bounding_box_offset_y[i] field, a tile_bounding_box_offset_z[i] field, a tile_bounding_box_size_width[i] field, a tile_bounding_box_size_height[i] field, and a tile_bounding_box_size_depth[i] field.

The tile_id field may indicate the identifier of the i-th tile.

The tile_bounding_box_offset_x[i] field, the tile_bounding_box_offset_y[i] field, and the tile_bounding_box_offset_z[i] field may indicate x, y, and z offsets of the i-th tile in Cartesian coordinates.

The tile_bounding_box_size_width[i] field, the tile_bounding_box_size_height[i] field, and the tile_bounding_box_size_depth[i] field indicate the width, height, and depth of the i-th tile in Cartesian coordinates.

According to embodiments, information included in TileInventoryStruct( ) or TileInventoryBox containing TileInventoryStruct( ) may be referred to as G-PCC 3D tile inventory information or 3D tile inventory information.

According to embodiments, the G-PCC 3D tile inventory information may be included in a sample entry of a single track, a sample entry of multiple tracks, information for sample grouping, or information for track grouping.

Sample Group

According to embodiments, the file/segment encapsulator of FIG. 14, 15, or 18 may group one or more samples to generate a sample group. According to embodiments, the file/segment encapsulator, metadata processor, or signaling processor of FIG. 14, 15, or 18 may signal signaling information associated with the sample group in a sample, a sample group, or a sample entry. That is, sample group information associated with the sample group may be added to a sample, a sample group, or a sample entry. The sample group information will be described in detail along with the sample group below. According to embodiments, the sample group information may be 3D bounding box sample group information, 3D region sample group information, 3D tile sample group information, 3D tile inventory sample group information, and the like.

3D Bounding Box Sample Group

According to embodiments, one or more samples to which the same 3D bounding box may be applied may be grouped. This sample group may be referred to as a 3D bounding box sample group.

According to embodiments, the syntax of 3D bounding box sample group information (GPCC3DBoundingBoxSampleGroupDescriptionEntry) associated with the 3D bounding box sample group may be defined as follows.

```
aligned(8) class GPCC3DBoundingBoxSampleGroupDescriptionEntry( )
extends SampleGroupDescriptionEntry('3bsg') {
3DBoundingBoxInfoStruct ( );
}
```

According to embodiments, 3D bounding box sample group information (GPCC3DBoundingBoxSampleGroupDescriptionEntry) having a grouping type of '3bsg' may contain 3DBoundingBoxInfoStruct( ). In other words, '3bsg' grouping type for sample grouping represents the assignment of samples in tracks to 3D bounding box sample group information carried in this sample group.

According to embodiments, when a SampleToGroupBox with grouping_type equal to '3bsg' is present, an accompanying SampleGroupDescriptionBox with the same grouping type is present, and contains the ID of this sample group to which samples belong to.

3DBoundingBoxInfoStruct( ) includes 3D bounding box information applied to samples of the 3D bounding box sample group.

The 3D bounding box information, that is, fields contained in 3DBoundingBoxInfoStruct( ) has been described in detail in the "G-PCC 3D Bounding Box Information Structure," and thus a description thereof will be skipped to avoid redundant description.

Spatial Region Sample Group

According to embodiments, one or more samples associated with the same 3D region may be grouped. This sample group may be referred to as a spatial region sample group.

According to embodiments, the syntax of 3D region (or spatial region including a cubic region) sample group information (GPCCCubicRegionSampleGroupDescriptionEntry) associated with the spatial region sample group may be defined as follows.

```
aligned(8) class GPCCCubicRegionSampleGroupDescriptionEntry( )
extends SampleGroupDescriptionEntry('srsg') {
CubicRegionStruct ( );
}
```

According to embodiments, 3D region (or spatial region including a cubic region) sample group information (GPCCCubicRegionSampleGroupDescriptionEntry) having a grouping type of 'srsg' may include CubicRegionStruct( ). In other words, the 'srsg' grouping_type for sample grouping represents the assignment of samples in tracks to the spatial region (including cubic region) sample group information carried in this sample group.

According to embodiments, when a SampleToGroupBox with grouping_type equal to 'srsg' is present, an accompanying SampleGroupDescriptionBox with the same grouping type is present, and contains the ID of the sample group which samples belong to.

CubicRegionStruct( ) contains cubic region information applied to the samples of the spatial region sample group.

For the cubic region information, that is, fields contained in CubicRegionStruct( ), refer to the detailed description given above in the "Cubic Region Information Structure." A description thereof will be skipped in order to avoid redundant description Spatial Region Set Sample Group According to embodiments, one or more samples associated with the same one or more 3D regions may be grouped. This sample group may be referred to as a spatial region set sample group.

According to embodiments, the syntax of sample group information (GPCCCubicRegionSetSampleGroupDescriptionEntry) of one or more 3D regions (or one or more spatial regions including cubic regions) associated with the spatial region set sample group may be defined as follows.

```
aligned(8) class GPCCCubicRegionSetSampleGroupDescriptionEntry( )
extends SampleGroupDescriptionEntry('sssg') {
CubicRegionSetStruct ( );
}
```

According to embodiments, the 3D region (or spatial region including a cubic region) sample group information (GPCCCubicRegionSetSampleGroupDescriptionEntry) having a grouping type of 'sssg' may include CubicRegionSetStruct( ) In other words, 'sssg' grouping_type for sample grouping represents the assignment of samples in tracks to one or more spatial regions (including cubic regions) sample group information carried in the spatial region set sample group.

According to embodiments, when a SampleToGroupBox with grouping_type equal to 'sssg' is present, an accompanying SampleGroupDescriptionBox with the same grouping type is present, and contains the ID of this sample group which samples belong to.

CubicRegionSetStruct( ) contains information on one or more spatial regions (including cubic regions) applied to the samples of the sample group.

For information on the one or more spatial regions (including cubic regions), that is, fields included in the CubicRegionSetStruct( ), refer to the detailed description given above in the "Cubic Region Information Structure." A description thereof will be skipped in order to avoid redundant description.

3D Tile Sample Group

According to embodiments, one or more samples associated with the same 3D tile may be grouped. This sample group may be referred to as a 3D tile sample group.

According to embodiments, the syntax of 3D tile sample group information (GPCC3DTileSampleGroupDescriptionEntry) associated with the 3D tile sample group may be defined as follows.

```
aligned(8) class GPCC3DTileSampleGroupDescriptionEntry( )
extends SampleGroupDescriptionEntry('3tsg') {
TileInfoSturct ( );
}
```

According to embodiments, the 3D tile sample group information (GPCC3DTileSampleGroupDescriptionEntry) having a grouping type of '3tsg' may include TileInfoStruct( ). In other words, '3tsg' grouping_type for sample grouping represents the assignment of samples in tracks to the 3D tile sample group information carried in the sample group.

According to embodiments, when a SampleToGroupBox with grouping_type equal to '3tsg' is present, an accompanying SampleGroupDescriptionBox with the same grouping type is present, and contains the ID of the sample group which samples belong to.

TileInfoStruct( ) contains 3D tile information applied to the samples of the sample group.

For the 3D tile information, that is, fields contained in the TileInfoStruct( ), refer to the detailed description given above in the "G-PCC 3D Tile Information Structure". A description thereof will be skipped to avoid redundant description.

3D Tile Inventory Sample Group

According to embodiments, one or more samples associated with the same tile inventory information may be grouped. This sample group may be referred to as a 3D tile inventory sample group.

According to embodiments, the syntax of 3D tile inventory sample group information (GPCC3DTileInventorySampleGroupDescriptionEntry) associated with the 3D tile inventory sample group may be defined as follows.

```
aligned(8) class GPCC3DTileInventorySampleGroupDescriptionEntry( )
extends SampleGroupDescriptionEntry('tisg') {
TileInventoryStruct ( );
}
```

According to embodiments, 3D tile inventory sample group information (GPCC3DTileInventorySampleGroupDescriptionEntry) having a grouping type of 'tisg' may include TileInventoryStruct( ). In other words, 'tisg' grouping type for sample grouping represents the assignment of samples in tracks to the tile inventory sample group information carried in the sample group.

According to embodiments, when a SampleToGroupBox with grouping type equal to 'tisg' is present, an accompanying SampleGroupDescriptionBox with the same grouping type is present, and contains the ID of the sample group which samples belong to.

TileInventoryStruct( ) contains 3D tile inventory information applied to the samples of the sample group.

For the 3D tile inventory information, that is, fields contained in TileInventoryStruct( ) refer to the detailed description given above in the "G-PCC 3D Tile Inventory Information Structure." A description thereof will be skipped to avoid redundant description.

Track Group

According to embodiments, the file/segment encapsulator of FIG. 14, 15, or 18 may group one or more tracks to generate a track group. According to embodiments, the file/segment encapsulator, metadata processor, or signaling processor of FIG. 14, 15, or 18 may signal signaling information associated with the track group in a sample, a track group, or a sample entry. That is, track group information associated with the track group may be added to a sample, a track group, or a sample entry. The track group information will be described in detail below along with the track group below. According to embodiments, the track group information may include 3D bounding box track group information, point cloud composition track group information, spatial region track group information, 3D tile track group information, 3D tile inventory track group information, and the like.

3D Bounding Box Track Group

According to embodiments, one or more tracks to which the same 3D bounding box may be applied may be grouped. This track group may be referred to as a 3D bounding box track group.

According to embodiments, the syntax of 3D bounding box track group information (GPCC3DBoundingBoxTrackGroupBox) associated with the 3D bounding box track group may be defined as follows.

```
aligned(8) class GPCC3DBoundingBoxTrackGroupBox
   extends TrackGroupTypeBox('3btg') {
   3DBoundingBoxInfoStruct ( );
}
```

According to embodiments, 3D bounding box track group information (GPCC3DBoundingBoxTrackGroupBox) having a track group type of '3btg' may include 3DBoundingBoxInfoStruct( ). According to embodiments, TrackGroupTypeBox with track group type equal to '3btg' indicates that this track belongs to a group of tracks that are associated with the 3D bounding box track group information (i.e., a 3D bounding box track group). According to embodiments, tracks belonging to the same 3D bounding box track group information have the same value of track_group_id for track_group_type '3btg', and track_group_id of tracks from 3D bounding box track group information differs from track_group_id of tracks from any other 3D bounding box track group information.

3DBoundingBoxInfoStruct( ) contains 3D bounding box information applied to the tracks of the 3D bounding box track group. For example, when the timed metadata track carrying 3D bounding box information is present, 3DBoundingBoxInfoStruct( ) indicates the initial 3D bounding box information of associated point cloud data.

For the 3D bounding box information, that is, fields contained in 3DBoundingBoxInfoStruct( ), refer to the detailed description given above in the "G-PCC 3D Bounding Box Information Structure." A description thereof will be skipped to avoid redundant description.

G-PCC Point Cloud Composition Track Group

According to embodiments, when point cloud data is partitioned and stored into one or more tracks, one or more tracks carrying data belonging to the same point cloud data may be grouped. This track group may be referred to as a G-PCC point cloud composition track group.

According to embodiments, the syntax of point cloud composition track group information (GPCCCompositionTrackGroupBox) associated with the G-PCC point cloud composition track group may be defined as follows.

```
aligned(8) class GPCCCompositionTrackGroupBox
   extends TrackGroupTypeBox('gctg') {
   3DBoundingBoxInfoStruct ( );
}
```

According to embodiments, point cloud composition track group information (GPCCCompositionTrackGroupBox) having a track group type of 'gctg' may include 3DBoundingBoxInfoStruct( ). According to embodiments, TrackGroupTypeBox with track_group_type equal to 'gctg' indicates that this track belongs to a group of tracks (i.e., a G-PCC point cloud composition track group) that is associated with the same source point cloud data.

According to embodiments, tracks belonging to the same point cloud data have the same value of track_group_id for track_group_type equal to 'gctg', and the track group id of tracks from one point cloud data differs from the track_group_id of tracks from any other point cloud data.

3DBoundingBoxInfoStruct( ) contains 3D bounding box information applied to the tracks of the G-PCC point cloud composition track group.

For the 3D bounding box information, that is, fields contained in the 3DBoundingBoxInfoStruct( ), refer to the detailed description given above in the "G-PCC 3D Bounding Box Information Structure." A description thereof will be skipped to avoid redundant description.

Spatial Region Track Group

According to embodiments, when the point cloud data is partitioned and stored into one or more tracks, one or more tracks carrying data belonging to the same 3D region of the point cloud data may be grouped. This track group may be referred to as a spatial region track group.

According to embodiments, the syntax of spatial region track group information (GPCCCubicRegionTrackGroupBox) associated with the spatial region track group may be defined as follows.

```
aligned(8) class GPCCCubicRegionTrackGroupBox
   extends TrackGroupTypeBox('srtg') {
   CubicRegionStruct ( );
}
```

According to embodiments, spatial region track group information (GPCCCubicRegionTrackGroupBox) having a track group type of 'srtg' may include CubicRegionStruct( ). According to embodiments, TrackGroupTypeBox with track_group_type equal to 'srtg' may indicate that this track belongs to a group of tracks that are associated with same spatial region (i.e., spatial region track group).

According to embodiments, tracks belonging to the same spatial region have the same value of track_group_id for track_group_type 'srtg'. The track_group_id of tracks from one spatial region differs from the track_group_id of tracks from any spatial region.

CubicRegionStruct( ) contains cubic region information (or spatial region information) applied to the tracks of the spatial region track group. For the cubic region information, that is, fields contained in CubicRegionStruct( ), refer to the detailed description given above in the "Cubic Region Information Structure." A description thereof will be skipped to avoid redundant description.

According to embodiments, when timed metadata tracks carrying associated spatial region information are present, it may indicate the initial spatial region information.

According to embodiments, each track may belong to one or more spatial region track groups.

3D Tile Track Group

According to embodiments, one or more tracks carrying data belonging to the same 3D tile of the point cloud data may be grouped. This track group may be referred to as a 3D tile track group.

According to embodiments, the syntax of 3D tile track group information (GPCC3DTileTrackGroupBox) associated with the 3D tile track group may be defined as follows.

```
aligned(8) class GPCC3DTileTrackGroupBox
   extends TrackGroupTypeBox('3dtg') {
   TileInfoStruct ( );
}
```

According to embodiments, 3D tile track group information (GPCC3DTileTrackGroupBox) having a track group type of '3dtg' may include TileInfoStruct( ) According to embodiments, TrackGroupTypeBox with track_group_type '3dtg' may indicate that this track belongs to a group of tracks associated with the same 3D tile (i.e., a 3D tile track group).

According to embodiments, tracks belonging to the same 3D tile have the same value of track group id for the track_group_type equal to '3dtg'. In addition, track group id of tracks from one 3D tile is different from track_group_id of tracks from any other 3D tile.

TileInfoStruct( ) contains 3D tile information applied to the tracks of the 3D tile track group. For the 3D tile information, that is, fields contained in TileInfoStruct( ), refer to the detailed description given above in the "G-PCC 3D Tile Information Structure." A description thereof will be skipped to avoid redundant description.

According to embodiments, when timed metadata tracks carrying associated 3D tile information or spatial region information are present, it indicates the initial 3D tile information.

According to embodiments, each track may belong to one or more 3D tile track groups.

3D Tile Inventory Track Group

According to embodiments, one or more tracks to which the same tile inventory of point cloud data is applied may be grouped. This track group may be referred to as a 3D tile inventory track group.

According to embodiments, the syntax of 3D tile track group information (GPCCTileInventoryTrackGroupBox) associated with the 3D tile inventory track group may be defined as follows.

```
aligned(8) class GPCCTileInventoryTrackGroupBox
extends TrackGroupTypeBox('titg') {
    TileInventoryStruct ( );
}
```

According to embodiments, 3D tile inventory track group information (GPCCTileInventoryTrackGroupBox) having a track group type of 'titg' may include TileInventoryStruct( ). According to embodiments, TrackGroupTypeBox with track_group_type equal to 'titg' may indicate that this track belongs to a group of tracks to which the same tile inventory information is applied (i.e., a 3D tile inventory track group).

According to embodiments, tracks belonging to the same tile inventory have the same value of track_group_id for track_group_type 'titg'. In addition, the track group id of tracks from one tile inventory differs from the track_group_id of tracks from any other tile inventory.

TileInventoryStruct( ) contains 3D tile inventory information applied to the tracks of the 3D tile inventory track group. For the 3D tile inventory information, that is, fields contained in TileInventoryStruct( ), refer to the detailed description given above in the "G-PCC 3D Tile Inventory Information Structure." A description thereof will be skipped to avoid redundant description.

According to embodiments, when timed metadata tracks carrying the related tile inventory information or spatial region information are present, it may indicate initial tile inventory information.

According to embodiments, each track may belong to one or more tile inventory track groups.

As least one of GPCCConfigurationBox, GPCCEntryInfoBox, GPCCComponentTypeBox, CubicRegionInfoBox, 3DBoundingBoxInfoBox, or TileInventoryBox described above may be contained in a sample entry of a single track and/or a sample entry of multiple tracks in a file. According to embodiments, the sample entry of a single track may contain GPCCConfigurationBox, 3DBoundingBoxInfoBox, CubicRegionInfoBox, and TileInventoryBox. According to embodiments, the sample entry of multiple tracks may contain GPCCConfigurationBox, GPCCEntryInfoBox, GPCCComponentTypeBox, 3DBoundingBoxInfoBox, CubicRegionInfoBox, and TileInventoryBox.

According to embodiments, the sample entry of a single track (GPCCSampleEntry( )) for storage of a G-PCC bitstream and/or the sample entry of multiple tracks (GPCCSampleEntry( )) may inherit a volumetric visual sample entry (VolumetricVisualSampleEntry).

Figure 44:
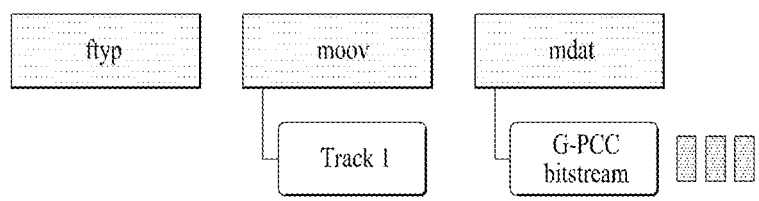
FIG. 44 is a diagram illustrating a file structure for a single track storing G-PCC bitstream according to embodiments.

FIG. 44 is a diagram illustrating a structure of a G-PCC file for a single track storing a G-PCC bitstream according to embodiments. That is, it shows an exemplary layout of an ISOBMFF-based file containing a single track.

In FIG. 44, the ISOBMFF-based file may be referred to as a container, a container file, a media file, a G-PCC file, or the like. Specifically, the file may be composed of a box and/or information, which may be referred to as ftyp, moov, or mdat.

According to embodiments, an stsd box (SampleDescriptionBox) included in a moov box of a file may include a sample entry for a single track storing a G-PCC bitstream. According to embodiments, the single track storing a G-PCC bitstream may be referred to as a G-PCC track.

According to embodiments, a sequence parameter set, a geometry parameter set, an attribute parameter set, and a tile inventory may be contained in a sample entry of the moov box or a sample of the mdat box in a file.

According to embodiments, a geometry slice (or referred to as a coded geometry bitstream) and zero or more attribute slices (or referred to as coded attribute bitstreams) are contained in a sample of the mdat box in the file.

According to embodiments, when a G-PCC bitstream is stored in a single track of the file, each sample may contain multiple G-PCC components. That is, each sample is composed of one or more TLV encapsulation structures. According to embodiments, a sequence parameter set, a geometry parameter set, an attribute parameter set, a tile inventory, a geometry slice, and an attribute slice are each referred to as a G-PCC component.

According to embodiments, the sample entry of the single track may be defined as follows.

Sample Entry Type: 'gpe1', 'gpeg'
Container: SampleDescriptionBox
Mandatory: A 'gpe1' or 'gpeg' sample entry is mandatory
Quantity: One or more sample entries may be present The sample entry type 'gpe1' or 'gpeg' is mandatory, and one or more sample entries may be present.

According to embodiments, the G-PCC track may use a VolumetricVisualSampleEntry with a sample entry type of 'gpe1' or 'gpeg'.

According to embodiments, the sample entry of the G-PCC track may contain a GPCCConfigurationBox. The GPCCConfigurationBox may contain GPCCDecoderConfigurationRecord( ).

GPCCDecoderConfigurationRecord( ) may contain at least one of a configurationVersion field, a profile_idc field, a profile_compatibility_flags field, a level_idc field, a numOfSetupUnitArrays field, a SetupUnitType field, a completeness field, a numOfSetupUnits field, or a setupUnit field. For details of each field, refer to the description given above regarding each field having the same name.

According to embodiments, the setupUnit array field contained in GPCCDecoderConfigurationRecord( ) may include TLV encapsulation structures including one SPS.

According to embodiments, when the sample entry type is 'gpe1', all parameter sets, for example, the SPS, GPS, APS, tile inventory (or tile parameter set) are included in the array of setupUnits.

According to embodiments, when the sample entry type is 'gpeg', the parameter sets may be included in the array (i.e., sample entry) of setupUnits or in the stream (i.e., sample).

The following is an example of the syntax of GPCCSampleEntry with a sample entry type of 'gpe1'.

```
aligned(8) class GPCCSampleEntry( ) extends
VolumetricVisualSampleEntry ('gpe1') {
    GPCCConfigurationBox config; //mandatory
    3DBoundingBoxInfoBox( );
    CubicRegionInfoBox( );
    TileInventoryBox( );
}
```

According to embodiments, GPCCSampleEntry with a sample entry type of 'gpe1' may contain GPCCConfigurationBox, 3DBoundingBoxInfoBox( ), CubicRegionInfoBox( ), and TileInventoryBox( ).

3DBoundingBoxInfoBox( ) indicates 3D bounding box information about point cloud data related to samples carried in this track. For details of 3D bounding box information, that is, fields contained in the 3DBoundingBoxInfoBox( ), refer to the detailed description given above in the "G-PCC 3D Bounding Box Information Structure." A description thereof will be skipped to avoid redundant description.

CubicRegionInfoBox( ) indicates one or more spatial region information of point cloud data carried in samples in the track. For details of one or more spatial region information, that is, fields contained in the CubicRegionInfoBox( ), refer to the detailed description given above in the "Cubic Region Information Structure." A description thereof will be skipped to avoid redundant description.

TileInventoryBox( ) indicates 3D tile inventory information of point cloud data carried in samples in the track. For details of 3D tile inventory information, that is, fields contained in TileInventoryStruct( ), refer to the detailed description given above in the "G-PCC 3D Tile Inventory Information Structure." A description thereof will be skipped to avoid redundant description.

FIG. 45 is a diagram illustrating an exemplary sample structure of an mdat box when a G-PCC bitstream is stored in a single track of a file according to embodiments.

That is, the sample in FIG. 45 includes a geometry TLV encapsulation structure including a geometry slice (i.e., a coded geometry bitstream). When present, the sample may further include parameter set TLV encapsulation structures including one or more parameter sets. Also, when present, the sample may further include attribute TLV encapsulation structures including one or more attribute slices (i.e., coded attribute bitstreams).

When each sample is composed of multiple TLV encapsulation structures, it is necessary to access each TLV encapsulation structure in the sample. This is because the reception device needs to decode the geometry slice first, and the attribute slice needs to be decoded based on the decoded geometry.

In addition, when a sample is composed of multiple TLV encapsulation structures, each of the multiple TLV encapsulation structures may be stored in a subsample. According to embodiments, the subsample may be referred to as a G-PCC subsample. For example, when a sample contains a parameter set TLV encapsulation structure including a parameter set, a geometry TLV encapsulation structure including a geometry slice, and an attribute TLV encapsulation structure including an attribute slice, the parameter set TLV encapsulation structure, the geometric TLV encapsulation structure, and the attribute TLV encapsulation structure are each stored in subsamples. According to an embodiment, a subsample contains only one TLV encapsulation structure.

In this case, in order to enable access to each G-PCC component in the sample, a type of the TLV encapsulation structure carried in the subsample is required.

The syntax of a sample format given when a G-PCC bitstream is stored in a single track is described below.

In the syntax shown below, each sample (GPCCSample) may correspond to a single point cloud frame, and be composed of one or more TLV encapsulation structures which belong to the same presentation time. Each TLV encapsulation structure may contain a single type of TLV payload (or referred to as G-PCC payload), for example, a geometry slice or an attribute slice. In addition, a sample may be self-contained (e.g., a sync sample).

```
aligned(8) class GPCCSample {
    unsigned int GPCCLength = sample_size; //Size of Sample
    for (i=0; i< GPCCLength; )     // to end of the sample
    {
        tlv_encapsulation gpcc_unit;
        i += (1+4)+ gpcc_unit.tlv_num_payload_bytes;
    }
}
```

In the syntax above, the GPCCLength field indicates the length of the sample, and the gpcc_unit field contains an instance of a TLV encapsulation structure containing a single G-PCC component (e.g., geometry slice).

The syntax of a sub-sample is described below.

According to embodiments, the G-PCC sub-sample contains only one TLV encapsulation structure. According to embodiments, one Sub SampleInformationBox may be present in SampleTableBox (stbl) of the moov box or in TrackFragmentBox (traf) of each of the MovieFragmentBoxes (moof).

If Sub SampleInformationBox is present, the 8-bit type value of the TLV encapsulation structure and if the TLV encapsulation structure contains attribute payload, the 6-bit value of the attribute index, may be included in the 32-bit codec_specific_parameters field of the sub-sample entry in the Sub SampleInformationBox. According to embodiments, the type of each sub-sample may be identified by parsing the codec_specific_parameters field of the sub-sample entry in the Sub SampleInformationBox.

The codec_specific_parameters field of the SubSampleInformationBox may be defined as follows.

```
unsigned int(8) PayloadType;
if(PayloadType == 4) {// attribute payload
    unsigned int(6) AttrIdx;
    bit(18) reserved = 0;
}
else
    bit(24) reserved = 0;
```

In the sub-sample syntax above, the PayloadType field indicates tlv_type of the TLV encapsulation structure in the sub-sample. For example, when the value of the parameter PayloadType is 4, it may indicate the attribute slice (i.e., attribute payload).

The AttrIdx field indicates an identifier of attribute information of a TLV encapsulation structure containing attribute payload in the sub-sample. This may be the same as ash_attr_sps_attr_idx of the TLV encapsulation structure containing attribute payload in the sub-sample.

Figure 46:
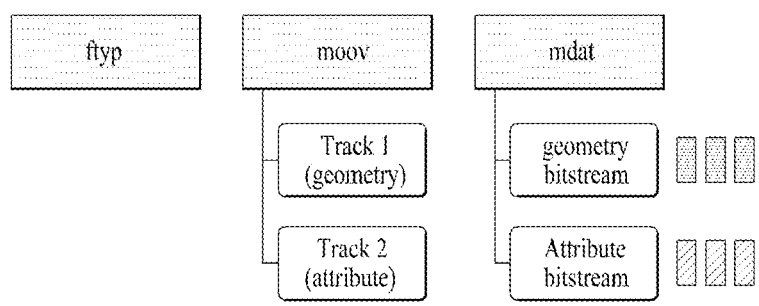
FIG. 46 is a diagram illustrating a file structure for multiple tracks storing G-PCC bitstream according to embodiments.

FIG. 46 is a diagram illustrating an ISOBMFF-based G-PCC file structure for multiple tracks storing a G-PCC bitstream according to embodiments. That is, the figure show an example of a multi-track container of a G-PCC bitstream when other G-PCC components are carried in separate tracks.

In FIG. 46, the ISOBMFF-based file may be referred to as a container, a container file, a media file, a G-PCC file, or the like. Specifically, the file may be composed of a box and/or information, which may be referred to as ftyp, moov, or mdat.

According to embodiments, when a G-PCC bitstream is carried in multiple tracks of an ISOBMFF-based file, each geometry or attribute slice may be mapped to an individual track. For example, a geometry slice (referred to as a geometry sub-stream, a coded geometry bitstream, or a coded geometry slice bitstream) is mapped to track 1, and an attribute slice (referred to as an attribute sub-stream, a coded attribute bitstream, or a coded attribute slice bitstream) is mapped to track 2.

According to embodiments, a track carrying a geometry slice (e.g., track 1) may be referred to as a geometry track or a G-PCC geometry track, and a track carrying an attribute slice (e.g., track 2) may be referred to as an attribute track or a G-PCC attribute track. In addition, the geometry track may be defined as a volumetric visual track carrying a geometry slice, and the attribute track may be defined as a volumetric visual track carrying an attribute slice.

According to embodiments, a track carrying the part of G-PCC bitstream containing both a geometry slice and an attribute slice may be referred to as a multiplexed track.

According to embodiments, when a geometry slice and an attribute slice are stored in separate tracks, each sample in the track contains at least one TLV encapsulation structure carrying data of a single G-PCC component. In this case, each sample does not contain both the geometry and the attribute, and does not contain multiple attributes.

According to embodiments, multi-track encapsulation of the G-PCC bitstream enables a G-PCC player to effectively access one of the G-PCC components. For example, the reception device should decode the geometry first, and then decode the attribute based on the decoded geometry. In other words, the G-PCC player should access the track carrying the geometry bitstream prior to the attribute bitstreams.

According to embodiments, when a G-PCC bitstream is carried in multiple tracks, the following conditions need to be satisfied in order for the G-PCC player to effectively access one of the G-PCC components.

When the G-PCC bitstream composed of TLV encapsulation structures is carried in multiple tracks, a track carrying the geometry bitstream (or geometry slice) shall be an entry point.

Then, in the sample entry, a new box is added to indicate the role of the stream contained in this track. In an embodiment, the new box is the GPCCComponentTypeBox described above. That is, GPCCComponentTypeBox may be contained in the sample entry for multiple tracks.

GPCCComponentTypeBox may contain GPCCComponentTypeStruct( ).

When GPCCComponentTypeBox is present in a sample entry of tracks carrying a part or all of the G-PCC bitstream, GPCCComponentTypeStruct( ) may indicate one or more G-PCC component types, e.g., geometry and attribute, carried by each track.

For example, when gpcc_type, which is contained in GPCCComponentTypeStruct( ), is equal to 2, it may indicate a geometry component. gpcc_type equal to 4 may indicate an attribute component. In addition, when gpcc_type is equal to 4, that is, when it indicates the attribute component, an AttrIdx field indicating the identifier of the attribute signaled in SPS( ) may be further included.

For details of information related to the G-PCC component types, that is, fields contained in GPCCComponentTypeStruct( ), refer to the detailed description of the "G-PCC Component Information Structure." A description thereof will be skipped in order to avoid redundant description.

According to embodiments, when a G-PCC bitstream is carried in multiple tracks, the syntax of a sample entry may be defined as follows.

Sample Entry Type: 'gpc1' or 'gpcg'
Container: SampleDescriptionBox ('stsd')
Mandatory: 'gpc1', 'gpcg' sample entry is mandatory
Quantity: One or more sample entries may be present The sample entry type of 'gpc1' or 'gpcg' is mandatory, and one or more sample entries may be present.

Multiple tracks (e.g., geometry or attribute tracks) may use VolumetricVisualSampleEntry with a sample entry type of 'gpc1' or 'gpcg'.

According to embodiments, a sample entry of multiple tracks may contain a G-PCC decoder configuration box (GPCCConfigurationBox). GPCCConfigurationBox may contain a G-PCC decoder configuration record (GPCCDecoderConfigurationRecord( ).

According to embodiments, GPCCDecoderConfigurationRecord( ) provides decoder configuration information for geometry-based point cloud content.

According to embodiments, at least one of a sequence parameter set, a geometry parameter set, an attribute parameter set, or a tile inventory may be contained in GPCCDecoderConfigurationRecord( ) in the sample entry.

GPCCDecoderConfigurationRecord( ) may contain at least one of a configurationVersion field, a profile_idc field, a profile_compatibility_flags field, a level_idc field, a numOfSetupUnitArrays field, a SetupUnitType field, a completeness field, a numOfSetupUnits field, or a tlv_encapsulation setupUnit field. For details of each field, refer to the description given above regarding each field having the same name.

In one embodiment, the array of setup units in GPCCDecoderConfigurationRecord( ) and all data contained in the samples of the track are stored in a TLV encapsulation structure. In addition, multiple sample entries may be used to indicate sections of G-PCC data using different configuration or parameter sets.

According to embodiments, the array of setup units contained in GPCCDecoderConfigurationRecord( ) may contain TLV encapsulation structures including one SPS.

According to embodiments, when the sample entry type is 'gpc1' or 'gpcq', GPCCComponentTypeBox is present in the sample entry.

In an embodiment, when the sample entry type is 'gpc1', the SPS, GPS, and tile inventory may all be contained in a setupUnit array in the sample entry of geometry tracks carrying a geometry bitstream. Also, all related APS may be included in the setupUnit array in the sample entry of attribute tracks carrying an attribute bitstream.

In one embodiment, when the sample entry type is 'gpcg', the SPS, APS, GPS, or tile inventory may be contained in the sample entry (i.e., setupUnit array) of the track or in the sample (i.e., stream) of the track.

An exemplary syntax of the G-PCC sample entry (GPCCSampleEntry) with a sample entry type of 'gpc1' is shown below.

```
aligned(8) class GPCCSampleEntry( ) extends
   VolumetricVisualSampleEntry ('gpc1') {
   GPCCConfigurationBox config;
   GPCCComponentTypeBox( );
   GPCCEntryInfoBox( );
   3DBoundingBoxInfoBox( );
   CubicRegionInfoBox( );
   TileInventoryBox( );
}
```

According to embodiments, GPCCSampleEntry with a sample entry type of 'gpc1' may contain GPCCConfigurationBox, GPCCComponentTypeBox( ), GPCCEntryInfoBox( ), 3DBoundingBoxInfoBox( ), CubicRegionInfoBox( ), and TileInventoryBox( ).

The GPCCConfigurationBox contains a GPCCDecoderConfigurationRecord( ). GPCCDecoderConfigurationRecord( ) provides decoder configuration information for a G-PCC bitstream. According to embodiments, at least one of SPS, GPS, APS, or a tile inventory may be contained in the array of setup units of GPCCDecoderConfigurationRecord( ) in the sample entry. Since GPCCDecoderConfigurationRecord( ) has been described in detail above, description thereof will be skipped to avoid redundant description.

The 3DBoundingBoxInfoBox( ) indicates 3D bounding box information of point cloud data associated with samples carried on this track. For details of the 3D bounding box information, that is, fields contained in 3DBoundingBoxInfoBox( ), refer to the detailed description given above in the "G-PCC 3D Bounding Box Information Structure." A description thereof will be skipped to avoid redundant description.

The GPCCComponentTypeBox( ) indicates the type of a G-PCC component carried in each track. According to embodiments, when G-PCC component data of multiple types are multiplexed in one track, for example, when a geometry sub-stream and an attribute sub-stream are multiplexed in one track, the GPCCComponentTypeBox may indicate the types of multiple G-PCC components carried in the respective tracks. According to embodiments, when multiple component types are indicated and there is no component type sample group, the order of signaled component type in GPCCComponentTypeBox may indicate the order of associated sub-sample in each sample in the track. For details of the information related to the G-PCC component types, that is, fields contained in GPCCComponentTypeBox( ), refer to the detailed description given above in the "G-PCC Component Information Structure." A description thereof will be skipped to avoid redundant description.

The GPCCEntryInfoBox( ) represents entry information about the track. For example, it may indicate whether the track is an entry point for decoding a G-PCC bitstream. For information related to the entry point, that is, fields contained in GPCCEntryInfoBox( ), refer to the detailed description given above in the "G-PCC entry information structure." A description thereof will be skipped to avoid redundant description.

The CubicRegionInfoBox( ) indicates one or more spatial region information of point cloud data carried in samples in the track. For details of the one or more spatial region information, that is, fields contained in the CubicRegionInfoBox( ), refer to the detailed description given above in the "Cubic Region Information Structure." A description thereof will be skipped to avoid redundant description.

The TileInventoryBox( ) indicates 3D tile inventory information of point cloud data carried in samples in the track. For details of the 3D tile inventory information, that is, fields contained in the TileInventoryStruct( ), refer to the detailed description given above in the "G-PCC 3D Tile Inventory Information Structure." A description thereof will be skipped to avoid redundant description.

Figure 47:
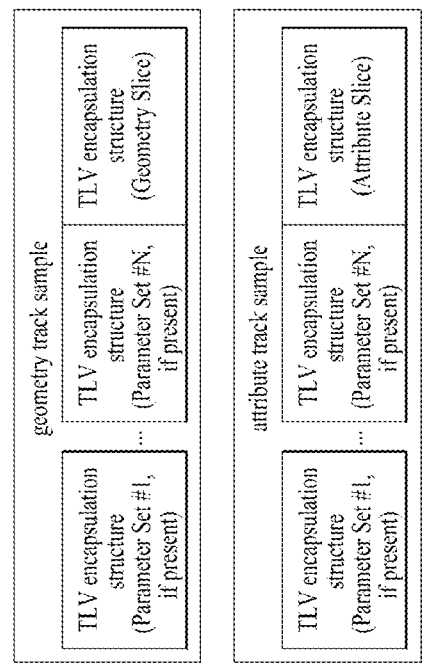
FIG. 47 is a diagram illustrating an exemplary sample structure when a G-PCC bitstream is stored in multiple tracks according to embodiments.

FIG. 47 is a diagram illustrating an exemplary structure of samples of the mdat box when a G-PCC bitstream composed of TLV encapsulation structures is stored in multiple tracks in a file according to embodiments. According to embodiments, each sample contains one or more TLV encapsulation structures. In this case, each sample does not contain both geometry and attributes, and does not contain multiple attributes.

In FIG. 47, a sample of a geometry track (or referred to as a G-PCC geometry track) contains a geometry TLV encapsulation structure containing a geometry slice, but does not contain an attribute TLV encapsulation structure containing an attribute slice. Similarly, a sample of an attribute track (or referred to as a G-PCC attribute track) contains an attribute TLV encapsulation structure containing an attribute slice, but does not contain a geometry TLV encapsulation structure containing a geometry slice. However, when there are parameter sets, the parameter sets may be contained in a sample of the geometry track and/or a sample of the attribute track in a TLV encapsulation structure.

According to embodiments, when a G-PCC bitstream is stored in multiple tracks, the syntax of a sample format may be defined as follows.

```
aligned(8) class GPCCSample {
   unsigned int GPCCLength = sample_size; //Size of Sample
      for (i=0; i< GPCCLength; )      // to end of the sample
      {
      tlv_encapsulation gpcc_unit;
         i += (1+4)+ gpcc_unit.tlv_num_payload_bytes;
      }
}
```

In the syntax above, the G-PCC sample (GPCCsample) may correspond to a single point cloud frame, and may include one or more TLV encapsulation structures belonging to the same presentation time. Each TLV encapsulation structure includes a single type of TLV payload (or referred to as G-PCC payload), for example, a geometry slice, an attribute slice, or a parameter set.

If GPCCComponentTypeBox is present in the sample entry, each sample contains a single TLV encapsulation structure carrying a geometry slice or an attribute slice. In addition, each sample may optionally contain zero or more TLV encapsulation structures carrying parameter sets.

In the syntax above, the GPCCLength field indicates the length of the sample, and the gpcc_unit field contains an instance of a TLV encapsulation structure containing a single G-PCC component (e.g., geometry slice).

According to embodiments, when G-PCC component data of multiple types are multiplexed in one track, for example, when a geometry slice and an attribute slice are multiplexed in one track, one or more sub-samples may be present in each sample. In other words, when one sample is composed of multiple G-PCC TLV encapsulation structures, each of the multiple G-PCC TLV encapsulation structures may be stored as a sub-sample. For example, when a sample contains a parameter set TLV encapsulation structure containing a parameter set and a geometry TLV encapsulation structure containing a geometry slice, the parameter set TLV encapsulation structure and the geometry TLV encapsulation structure are each stored as a sub-sample. As another example, when a sample contains a parameter set TLV encapsulation structure containing a parameter set and an attribute TLV encapsulation structure containing an attribute slice, the parameter set TLV encapsulation structure and the attribute TLV encapsulation structure are each stored as a sub-sample. According to an embodiment, the sub-sample contains only one TLV encapsulation structure.

According to embodiments, a sub-sample contains only one TLV encapsulation structure.

According to embodiments, one Sub SampleInformationBox may be present in SampleTableBox (stbl) of the moov box or in TrackFragmentBox (traf) of each of the MovieFragmentBoxes (moof).

If Sub SampleInformationBox is present, the 8-bit type value of the TLV encapsulation structure and if the TLV encapsulation structure contains attribute payload, the 6-bit value of the attribute index, may be included in the 32-bit codec_specific_parameters field of the sub-sample entry in the Sub SampleInformationBox. According to embodiments, the type of each sub-sample may be identified by parsing the codec_specific_parameters field of the sub-sample entry in the Sub SampleInformationBox.

The codec_specific_parameters field of Sub SampleInformationBox may be defined as follows.

```
unsigned int(8) PayloadType;
if(PayloadType == 4) {// attribute payload
  unsigned int(6) AttrIdx;
  bit(18) reserved = 0;
}
else
  bit(24) reserved = 0;
```

In the sub-sample syntax above, the PayloadType field indicates tlv_type of the TLV encapsulation structure in the sub-sample. For example, when the value of the parameter PayloadType is 4, it may indicate the attribute slice (i.e., attribute payload).

The AttrIdx field indicates an identifier of attribute information of a TLV encapsulation structure containing attribute payload in the sub-sample. This may indicate ash_attr_sps_attr_idx of the TLV encapsulation structure containing attribute payload in the sub-sample.

According to embodiments, when SubSampleInformationBox is not present, the order of sub-samples in the sample may conform to the order of component types signaled in a sample entry or a sample group.

According to embodiments, when a geometry slice (or geometry bitstream) and an attribute slice (or attribute bitstream) are carried in separate tracks, a new box may be added to link the tracks. In an embodiment, the new box may be referred to as TrackReferenceTypeBox.

In an embodiment, TrackReferenceTypeBox is added to TrackReferenceBox (tref box) in TrackBox (trak box) in the sample entry of a geometry track. According to embodiments, TrackReferenceTypeBox contains an array of track IDs specifying tracks referenced by the geometry track. According to embodiments, in order to link the geometry track with the attribute track, reference type of TrackReferenceTypeBox in the sample entry of the geometry track identifies associated attribute tracks. The 4CCs of these track reference types are as follows.

'gpca': the referenced track(s) contain the coded bitstream of G-PCC attribute data FIGS. 48A to 48D illustrate examples carrying point cloud data in a single track or multiple tracks according to embodiments.

Figure 48C:
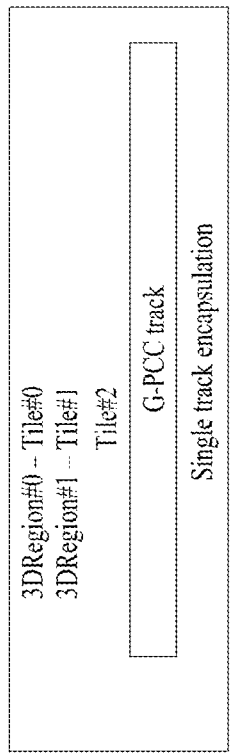
FIGS. 48A to 48D illustrate embodiments of carrying point cloud data in a single track and multiple tracks according to embodiments.
Figure 48D:
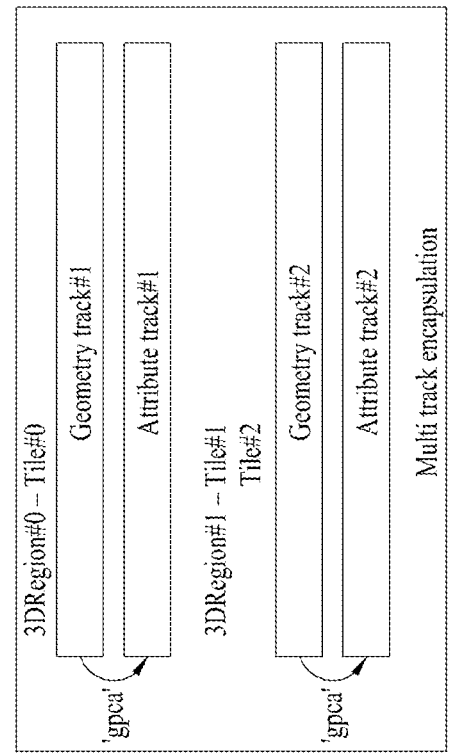
Figure 48A:
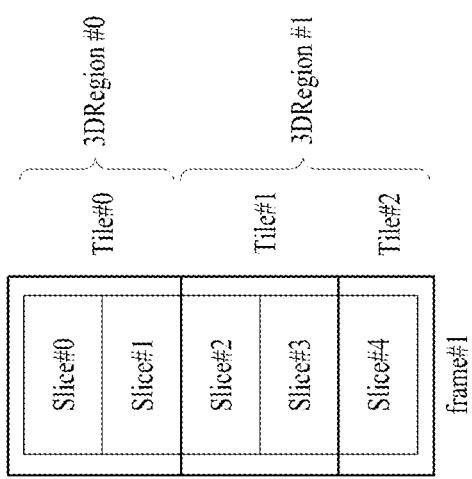

FIG. 48A is an exemplary showing the association between 3D spatial regions and tile according to embodiments. According to embodiments, a tile is a specific rectangular cuboid within an overall bounding box of point cloud data and a 3D spatial region is a specific 3D volume of a 3D space of the overall bounding box. Therefore, each 3D spatial region is related to one or more tiles. In the example of FIG. 48A, 3DRegion #0 is related to tile #0 and 3Dregion #1 is related to tile #1 and tile #2. At this point, 3DRegion #0 may include some data or all data of tile #0 and 3Dregion #1 may include some data or all data of tile #1 and some data or all data of tile #2.

In this case, association information (also referred to as link information or mapping information) between the 3D spatial regions and the tiles is signaled in cubic region information (3D spatial region information). For example, the cubic region information (or 3D spatial region information) may include region identification information for identifying each of 3DRegion #0 and 3DRegion #1, tile identification information for identifying tile #0 related to 3DRegion #0 and tile identification information for identifying each of tile #1 and tile #2 related to 3DRegion #1.

Therefore, it enables the reception device to spatial access point cloud data because the reception device can know the association between 3D spatial regions and tiles based on the cubic region information (or 3D spatial region information).

Figure 48B:
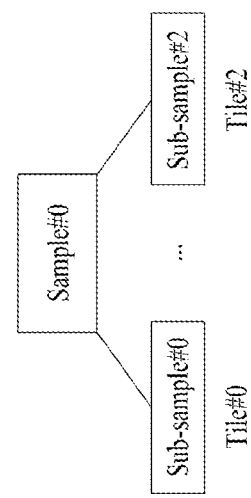

In the example of FIG. 48B, tile #0 is carried in sub-sample #0 of sample #0, tile #1 is carried in sub-sample #1 of sample #0, and tile #2 is carried in sub-sample #2 of sample #0. In this case, the sample entry of the track may contain Sub SampleInformation described above.

In the example of FIG. 48C, geometry slices and attribute slices of tiles #0 to #3 related to 3DRegion #0 and 3DRegion #1 are carried on a single G-PCC track. In this case, the sample entry of the single G-PCC track may contain GPCC-ConfigurationBox, 3DBoundingBoxInfoBox( ), CubicRegionInfoBox( ), and TileInventoryBox( ) described above.

In the example of FIG. 48D, geometry slices of tile #0 related to 3DRegion #0 are carried in geometry track #1; attribute slices of tile #0 related to 3DRegion #0 are carried in attribute track #1; geometric slices of tile #1 and tile #2 related to 3DRegion #1 are carried in geometry track #2; and attribute slices of tile #1 and tile #2 related to 3DRegion #1 are carried in attribute track #2. In this case, the sample entry of each track may contain GPCCConfigurationBox, GPCC-ComponentTypeBox( ), GPCCEntryInfoBox( ), 3DBoundingBoxInfoBox( ), CubicRegionInfoBox( ), and TileInventoryBox( ) described above. In addition, geometry track #1 and attribute track #1 may be linked using a 'gpca' track reference, and geometry track #2 and attribute track #2 may be linked using a 'gpca' track reference.

According to embodiments, in encapsulating a G-PCC bitstream into a file, the file/segment encapsulator of FIG. 14, 15, or 18 may generate metadata tracks carrying metadata contained in the G-PCC bitstream. According to embodiments, the metadata tracks may be referred to as timed metadata tracks.

According to embodiments, metadata carried in the timed metadata tracks may contain at least one of 3D bounding box information, 3D spatial region information (or cubic region information), 3D tile information, or tile inventory information.

According to embodiments, a timed metadata track carrying 3D bounding box information may be referred to as a 3D bounding box timed metadata track, and a timed metadata track carrying 3D spatial region information may be referred to as 3D spatial region timed metadata. According to embodiments, the timed metadata track carrying the 3D tile information or the tile inventory information may be referred to as a 3D tile timed metadata track.

According to embodiments, the 3D bounding box timed metadata track represents 3D bounding box information that may dynamically change over time. According to embodiments, the 3D bounding box timed metadata track may be linked to respective tracks carrying part or all of the G-PCC bitstream, using a 'cdsc' track reference. According to embodiments, the 3D bounding box timed metadata track may be linked to respective track groups carrying part or all of the G-PCC bitstream, using the 'cdsc' track reference. A content description reference 'cdsc' links a descriptive or metadata track to the content which it describes. According to embodiments, metadata tracks may be linked to the track they describe, using a 'cdsc' track reference.

According to embodiments, 3D bounding box information (3DBoundingBoxInfoStruct( ) may be carried in a sample entry and/or a sample of a 3D bounding box timed metadata track.

According to embodiments, the syntax of a sample entry (GPCC3DBBSampleEntry) in the 3D bounding box timed metadata track may be defined as follows.

```
aligned(8) class GPCC3DBBSampleEntry extends
MetadataSampleEntry('dy3b') {
  3DBoundingBoxInfoStruct( );
}
```

According to embodiments, the GPCC3DBBSampleEntry of the 3D bounding box timed metadata track may contain 3DBoundingBoxInfoStruct( ) and the 3DBoundingBoxInfoStruct( ) contains 3D bounding box information including initial 3D bounding box information of related point cloud data.

According to embodiments, the syntax of GPCC3DBBSample in the 3D bounding box timed metadata track may be defined as follows.

```
aligned(8) class GPCC3DBBSample {
  3DBoundingBoxInfoStruct( );
}
```

According to embodiments, GPCC3DBBSample of the 3D bounding box timed metadata track may contain 3DBoundingBoxInfoStruct( ). 3DBoundingBoxInfoStruct( ) represents is 3D bounding box information of related point cloud data that dynamically changes over time.

For example, when a track carrying part or all of the geometry bitstream has a 3D bounding box timed metadata track, associated 3D bounding box information of point cloud data carried in the track may be considered to be dynamic.

For the 3D bounding box information, that is, fields contained in the sample entry of the 3D bounding box timed metadata track and/or 3DBoundingBoxInfoStruct( ) contained in the sample, refer to the detailed description given above in the "G-PCC 3D Bounding Box Information." A description thereof will be skipped to avoid redundant description.

According to embodiments, the 3D spatial region timed metadata track represents 3D spatial region information that may dynamically change over time. According to embodiments, the 3D spatial region timed metadata track may be linked to respective tracks carrying an associated G-PCC bitstream, using the 'cdsc' track reference. According to embodiments, the 3D spatial region timed metadata track may be linked to respective track groups carrying the associated G-PCC bitstream, using the 'cdsc' track reference.

According to embodiments, the 3D spatial region information may be carried in a sample entry and/or a sample of the 3D spatial region timed metadata track.

According to embodiments, the syntax of the sample entry (GPCCSpatialRegionSampleEntry) in the 3D spatial region timed metadata track may be defined as follows.

```
aligned(8) class GPCCSpatialRegionSampleEntry extends
MetadataSampleEntry('dy3r') {
  CubicRegionInfoBox( );
}
```

According to embodiments, GPCCSpatialRegionSampleEntry of the 3D spatial region timed metadata track may contain CubicRegionInfoBox( ). CubicRegionInfoBox( ) contains 3D spatial region information including initial 3D spatial region information of associated point cloud data. That is, the CubicRegionInfoBox( ) may contain default 3D spatial region information applied to the associated point cloud data.

According to embodiments, the syntax of the sample (GPCCSpatialRegionSample) in the 3D spatial region timed metadata track may be defined as follows.

```
aligned(8) class GPCCSpatialRegionSample {
  CubicRegionSetStruct( );
}
```

According to embodiments, the sample (GPCCSpatialRegionSample) of the 3D spatial region timed metadata track may contain CubicRegionSetStruct( ). CubicRegionSetStruct( ) represents associated 3D spatial region information of point cloud data, which dynamically changes.

For example, when a track carrying part or all of the geometry bitstreams has a 3D spatial region timed metadata track, associated 3D spatial region information of the point cloud data carried in the track may be considered to be dynamic.

For details of the 3D bounding box information, that is, fields contained in CubicRegionInfoBox( ) contained in the sample entry of the 3D spatial region timed metadata track and/or CubicRegionSetStruct( ) contained in the sample, refer to the detailed description given above in the "G-PCC 3D Bounding Box Information Structure." A description thereof will be skipped to avoid redundant description.

According to embodiments, the 3D tile timed metadata track represents 3D tile information or tile inventory information that may dynamically change over time. According to embodiments, the 3D tile timed metadata track may be linked to respect tracks carrying an associated G-PCC bitstream, using the 'cdsc' track reference. According to embodiments, the 3D spatial region timed metadata track may be linked to respective track groups carrying the associated G-PCC bitstream, using the 'cdsc' track reference.

According to embodiments, the 3D tile information or tile inventory information may be carried in a sample entry and/or sample of the 3D tile timed metadata track.

According to embodiments, the syntax of the sample entry (GPCCTileInventorySampleEntry) in the 3D tile timed metadata track may be defined as follows.

```
aligned(8) class GPCCTileInventorySampleEntry extends
MetadataSampleEntry('dyti') {
   TileInfoStruct( );
}
or
aligned(8) class GPCCTileInventorySampleEntry extends
MetadataSampleEntry('dyti') {
   Til eInventoryB ox( );
}
```

According to embodiments, the sample entry (GPCCTileInventorySampleEntry) of the 3D tile timed metadata track may contain TileInfoStruct( ) or TileInventoryBox( ). TileInfoStruct( ) may contain 3D tile information including the initial 3D tile information of associated point cloud data, and TileInventoryBox( ) may contain tile inventory information including the initial tile inventory information of the associated point cloud data. That is, TileInfoStruct( ) may contain default 3D tile information applied to the associated point cloud data, and TileInventoryBox( ) may contain default tile inventory information applied to the associated point cloud data.

According to embodiments, the syntax of the sample (GPCCTileInventorySample) in the 3D tile timed metadata track may be defined as follows.

```
aligned(8) class GPCCTileInventorySample {
   TileInfoStruct( );
}
or
aligned(8) class GPCCTileInventorySample {
   TileInventory Struct( );
}
```

According to embodiments, the sample (GPCCTileInventorySample) of the 3D tile timed metadata track may contain TileInfoStruct( ) or TileInventoryStruct( ). TileInfoStruct( ) represents dynamically changed 3D tile information of associated point cloud data, which dynamically changes. TileInventoryStruct( ) represents dynamically changed tile inventory information of associated point cloud data.

For example, if a track carrying part or all of the geometry bitstream has a 3D spatial region timed metadata track, the associated 3D tile information or tile inventory information of point cloud data carried in the track may be considered to be dynamic.

For details of the 3D tile information, that is, fields contained in TileInfoStruct( ) contained in the sample and/or the sample entry of the 3D tile timed metadata track, refer to the detailed description given above in the "G-PCC 3D Tile Information Structure." A description thereof will be skipped to avoid redundant description. For details of the tile inventory information, that is, fields contained in TileInventoryStruct( ) and/or TileInventoryBox( ), refer to the detailed description given above in the "G-PCC 3D Tile Inventory Information Structure." A description thereof will be skipped to avoid redundant description.

As described above, the point cloud data (i.e., the bounding box) may be partitioned into one or more tiles and one or more tiles are related to one or more 3D spatial regions. In addition, signaling information for supporting spatial access of point cloud data, for example, 3D bounding box information, 3D spatial region information, tile information, or tile inventory information may not change over time (also referred to as static) or may change dynamically over time. In the present disclosure, signaling information that does not change over time may be referred to as static signaling information and signaling information that changes dynamically over time may be referred to as dynamic signaling information. For example, the 3D spatial region information may be static 3D spatial region information or dynamic 3D spatial region information.

According to embodiments, as point cloud data (e.g., 3D map) may be dynamically acquired, the partitioning into one or more tiles may be dynamic over the time. Therefore, the association between the spatial regions and the corresponding part of the point cloud data may also be dynamic. According to embodiments, in order to enable spatial access of point cloud data before decoding, an association between the spatial regions and corresponding point cloud data needs to be effectively indicated at the file level (or file format level). To this end, as described above, the transmission device may cause static signaling information to be carried through a track carrying geometry information and/or attribute information and/or parameter sets, and cause information that may change dynamically over time to be carried through a timed metadata track.

That is, signaling information such as 3D bounding box information, 3D spatial region information, tile information and/or tile inventory information may be delivered in a sample, a sample entry, or a sample group in a single track or multiple tracks, a track group, or a sample or a sample entry of a separate metadata track.

Accordingly, the reception device or the player may extract, decode, or render only point cloud data present in a necessary spatial region based on the signaling information.

In addition, when point cloud data associated with a specific 3D tile region is delivered in one or more tracks, signaling information related to track grouping may be provided to allow the reception device which is to use the point cloud data of the region to acquire the point cloud data from the associated track. In particular, dynamic information associated with the corresponding track group may be delivered in a metadata track or the like.

Figure 49:
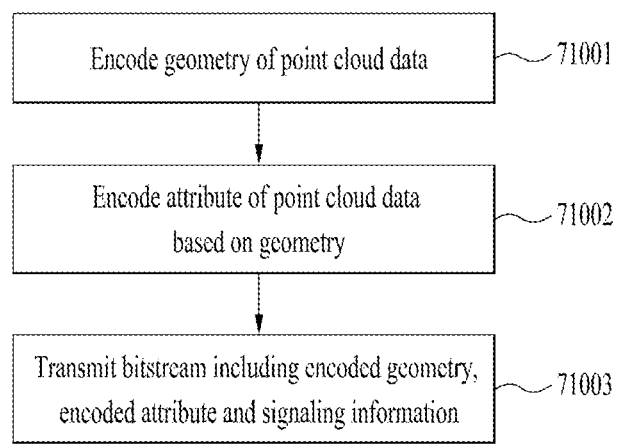
FIG. 49 is a flowchart of a method of transmitting point cloud data according to embodiments.

FIG. 49 is a flowchart of a method for transmitting point cloud data according to embodiments.

The point cloud data transmission method according to the embodiments may include an operation 71001 of encoding point cloud data, an operation 71002 of encapsulating a bitstream containing the encoded point cloud data and signaling information into a file, and an operation 71003 of transmitting the file.

In the operation 71001 of encoding the point cloud data, some or all of the operations of the point cloud video encoder 10002 of FIG. 1, the encoding 20001 of FIG. 2, the point cloud video encoder of FIG. 4, the point cloud video encoder of FIG. 12, the point cloud encoding of FIG. 15, and the point cloud encoder of FIG. 18.

The operation 71001 of encoding the point cloud data may include encoding geometry data (or referred to as geometry information) of the point cloud data and encoding attribute data (or referred to as attribute information) of the point cloud data. In this case, according to embodiments, the encoding operation may be performed in a 3D block unit (e.g., a slice unit or a tile unit including one or more slices). To this end, before the encoding, the process of partitioning the point cloud data (i.e., bounding box) into one or more tiles and partitioning each of the tiles into one or more slices may be carried out. At this point, one or more tiles may be related to one or more 3D spatial regions.

In an embodiment, the operation 71002 of encapsulating the G-PCC bitstream containing the encoded point cloud data and the signaling information into a file includes encapsulating a G-PCC bitstream composed of TLV encapsulation structures as shown in FIG. 41 into an ISOBMFF-based file. According to embodiments, the operation 71002 of encapsulating the G-PCC bitstream containing the encoded point cloud data and the signaling information into a file may be performed by the file/segment encapsulator of FIG. 14, 15, or 18.

According to embodiments, the TLV encapsulation structures contained in the G-PCC bitstream may contain signaling information, such as SPS, GPS, APS, or tile inventory (or TPS), geometry data (called a coded geometry bitstream or a geometry slice), attribute data (called a coded attribute bitstream or an attribute slice), and/or metadata (or a coded metadata bitstream or a metadata slice). The metadata may also be regarded as signaling information. For details of the respective TLV encapsulation structures, refer to the description made above with reference to FIGS. 41 to 43. A description thereof will be skipped.

When the G-PCC bitstream is encapsulated into a file, the G-PCC bitstream may be stored in a single track or multiple tracks of the file. When the G-PCC bitstream is stored (i.e., transmitted) in a single track or multiple tracks of the file, the SPS, GPS, APS, or tile inventory (or TPS) may be included in the sample entry or sample of the track. However, the geometry bitstream (i.e., geometry slice), the attribute bitstream (i.e., attribute slice), and/or the metadata bitstream (i.e., metadata slice) are included in a sample of the track. In this case, when a sample is composed of multiple TLV encapsulation structures, each of the multiple TLV encapsulation structures may be stored as a sub-sample. For a detailed structure of the file when the G-PCC bitstream composed of the TLV encapsulation structures is stored in a single track or multiple tracks of the file, refer to the description made above with reference to FIGS. 44 to 47.

In addition, when the G-PCC bitstream is stored in a single track or multiple tracks of the file in the encapsulation operation 71002 as described above, grouping of related samples and grouping of related tracks may be performed.

According to embodiments, signaling information for supporting spatial access of point cloud data (i.e., information related to one or more 3D spatial regions) may include 3D bounding box information, 3D spatial region information, and tile information or tile inventory information. The signaling information may be signaled in a sample, a sample entry, or a sample group in a single track or multiple tracks, a track group, or a separate metadata track in the encapsulation operation 71002.

According to embodiments, static signaling information that does not change over time may be signaled in a sample, a sample entry, or a sample group in a single track or multiple tracks, or a track group, while dynamic signaling information that dynamically changes over time may be signaled in a sample of a metadata track. In addition, initial 3D bounding box information, initial 3D spatial region information, initial tile information, or initial tile inventory information may be signaled in a sample entry of the metadata track.

Figure 50:
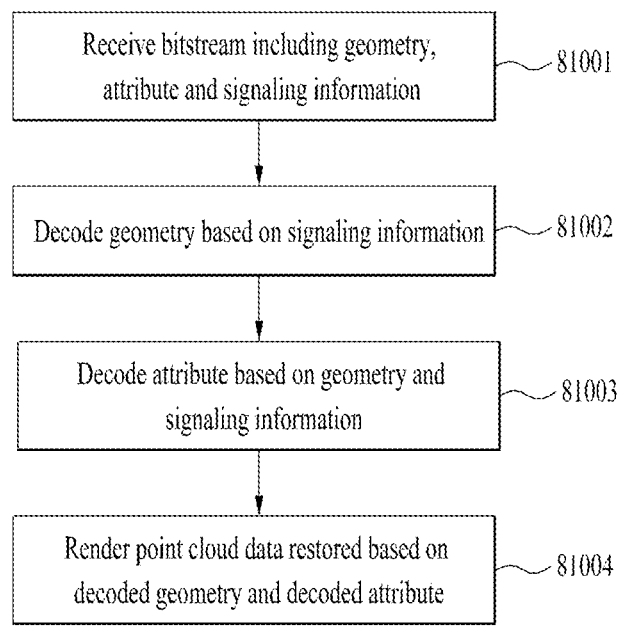
FIG. 50 is a flowchart of a method of receiving point cloud data according to embodiments.

FIG. 50 is a flowchart of a method for receiving point cloud data according to embodiments.

The point cloud data reception method may include an operation 81001 of receiving a file, an operation 81002 of decapsulating the received file into a bitstream containing point cloud data and signaling information, and an operation 81003 of decoding the point cloud data, and an operation 81003 of rendering the decoded point cloud data.

According to embodiments, the G-PCC bitstream of FIG. 41 may be stored in a single track or multiple tracks of an ISOBMFF-based file received in the reception operation 81001.

According to embodiments, in the decapsulation operation 81002, decapsulation is performed to acquire the G-PCC bitstream composed of TLV encapsulation structures of FIG. 41 from a sample entry and/or a sample of the single track or multiple tracks in the received file.

The TLV encapsulation structures may contain signaling information, such as SPS, GPS, APS, or tile inventory (or TPS), a geometry slice (or geometry bitstream), zero or more attribute slices (or attribute bitstreams), and/or a metadata slice (or metadata bitstream). For details of the respective TLV encapsulation structures, refer to the descriptions of FIGS. 41 to 43.

According to embodiments, in the decapsulation operation 81002, signaling information for supporting spatial access may be acquired from a sample, a sample entry, a sample group, or a track group in a single track or multiple tracks, or from a separate metadata track. The signaling information for supporting the spatial access (i.e., information related to one or more 3D spatial regions) may include 3D bounding box information, 3D spatial region information (or cubic region information), tile information, and/or tile inventory information.

According to embodiments, in the decapsulation operation 81002, decapsulation may be performed by the file/segment decapsulator of FIG. 14, 16, or 20.

According to embodiments, in the decapsulation operation 81002 or the decoding operation 81003, signaling information, such as SPS, GPS, APS, or tile inventory (or TPS), a geometry slice (or a geometry bitstream), zero or more attribute slices (or attribute bitstreams), and/or a metadata slice (or a metadata bitstream) may be acquired from the TLV encapsulation structures constituting the G-PCC bitstream.

According to embodiments, the decoding operation 81003 may include a geometry decoding operation, an attribute decoding operation, and a point cloud data reconstruction operation. In the geometry decoding operation, decoding of geometry data (or referred to as geometry information) is performed based on the signaling information. In the attribute decoding operation, decoding of attribute data (or attribute information) is performed based on the signaling information. In the point cloud data reconstruction operation, point cloud data is reconstructed (restored) based on the decoded geometry data and the decoded attribute data. In the decoding operation 81003, decoding may be performed in a 3D block unit (e.g., a slice unit or a tile unit including one or more slices). Furthermore, signaling information for supporting spatial access (i.e., information related to one or more 3D spatial regions) may be used in the decapsulation operation 81002 or the decoding operation 81003. The signaling information may include 3D bounding box information, 3D spatial region information (or cubic region information), tile information, and/or tile inventory information. For example, the decoding operation 81003 may decode geometry data and attribute data belonging to tile(s) related to a specific 3D spatial region based on the signaling information for supporting spatial access (i.e., signaling information of the file level).

According to embodiments, in the decoding operation 81003, when the reconstructed (or restored) point cloud data is a tile unit and/or a slice unit, the reverse process of the spatial partitioning of the transmitting side may be carried out based on the signaling information of the bitstream level.

For example, when the bounding box is partitioned into tiles and slices at the transmitting side as shown in FIG. 19, the slices and/or tiles may be combined based on the signaling information to reconstruct the bounding box of the point cloud data. As another example, a part of the bounding box may be reconstructed by combining some slices and/or some tiles based on the signaling information.

In the decoding operation 81003, some or all of the operations of the point cloud video decoder 10006 of FIG. 1, the decoding 20003 of FIG. 2, the point cloud video decoder of FIG. 11, the point cloud video decoder of FIG. 13, the point cloud decoding of FIG. 14, the point cloud decoding of FIG. 16, and the point cloud video decoder of FIG. 20 may be performed.

According to embodiments, in the rendering operation 81004, the reconstructed point cloud data may be rendered according to various rendering methods. For example, the points of the point cloud content may be rendered as a vertex having a certain thickness, a cube having a specific minimum size centered on the vertex position, or a circle centered on the vertex position. According to embodiments, the rendering operation 81004 may provide all or part of the point cloud content to the user through a display (e.g., a VR/AR display, a general display, etc.) based on the signaling information. The signaling information may be at least one of 3D bounding box information, 3D spatial region information (or cubic region information), tile information, tile inventory information, which are acquired in the decapsulation operation 81002, head orientation information and viewport information, which are acquired from the sensing/tracking unit.

The rendering operation 81004 may be performed by the renderer 10007 of FIG. 1, the rendering 20004 of FIG. 2, the renderer 13011 of FIG. 13, the renderer of FIG. 14, or the point cloud renderer of FIG. 16.

In this way, the reception device or the player may extract, decode, or render only point cloud data present in a necessary spatial region based on the signaling information for supporting spatial access.

A point cloud data transmission method, a point cloud data transmission device, a point cloud data reception method, and a point cloud data reception device according to embodiments may provide a good-quality point cloud service.

A point cloud data transmission method, a point cloud data transmission device, a point cloud data reception method, and a point cloud data reception device according to embodiments may achieve various video codec methods.

A point cloud data transmission method, a point cloud data transmission device, a point cloud data reception method, and a point cloud data reception device according to embodiments may provide universal point cloud content such as an autonomous driving service.

A point cloud data transmission method, a point cloud data transmission device, a point cloud data reception method, and a point cloud data reception device according to embodiments may perform space-adaptive partition of point cloud data for independent encoding and decoding of the point cloud data, thereby improving parallel processing and providing scalability.

A point cloud data transmission method, a point cloud data transmission device, a point cloud data reception method, and a point cloud data reception device according to embodiments may perform encoding and decoding by partitioning the point cloud data in units of tiles and/or slices, and signal necessary data therefor, thereby improving encoding and decoding performance of the point cloud.

With a point cloud data transmission method, a point cloud data transmission device, a point cloud data reception method, and a point cloud data reception device according to embodiments, a G-PCC bitstream composed of Type-Length-Value (TLV) encapsulation structures including geometry, attributes, and signaling information may be stored in a single track or multiple tracks in a file, and the stored G-PCC bitstream may be efficiently accessed. Accordingly, performance of encoding and decoding of a point cloud may be improved.

With a point cloud data transmission method, a point cloud data transmission device, a point cloud data reception method, and a point cloud data reception device according to embodiments, when one sample is composed of multiple TLV encapsulation structures, each of the multiple TLV encapsulation structures may be stored as a subsample. Thereby, efficient access to the stored G-PCC bitstream may be supported.

A point cloud data transmission method, a point cloud data transmission device, a point cloud data reception method, and a point cloud data reception device according to embodiments may enable effective multiplexing of a G-PCC bitstream, and support efficient access to the G-PCC bitstream on a G-PCC access unit basis.

A point cloud data transmission method, a point cloud data transmission device, a point cloud data reception method, and a point cloud data reception device according to embodiments may allow metadata for data processing and rendering in the G-PCC bitstream to be transmitted in the bitstream.

With a point cloud data transmission method, a point cloud data transmission device, a point cloud data reception method, and a point cloud data reception device according to embodiments, a G-PCC bitstream may be partitioned and stored in one or more tracks in a file and signaled. In addition, signaling may be performed to indicate the relationship between the stored G-PCC bitstream and the one or more tracks, and a file containing a point cloud bitstream may be efficiently stored and transmitted through an indication of an alternative G-PCC track stored in the file.

According to embodiments, a point cloud data transmission method, a point cloud data transmission device, a point cloud data reception method, and a point cloud data reception device may signal signaling information for support of spatial access in a sample, a sample entry, a sample group, or a track group in a track of the file, or a sample and/or sample entry of a metadata track. Thereby, a track or item containing point cloud data corresponding to a user viewpoint (i.e., part of point cloud data) may be selected (or parsed), decoded, or rendered from the file. Therefore, the point cloud data reception method and/or the point cloud data reception device may reduce unnecessary computations on unnecessary data, for example, point cloud data not related to the user viewport, among all point cloud data, and may effectively parse point cloud data in a file and decode/render the point cloud data. In other words, some point cloud data may be efficiently accessed among all point cloud data.

According to embodiments, a point cloud data transmission method, a point cloud data transmission device, a point cloud data reception method, and a point cloud data reception device may divide and store a G-PCC bitstream into a plurality of tracks in a file, and signal signaling information indicating a relationship between the tracks in which the G-PCC bitstream is stored. Thereby, a file containing the G-PCC bitstream may be efficiently stored and transmitted.

Each part, module, or unit described above may be a software, processor, or hardware part that executes successive procedures stored in a memory (or storage unit). Each of the steps described in the above embodiments may be performed by a processor, software, or hardware parts. Each module/block/unit described in the above embodiments may operate as a processor, software, or hardware. In addition, the methods presented by the embodiments may be executed as code. This code may be written on a processor readable storage medium and thus read by a processor provided by an apparatus.

In the specification, when a part "comprises" or "includes" an element, it means that the part further comprises or includes another element unless otherwise mentioned. Also, the term " . . . module (or unit)" disclosed in the specification means a unit for processing at least one function or operation, and may be implemented by hardware, software or combination of hardware and software.

Although embodiments have been explained with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may fall within the scope of the appended claims and their equivalents.

The apparatuses and methods may not be limited by the configurations and methods of the embodiments described above. The embodiments described above may be configured by being selectively combined with one another entirely or in part to enable various modifications.

Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the apparatuses of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the apparatus according to the embodiments may include one or more processors capable of executing one or more programs. The one or more programs may perform any one or more of the operations/methods according to the embodiments or include instructions for performing the same. Executable instructions for performing the method/operations of the apparatus according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/" and "," should be interpreted as indicating "and/or." For instance, the expression "A/B" may mean "A and/or B." Further, "A, B" may mean "A and/or B." Further, "AB/C" may mean "at least one of A, B, and/or C." "A, B, C" may also mean "at least one of A, B, and/or C." Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise. The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components.

As used herein, conditional expressions such as "if" and "when" are not limited to an optional case and are intended to be interpreted, when a specific condition is satisfied, to perform the related operation or interpret the related definition according to the specific condition. Embodiments may include variations/modifications within the scope of the claims and their equivalents. It will be apparent to those skilled in the art that various modifications and variations can be made in the present invention without departing from the spirit and scope of the invention. Thus, it is intended that the present invention cover the modifications and variations of this invention provided they come within the scope of the appended claims and their equivalents.

What is claimed is:

1. A point cloud data transmission method comprising:
encoding point cloud data;
encapsulating a bitstream that includes the encoded point cloud data into a file; and
transmitting the file,
wherein the bitstream is stored either in a single track or in multiple tracks of the file,
wherein the file further includes signaling data,
wherein the signaling data include at least one parameter set and spatial region information,
wherein the encoded point cloud data are divided into one or more 3D spatial regions,
wherein the spatial region information includes number information for identifying a number of the one or more 3D spatial regions, region identification information for identifying each 3D spatial region, and position information related to an anchor point of each 3D spatial region,
wherein the spatial region information is at least static spatial region information that does not change over time or dynamic spatial region information that dynamically changes over time, and wherein the encoded point cloud data include geometry data and attribute data.

2. The point cloud data transmission method of claim 1, wherein the bitstream is comprised of data units, wherein each data unit includes type information, length information and a payload, and wherein the type information indicates a type of data in the payload, the length information indicates a length of the payload and the payload includes one of the geometry data, the attribute data or the at least one parameter set.

3. The point cloud data transmission method of claim 1, wherein, based on the bitstream being stored in the multiple tracks of the file, the signaling data further include component type information for indicating a type of a component stored in each track, wherein the component is either the geometry data or the attribute data and wherein the component type information is signaled in a sample entry of each track.

4. A point cloud data transmission apparatus comprising:
an encoder to encode point cloud data;
an encapsulator to encapsulate a bitstream that includes the encoded point cloud data into a file; and
a transmitter to transmit the file,
wherein the bitstream is stored either in a single track or in multiple tracks of the file,
wherein the file further includes signaling data,
wherein the signaling data include at least one parameter set and spatial region information,
wherein the encoded point cloud data are divided into one or more 3D spatial regions,
wherein the spatial region information includes number information for identifying a number of the one or more 3D spatial regions, region identification information for identifying each 3D spatial region, and position information related to an anchor point of each 3D spatial region,
wherein the spatial region information is at least static spatial region information that does not change over time or dynamic spatial region information that dynamically changes over time, and
wherein the encoded point cloud data include geometry data and attribute data.

5. The point cloud data transmission apparatus of claim 4, wherein the bitstream is comprised of data units, wherein each data unit includes type information, length information and a payload, and wherein the type information indicates a type of data in the payload, the length information indicates a length of the payload and the payload includes one of the geometry data, the attribute data or the at least one parameter set.

6. The point cloud data transmission apparatus of claim 4, wherein, based on the bitstream being stored in the multiple tracks of the file, the signaling data further include component type information for indicating a type of a component stored in each track, wherein the component is either the geometry data or the attribute data and wherein the component type information is signaled in a sample entry of each track.

7. A point cloud data reception apparatus comprising:
a receiver to receive a file;
a decapsulator to decapsulate the file into a bitstream that includes point cloud data, wherein the bitstream is stored either in a single track or in multiple tracks of the file, and wherein the file further includes signaling data;
a decoder to decode a part or all of the point cloud data based on the signaling data; and
a renderer to render a part or all of the decoded point cloud data,
wherein the signaling data include at least one parameter set and spatial region information,
wherein the point cloud data are divided into one or more 3D spatial regions,
wherein the spatial region information includes number information for identifying a number of the one or more 3D spatial regions, region identification information for identifying each 3D spatial region, and position information related to an anchor point of each 3D spatial region,
wherein the spatial region information is at least static spatial region information that does not change over time or dynamic spatial region information that dynamically changes over time, and
wherein the point cloud data include geometry data and attribute data.

8. The point cloud data reception apparatus of claim 7, wherein the bitstream is comprised of data units, wherein each data unit includes type information, length information and a payload, and wherein the type information indicates a type of data in the payload, the length information indicates a length of the payload and the payload includes one of the geometry data, the attribute data or the at least one parameter set.

9. The point cloud data reception apparatus of claim 7, wherein, based on the bitstream being stored in the multiple tracks of the file, the signaling data further include component type information for indicating a type of a component stored in each track, wherein the component is either the geometry data or the attribute data and wherein the component type information is signaled in a sample entry of each track.

10. A point cloud data reception method comprising:
receiving a file;
decapsulating the file into a bitstream that includes point cloud data, wherein the bitstream is stored either in a single track or in multiple tracks of the file, and wherein the file further includes signaling data;
decoding a part or all of the point cloud data based on the signaling data; and
rendering a part or all of the decoded point cloud data,
wherein the signaling data include at least one parameter set and spatial region information,
wherein the point cloud data are divided into one or more 3D spatial regions,
wherein the spatial region information includes number information for identifying a number of the one or more 3D spatial regions, region identification information for identifying each 3D spatial region, and position information related to an anchor point of each 3D spatial region,
wherein the spatial region information is at least static spatial region information that does not change over time or dynamic spatial region information that dynamically changes over time, and
wherein the point cloud data include geometry data and attribute data.

11. The point cloud data reception method of claim 10, wherein the bitstream is comprised of data units,
wherein each data unit includes type information, length information, and a payload, and
wherein the type information indicates a type of data in the payload, the length information indicates a length of the payload, and the payload includes one of the geometry data, the attribute data, or the at least one parameter set.

12. The point cloud data reception method of claim 10, wherein, based on the bitstream being stored in the multiple tracks of the file, the signaling data further include component type information for indicating a type of a component stored in each track, wherein the component is either the geometry data or the attribute data, and wherein the component type information is signaled in a sample entry of each track.

* * * * *